(12) United States Patent
Mitsuda et al.

(10) Patent No.: US 9,441,513 B2
(45) Date of Patent: Sep. 13, 2016

(54) EXHAUST GAS PURIFICATION DEVICE

(71) Applicant: YANMAR CO., LTD., Osaka (JP)

(72) Inventors: Masataka Mitsuda, Osaka (JP); Hiroshi Uehara, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 44 days.

(21) Appl. No.: 14/525,759

(22) Filed: Oct. 28, 2014

(65) Prior Publication Data

US 2015/0040542 A1 Feb. 12, 2015

Related U.S. Application Data

(62) Division of application No. 13/634,121, filed as application No. PCT/JP2011/056572 on Mar. 18, 2011, now Pat. No. 9,003,780.

(30) Foreign Application Priority Data

| Mar. 23, 2010 | (JP) | 2010-066764 |
| Mar. 23, 2010 | (JP) | 2010-066765 |
| Apr. 9, 2010 | (JP) | 2010-090558 |

(51) Int. Cl.
*F01N 3/00* (2006.01)
*F01N 3/021* (2006.01)
(Continued)

(52) U.S. Cl.
CPC ......... *F01N 3/0211* (2013.01); *B01D 53/9477* (2013.01); *F01N 3/2839* (2013.01); *F01N 13/008* (2013.01); *F01N 13/0097* (2014.06); *F01N 13/141* (2013.01); *B01D 53/944* (2013.01); *F01N 3/035* (2013.01); *F01N 2450/30* (2013.01); *F01N 2470/18* (2013.01); *F01N 2560/05* (2013.01); *F01N 2560/06* (2013.01);
(Continued)

(58) Field of Classification Search
CPC ............ B01D 53/944; B01D 53/9477; F01N 13/008; F01N 13/0097; F01N 13/141; F01N 2450/30; F01N 2470/18; F01N 2560/05; F01N 2560/06; F01N 2560/14; F01N 3/0211; F01N 3/035; F01N 3/2839; Y10S 285/917
See application file for complete search history.

(56) References Cited

U.S. PATENT DOCUMENTS 4,209,493 A * 6/1980 Olson ................ F01N 1/08
422/176
5,053,062 A * 10/1991 Barris ................ F01N 3/0211
392/485

(Continued)

FOREIGN PATENT DOCUMENTS

| JP | 6-288232 | 10/1994 |
| JP | 2004-263593 | 9/2004 |

(Continued)

*Primary Examiner* — Jesse Bogue
(74) *Attorney, Agent, or Firm* — Norris McLaughlin & Marcus, P.A.

(57) ABSTRACT

An exhaust gas purification device capable of enhancing handling operability such as maintenance of an engine includes two gas purification bodies which purify exhaust gas discharged from the engine, inner cases in which the gas purification bodies are incorporated, and outer cases in which the inner cases are incorporated. The outer cases are arranged side by side in a moving direction of exhaust gas and connected to each other. One of the adjoining inner cases is inserted into the other inner case to form a double-layer structure. A loosely-fitting gap is formed between an inner side surface of the one inner case and an outer side surface of the other inner case.

11 Claims, 34 Drawing Sheets

(51) Int. Cl.
    *F01N 13/00*     (2010.01)
    *F01N 13/14*     (2010.01)
    *F01N 3/28*      (2006.01)
    *B01D 53/94*     (2006.01)
    *F01N 3/035*     (2006.01)

(52) U.S. Cl.
    CPC ......... *F01N 2560/14* (2013.01); *Y10S 285/917* (2013.01); *Y10T 137/6851* (2015.04); *Y10T 137/6892* (2015.04)

(56)           References Cited

U.S. PATENT DOCUMENTS 5,285,640 A  *  2/1994  Olivo .................. F01N 1/10
                                                    422/171
    6,935,461 B2 *  8/2005  Marocco ............... F01N 1/02
                                                    181/212
    8,327,629 B2 * 12/2012  Masuda ................ B01D 46/24
                                                    60/296
    2003/0051449 A1 * 3/2003  Nishiyama ........... F01N 3/0814
                                                    55/309
    2006/0067860 A1 * 3/2006  Faircloth ........... F01N 3/0211
                                                    422/171

FOREIGN PATENT DOCUMENTS

JP         2005-194949       7/2005
    JP         2009-091982       4/2009
    JP         2009-228516      10/2009
    JP         2010-43547        2/2010

* cited by examiner (a)

(b)

EXHAUST GAS PURIFICATION DEVICE

This is a Divisional application of U.S. Ser. No. 13/634,121 filed Sep. 11, 2012.

BACKGROUND OF THE INVENTION

The present invention of the application relates to an exhaust gas purification device provided in a diesel engine or the like, and more particularly, to an exhaust gas purification device for eliminating particulate materials (soot, particulate) and the like included in exhaust gas.

There is a known technique that a diesel particulate filter (DPF, hereinafter) is provided in an exhaust path of a diesel engine (engine, hereinafter) as an exhaust gas purification device, and exhaust gas from the engine is purified by the DPF (see Patent Document 1 for example). There is another known technique that an inner case is provided in an outer case to form a double-layer structure in a DPF, and an oxidation catalyst or a soot filter is incorporated in the inner case (see Patent Document 2 for example). There is also another technique that a case in which an oxidation catalyst is accommodated and another case in which a soot filter is accommodated are connected to each other in a DPF through a bolt-fastened flange such that the cases can be separated from each other (see Patent Documents 3 and 4 for example).

According to the DPF described in Patent Document 4, to connect, to each other, an upstream side case of a single-layer structure in which an oxidation catalyst is incorporated and a downstream side case of a single-layer structure in which a soot filter is incorporated, the upstream side case and the downstream side case are formed into cylindrical shapes having the same diameters, one of the cases is provided with an diameter-enlarged portion, the other case is tightly fitted into the diameter-enlarged portion of the one case so that the oxidation catalyst and the soot filter are disposed closely. If this configuration is employed, since a region in the cases between the oxidation catalyst and the soot filter is narrowed (radiating area is narrowed), there is a merit that probability of temperature reduction of exhaust gas between the oxidation catalyst and the soot filter can be suppressed.

CITATION LIST

Patent Document 1: Japanese Patent Application Laid-open No. 2004-263593
Patent Document 2: Japanese Patent Application Laid-open No. 2005-194949
Patent Document 3: Japanese Patent Application Laid-open No. 2009-228516
Patent Document 4: Japanese Patent Application Laid-open No. 2009-91982

SUMMARY OF THE INVENTION

According to the configuration of patent document 4, however, when the upstream side case of the single-layer structure in which the oxidation catalyst is incorporated and the downstream side case of the single-layer structure in which the soot filter is incorporated are connected to each other, since the other case is tightly fitted into the diameter-enlarged portion provided on the one case, both the cases (tightly fitted portions) could possibly integrated due to rust or the like and cannot be easily separated from each other. Further, since a temperature of outer surfaces of the cases becomes high because exhaust gas passes, a maintenance operation of the DPF must be carried out in a state where the cases are sufficiently cooled, and there is a problem that handling operability cannot be easily enhanced.

This problem has been studied and it is a first technical object of the present invention of the application to provide an improved exhaust gas purification device.

Engines have high general versatility, and are used in various fields such as construction machinery, agricultural machinery, boats and ships. A mounting space of an engine varies depending upon a machine in which the engine is provided but in recent years, the mounting space is limited (narrow) due to requirement of weight reduction and dimension reduction. Further, in the DPF, it is preferable that the temperature of exhaust gas which passes through the DPF is high (e.g., 300° C. or higher) in terms of function. Therefore, there is a requirement for mounting the DPF in an engine.

When the DPF is mounted in the engine, it is necessary, depending upon a mounting position of the DPF, to elongate or curve an exhaust pipe which connects an exhaust manifold and the DPF to each other. However, the longer the exhaust pipe is, the lower the temperature of exhaust gas becomes before reaching the DPF, and the DPF's purification performance of exhaust gas is deteriorated. Further, if the exhaust pipe is curved, since exhaust gas flows therethrough while colliding against the curved inner surface of the exhaust pipe, the flow velocity of exhaust gas is reduced naturally. If the flow velocity is reduced, the temperature of exhaust gas is lowered and thus, in this case also, the DPF's purification performance of exhaust gas is deteriorated.

These circumstances have been studied, and it is a second technical object of the invention of the application to provide a DPF of a structure into which exhaust gas can uniformly or equally flow without depending upon a shape of an exhaust pipe.

A technique for mounting a silencer in the DPF is also well known, but if the silencer is merely connected to the DPF of the conventional structure, a length of the DPF in a moving direction of exhaust gas is correspondingly increased by a length of the silencer, and the DPF cannot be made compact. If the length of the silencer in the moving direction of exhaust gas is shortened to make the DPF compact, it is difficult to sufficiently secure the exhaust gas moving distance in the silencer, and silencing performance could be deteriorated.

Hence, it is a third technical object of the invention of the application to provide a compact exhaust gas purification device to which a silencing function of exhaust gas can be easily added.

A first aspect of the invention provides an exhaust gas purification device including two gas purification bodies for purifying exhaust gas discharged from an engine, inner cases for incorporating the gas purification bodies, and outer cases for incorporating the inner cases, the outer cases being arranged side by side in an exhaust gas moving direction and connected to each other, one of the adjoining inner cases is inserted into the other inner case to form a double-layer structure, and a loosely-fitting gap is formed between an inner side surface of the one inner case and an outer side surface of the other inner case.

According to a second aspect of the invention, in the exhaust gas purification device of the first aspect, the outer side surfaces of the inner cases are provided with bonding flanges protruding radially outward, one ends of the outer cases in the exhaust gas moving direction are fixed to steps formed on the bonding flanges, and the adjoining bonding flanges are superposed on each other and detachably connected to each other.

According to a third aspect of the invention, in the exhaust gas purification device of the second aspect, the inner case is supported by the outer case in a state where the inner case is not in direct contact with the outer case due to existence of the bonding flange.

According to a fourth aspect of the invention, in the exhaust gas purification device of any one of first to third aspects, an outer side surface of one of the adjoining inner cases is provided with a sensor boss body for supporting an exhaust gas sensor, the sensor boss body projects radially outward from a boss body through hole formed in the outer case, and a collar which surrounds the sensor boss body and closes the boss body through hole is fixed to an outer side surface of the one inner case.

According to a fifth aspect of the invention, in the exhaust gas purification device of the fourth aspect, a pipe of a differential pressure sensor as the exhaust gas sensor is connected to the sensor boss body, and the pipe extends along an outer side surface of the outer case.

According to a sixth aspect of the invention, the exhaust gas purification device of the first aspect further includes an exhaust gas inlet pipe for exhaust gas from the engine flowing into, and an exhaust gas outlet pipe for exhaust gas passing through the gas purification body flowing out, wherein the exhaust gas inlet pipe is mounted on the exhaust gas upstream side outer case such that an exhaust gas introducing passage is formed by the outer side surface of the exhaust gas upstream side outer case and the inner side surface of the exhaust gas inlet pipe, and at least one of the outer side surface of the exhaust gas upstream side outer case and the inner side surface of the exhaust gas inlet pipe is provided with a rectifier which rectifies a flow of exhaust gas.

According to a seventh aspect of the invention, in the exhaust gas purification device of the sixth aspect, a flange body which connects both the outer cases to each other is deviated from a connection boundary position of both the gas purification bodies.

According to an eighth aspect of the invention, in the exhaust gas purification device of the sixth or seventh aspect, the rectifier is provided on each of the outer side surface of the exhaust gas upstream side outer case and the inner side surface of the exhaust gas inlet pipe, the rectifier of the outer case is located on an exhaust gas upstream side, and the rectifier of the exhaust gas inlet pipe is located on an exhaust gas downstream side.

According to a ninth aspect of the invention, in the exhaust gas purification device of any one of sixth to eighth aspects, an exhaust gas inflow opening which is in communication with the exhaust gas inlet pipe is formed in the exhaust gas upstream side outer case and the inner case which is incorporated in this outer case, the exhaust gas inflow opening opens in a rectangular shape, and four corners of the exhaust gas inflow opening are formed into are shapes.

According to a tenth aspect of the invention, the exhaust gas purification device of the first aspect further includes an exhaust gas inlet pipe for exhaust gas from the engine flowing into, and an exhaust gas outlet pipe for exhaust gas passing through the gas purification body flowing out, a silencer having the exhaust gas outlet pipe is mounted on the exhaust gas downstream side outer case, an exhaust gas introducing pipe extending in parallel to the exhaust gas moving direction is incorporated in the silencer, and an exhaust gas upstream side of the exhaust gas introducing pipe enters the exhaust gas downstream side inner case.

According to an eleventh aspect of the invention, in the exhaust gas purification device of the tenth aspect, a flange body which connects both the outer cases to each other is deviated from a connection boundary position of both the gas purification bodies, and a flange body which connects the exhaust gas downstream side outer case and the silencer to each other is deviated from a connection boundary position of the exhaust gas downstream side gas purification body.

According to a twelfth aspect of the invention, in the exhaust gas purification device of the tenth or eleventh aspect, an exhaust gas upstream side end of the silencer is closed by an inner lid body, the exhaust gas introducing pipe penetrates the inner lid body and enters the exhaust gas downstream side inner case, and a communication hole for taking exhaust gas in is formed in a portion of the exhaust gas introducing pipe located on exhaust gas upstream side of the inner lid body.

According to a thirteenth aspect of the invention, in the exhaust gas purification device of any one of the tenth to twelfth aspects, a sensor boss body for supporting an exhaust gas sensor is provided on a portion of an outer peripheral surface of the exhaust gas downstream side inner case which is near a connection boundary position of the gas purification body such that the sensor boss body penetrates the exhaust gas downstream side outer case, and the sensor boss body is located on an extension of an end surface of the gas purification body which intersects with the exhaust gas moving direction, and on an extension of an exhaust gas upstream side end surface of the exhaust gas introducing pipe.

The first aspect of the invention provides an exhaust gas purification device including two gas purification bodies which purify exhaust gas discharged from an engine, inner cases in which the gas purification bodies are incorporated, and outer cases in which the inner cases are incorporated, the outer cases being arranged side by side in an exhaust gas moving direction and connected to each other, wherein one of the adjoining inner cases is inserted into the other inner case to form a double-layer structure, and a loosely-fitting gap is formed between an inner side surface of the one inner case and an outer side surface of the other inner case. Therefore, by separating the other inner case from the one inner case, the gas purification body in the other inner case can be largely exposed to outside. Hence, there is an effect that it is possible to enhance a maintenance operation (such as cleaning of gas purification bodies) which is carried out by separating the cases from each other. Both the inner cases can be easily attached to and detached from each other due to the existence of the loosely-fitting gap between both the inner cases. That is, in the conventional technique in which both the inner cases are tightly fitted to each other to prevent exhaust gas from leaking, both the inner cases are integrated due to rust and they cannot be easily separated from each other. In contrast, according to the first aspect of the invention, it is extremely easy to separate both the inner cases from each other, and there is a merit that this point also enhances maintenance performance and exchanging operability of the gas purification bodies.

According to the second aspect of the invention, in the exhaust gas purification device of the first aspect, the outer side surfaces of the inner cases are provided with bonding flanges protruding radially outward, one ends of the outer cases in the exhaust gas moving direction are fixed to steps formed on the bonding flanges, and the adjoining bonding flanges are superposed on each other and detachably connected to each other. Therefore, the outer case can be easily positioned with respect to the bonding flange due to the existence of the step. When the outer case and the bonding flange are fixed to each other, it is possible to prevent the outer periphery of the bonding flange from interfering with a fixing jig such as a welding torch and a welding rod, and the machining operability of the outer case and the bonding flange can be enhanced.

According to the third aspect of the invention, in the exhaust gas purification device of the second aspect, the inner case is supported by the outer case in a state where the inner case is not in direct contact with the outer case due to existence of the bonding flange. Therefore, mechanical vibration and a deforming force applied to the outer case from outside are less prone to be transmitted to the inner case, and it is possible to prevent the inner case itself and the gas purification body in the inner case from being damaged, and to prevent the gas purification body from deviating in position. Further, since the outer case is fitted over the entire outer periphery of the inner case, it is possible to secure the heat insulation layer (heat insulation region) over the entire outer periphery of the inner case. Hence, it is possible to reliably prevent a reduction in temperature of exhaust gas in the inner case. It is also possible to prevent a surface temperature of the outer case from rising.

According to the fourth aspect of the invention, in the exhaust gas purification device of any one of the first to third aspects, an outer side surface of one of the adjoining inner cases is provided with a sensor boss body for supporting an exhaust gas sensor, the sensor boss body projects radially outward from a boss body through hole formed in the outer case, and a collar which surrounds the sensor boss body and closes the boss body through hole is fixed to an outer side surface of the one inner case. Therefore, the connecting strength between the outer case and the inner case can be enhanced due to the existence of the collar. Further, it is also possible to easily and reliably prevent exhaust gas in the inner case from leaking from the boss body through hole.

Further, as compared with the conventional structure in which one of the inner case is provided with the diameter-enlarged portion to tightly fit both the inner cases to each other, distances between the end surfaces of the gas purification bodies and the mounting positions of the exhaust gas sensors can be set to the shortest distances (zero or arbitrary sizes) without being influenced by pipe-spreading margins of the inner cases and radius and welding margins of the sensor boss bodies. As a result, the entire length of the exhaust gas purification device can be shortened, and the exhaust gas purification device can be easily provided in various kinds of devices. Since the exhaust gas sensors can be close enough to the end surfaces of the gas purification bodies to contact with the end surfaces. Therefore, control performance such as automatic regeneration of the exhaust gas purification device can be enhanced.

According to the fifth aspect of the invention, in the exhaust gas purification device of the fourth aspect, a pipe of a differential pressure sensor as the exhaust gas sensor is connected to the sensor boss body, and the pipe extends along an outer side surface of the outer case. Therefore, the pipe comes close to the outer side surface of the outer case. Hence, when the exhaust gas purification device is assembled into the engine, the pipe does not hinder so much, and the handling performance and mounting performance of the exhaust gas purification device are excellent. Therefore, it is easy to carry out the mounting and assembling operations of the exhaust gas purification device.

According to the sixth aspect of the invention, the exhaust gas purification device of the first aspect further includes an exhaust gas inlet pipe for exhaust gas from the engine flowing into, and an exhaust gas outlet pipe for exhaust gas passing through the gas purification body flowing out, the exhaust gas inlet pipe is mounted on the exhaust gas upstream side outer case such that an exhaust gas introducing passage is formed by the outer side surface of the exhaust gas upstream side outer case and the inner side surface of the exhaust gas inlet pipe, and at least one of the outer side surface of the exhaust gas upstream side outer case and the inner side surface of the exhaust gas inlet pipe is provided with a rectifier which rectifies a flow of exhaust gas. Therefore, exhaust gas can be smoothly sent into the exhaust gas purification device due to the existence of the rectifier without being largely influenced by the shape of the exhaust gas inlet pipe. Therefore, there is an effect that it is possible to flow exhaust gas into the exhaust gas upstream side gas purification body as uniform as possible, and the entire region of the gas purification body can be efficiently utilized.

According to the seventh aspect of the invention, in the exhaust gas purification device of the sixth aspect, a flange body which connects both the outer cases to each other is deviated from a connection boundary position of both the gas purification bodies. Therefore, it is possible to secure a length of each of the gas purification bodies in the exhaust gas moving direction, and to shorten lengths of both the outer cases in the exhaust gas moving direction. Therefore, there is an effect that rigidity of the outer case is enhanced, a weight thereof is reduced, and the entire length of the exhaust gas purification device can be made compact (shortened). There is also a merit that it is possible to easily prevent exhaust gas from leaking due to the existence of the flange body for connection.

According to the eighth aspect of the invention, in the exhaust gas purification device of the sixth or seventh aspect, the rectifier is provided on each of the outer side surface of the exhaust gas upstream side outer case and the inner side surface of the exhaust gas inlet pipe, the rectifier of the outer case is located on an exhaust gas upstream side, and the rectifier of the exhaust gas inlet pipe is located on an exhaust gas downstream side. Therefore, although the rectifier is located in the introducing passage, there is an effect that the outer side surface of the output case and the exhaust gas inlet pipe can be mounted without interfering with each other by simple machining operation of the outer side surface of the outer case and the exhaust gas inlet pipe.

According to the ninth aspect of the invention, in the exhaust gas purification device of any one of the sixth to eighth aspects, an exhaust gas inflow opening which is in communication with the exhaust gas inlet pipe is formed in the exhaust gas upstream side outer case and the inner case which is incorporated in this outer case, the exhaust gas inflow opening opens in a rectangular shape, and four corners of the exhaust gas inflow opening are formed into arc shapes. Therefore, the exhaust gas inflow opening opens in the rectangular form, and the opening area thereof is increased as wide as possible, thereby preventing an increase in the inflow resistance of exhaust gas. Since the four corners are formed into the arc shapes, it is possible to prevent the disturbed flow of exhaust gas passing through the exhaust gas inflow opening. Therefore, there is an effect that variation in inflow pressure of exhaust gas passing through the exhaust gas inflow opening is reduced, and it is possible to flow the exhaust gas into the exhaust gas purification device as uniform as possible.

According to the tenth aspect of the invention, the exhaust gas purification device of the first aspect further includes an exhaust gas inlet pipe for exhaust gas from the engine flowing into, and an exhaust gas outlet pipe for exhaust gas passing through the gas purification body flowing out, a silencer having the exhaust gas outlet pipe is mounted on the exhaust gas downstream side outer case, an exhaust gas introducing pipe extending in parallel to the exhaust gas moving direction is incorporated in the silencer, and an exhaust gas upstream side of the exhaust gas introducing pipe enters the exhaust gas downstream side inner case. Therefore, it is possible to secure a length of the exhaust gas introducing pipe in the exhaust gas moving direction, and to shorten a length of the silencer in the exhaust gas moving direction. Hence, in the exhaust gas purification device having the silencer, there is an effect that the entire exhaust gas purification device can be made compact, and the silencing function of the silencer can be maintained and enhanced.

According to the eleventh aspect of the invention, in the exhaust gas purification device of the tenth aspect, a flange body which connects both the outer cases to each other is deviated from a connection boundary position of both the gas purification bodies, and a flange body which connects the exhaust gas downstream side outer case and the silencer to each other is deviated from a connection boundary position of the exhaust gas downstream side gas purification body. Therefore, it is possible to secure a length of each of the gas purification bodies in the exhaust gas moving direction, and to shorten a length of each of the outer cases in the exhaust gas moving direction. It is also possible to shorten lengths of the exhaust gas downstream side outer case and the silencer in the exhaust gas moving direction. Hence, there is an effect that rigidity of the outer case and the silencer is enhanced, a weight thereof is reduced, and the entire length of the exhaust gas purification device can be made compact (can be shortened). There is also a merit that it is possible to easily prevent exhaust gas from leaking due to the existence of the flange body for connection.

According to the twelfth aspect of the invention, in the exhaust gas purification device of the tenth or eleventh aspect, an exhaust gas upstream side end of the silencer is closed by an inner lid body, the exhaust gas introducing pipe penetrates the inner lid body and enters the exhaust gas downstream side inner case, and a communication hole for taking exhaust gas in is formed in a portion of the exhaust gas introducing pipe located on exhaust gas upstream side of the inner lid body. Therefore, the communication hole located on exhaust gas upstream side of the inner lid body contributes to intake of exhaust gas into the silencer. Hence, there is an effect that a length of the silencer in the exhaust gas moving direction is shortened, a moving distance of exhaust gas itself can be sufficiently secured, and the silencing function of the silencer can be further enhanced.

According to the thirteenth aspect of the invention, in the exhaust gas purification device of any one of the tenth to twelfth aspects, a sensor boss body for supporting an exhaust gas sensor is provided on a portion of an outer peripheral surface of the exhaust gas downstream side inner case which is near a connection boundary position of the gas purification body such that the sensor boss body penetrates the exhaust gas downstream side outer case, and the sensor boss body is located on an extension of an end surface of the gas purification body which intersects with the exhaust gas moving direction, and on an extension of an exhaust gas upstream side end surface of the exhaust gas introducing pipe. Therefore, a disposition distance between the end surface of the gas purification body and the exhaust gas sensor can be set to an extremely short distance (they can be disposed closely). Hence, there is an effect that the entire exhaust gas purification device can be made compact, the detection precision of the exhaust gas sensor can be enhanced, and regeneration control performance of the exhaust gas purification device can be enhanced.

DESCRIPTION OF THE PREFERRED EMBODIMENTS

An exhaust gas purification device in which the present invention of the application is embodied will be described below based on the drawings. In the following description, a side of an exhaust gas inflow opening 12 of a diesel particulate filter 1 is called left side, and a side of the silencer 30 is called right side. Such terms indicating the specific directions and positions are used for convenience sake of description, and they do not limit a technical scope of the invention of the application.

1. First Embodiment

1-1. Outline Structure of DPF

Figure 1:
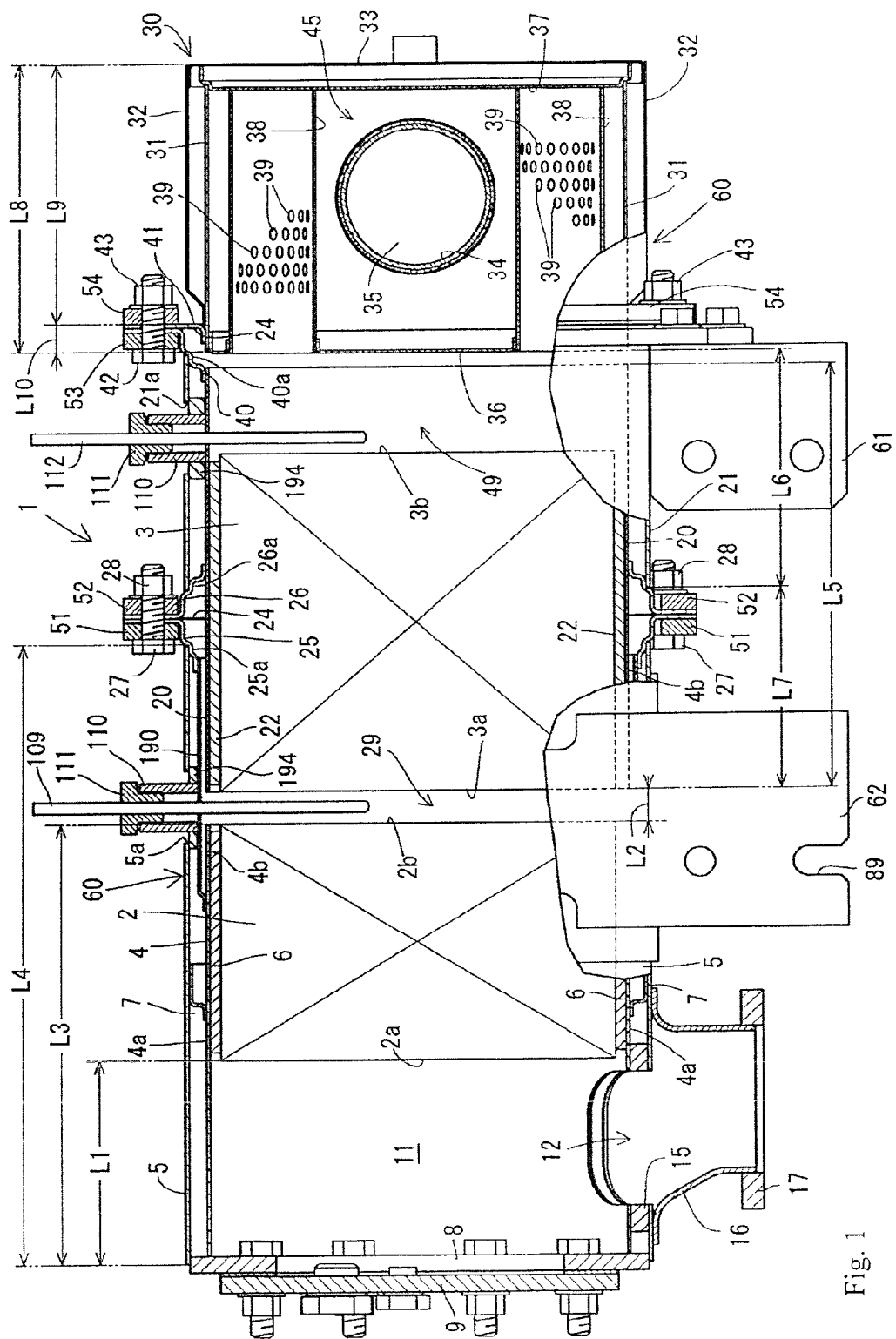
FIG. 1 is an explanatory sectional view of a DPF in a first embodiment.
Figure 2:
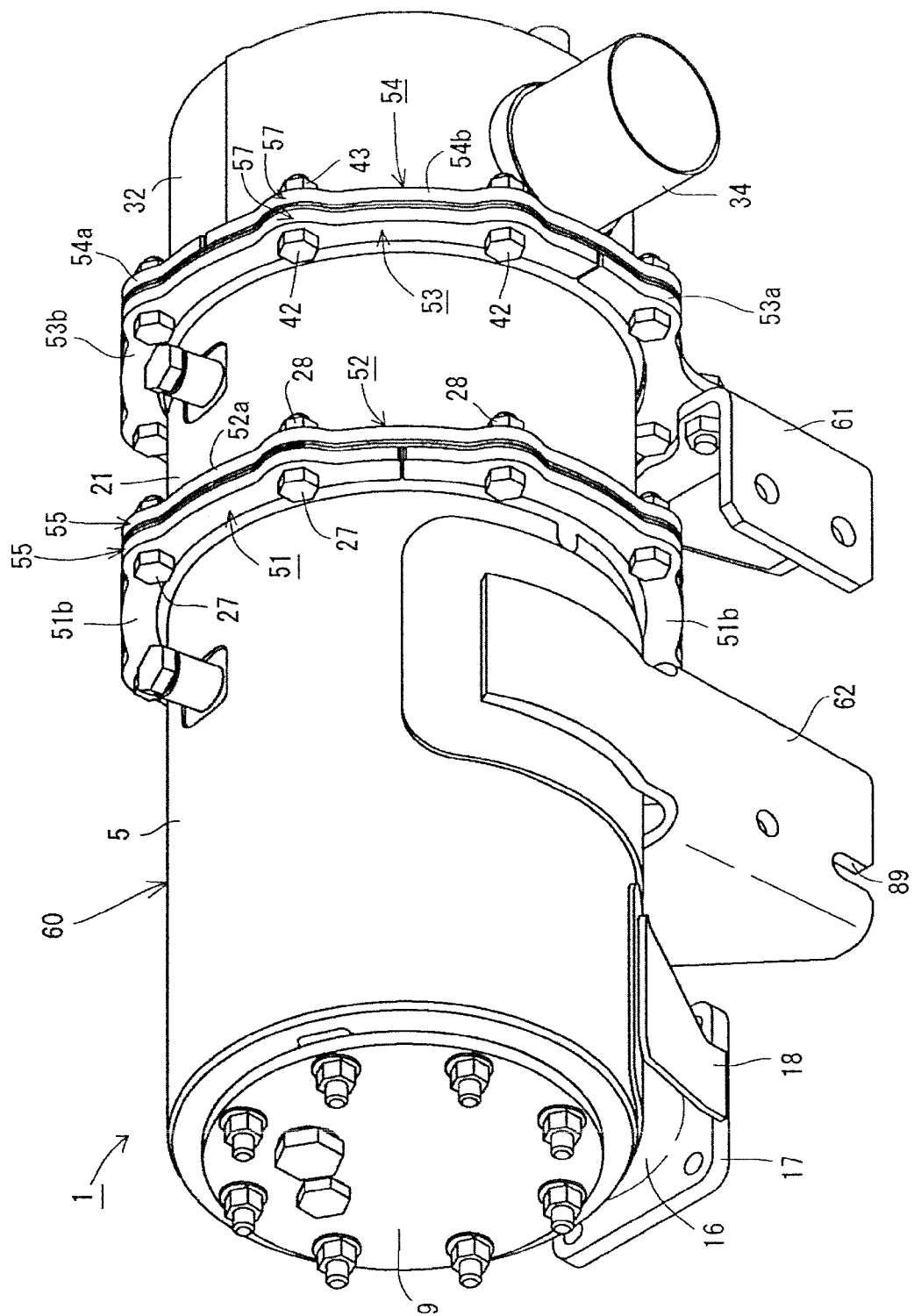
FIG. 2 is an external perspective view of the DPF.
Figure 3:
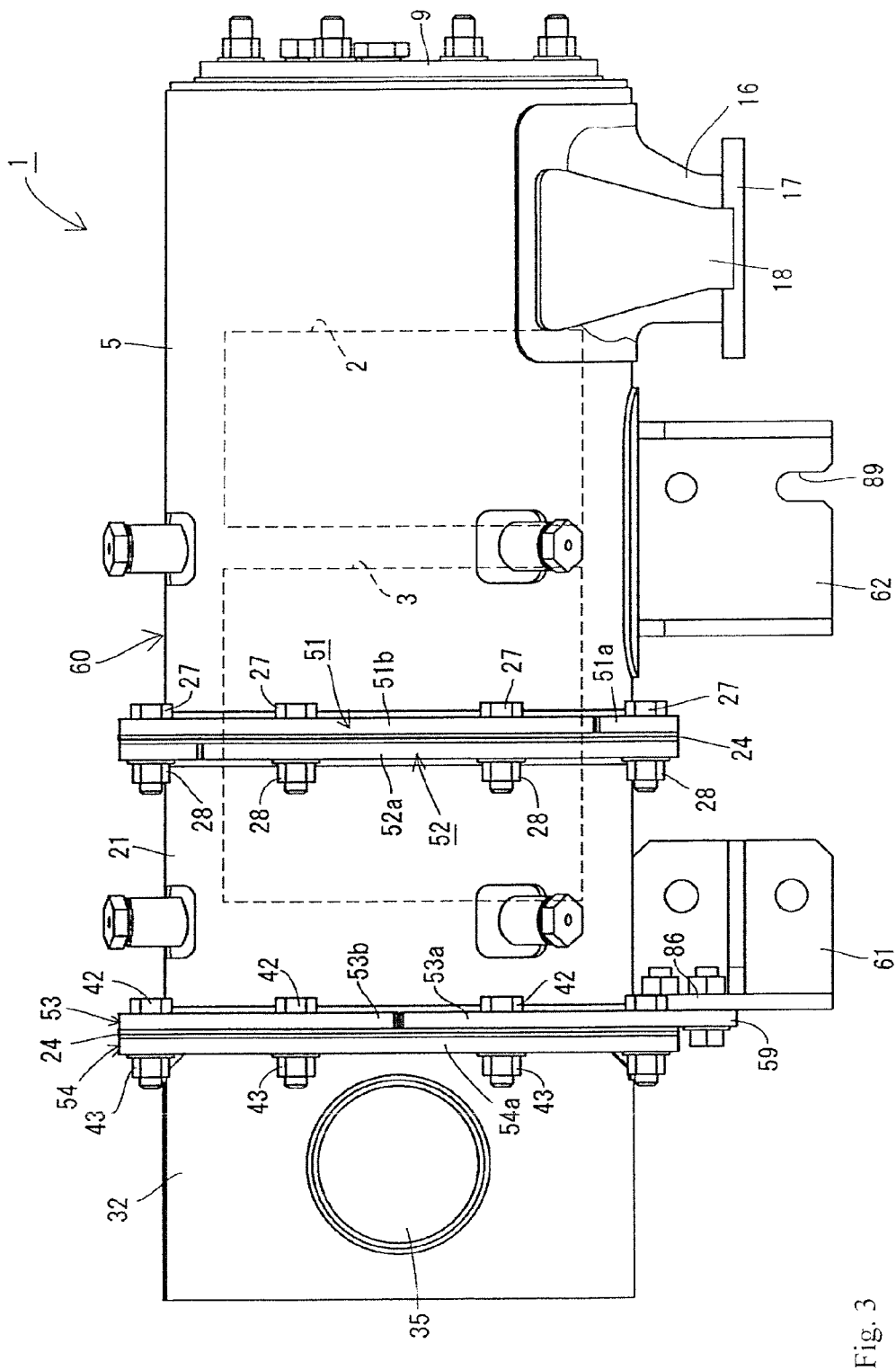
FIG. 3 is an external plan view of the DPF.
Figure 4:
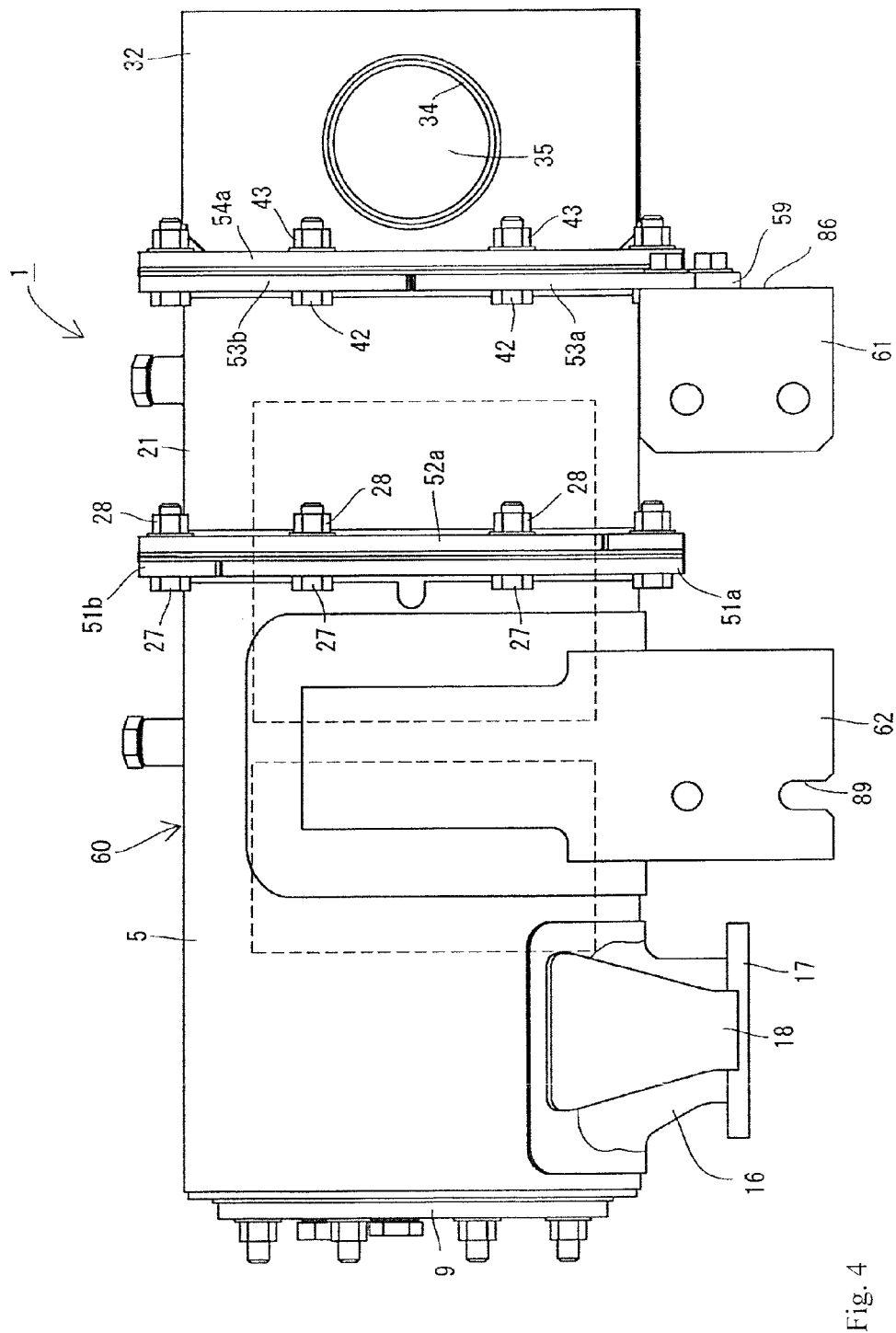
FIG. 4 is an external bottom view of the DPF.
Figure 5:
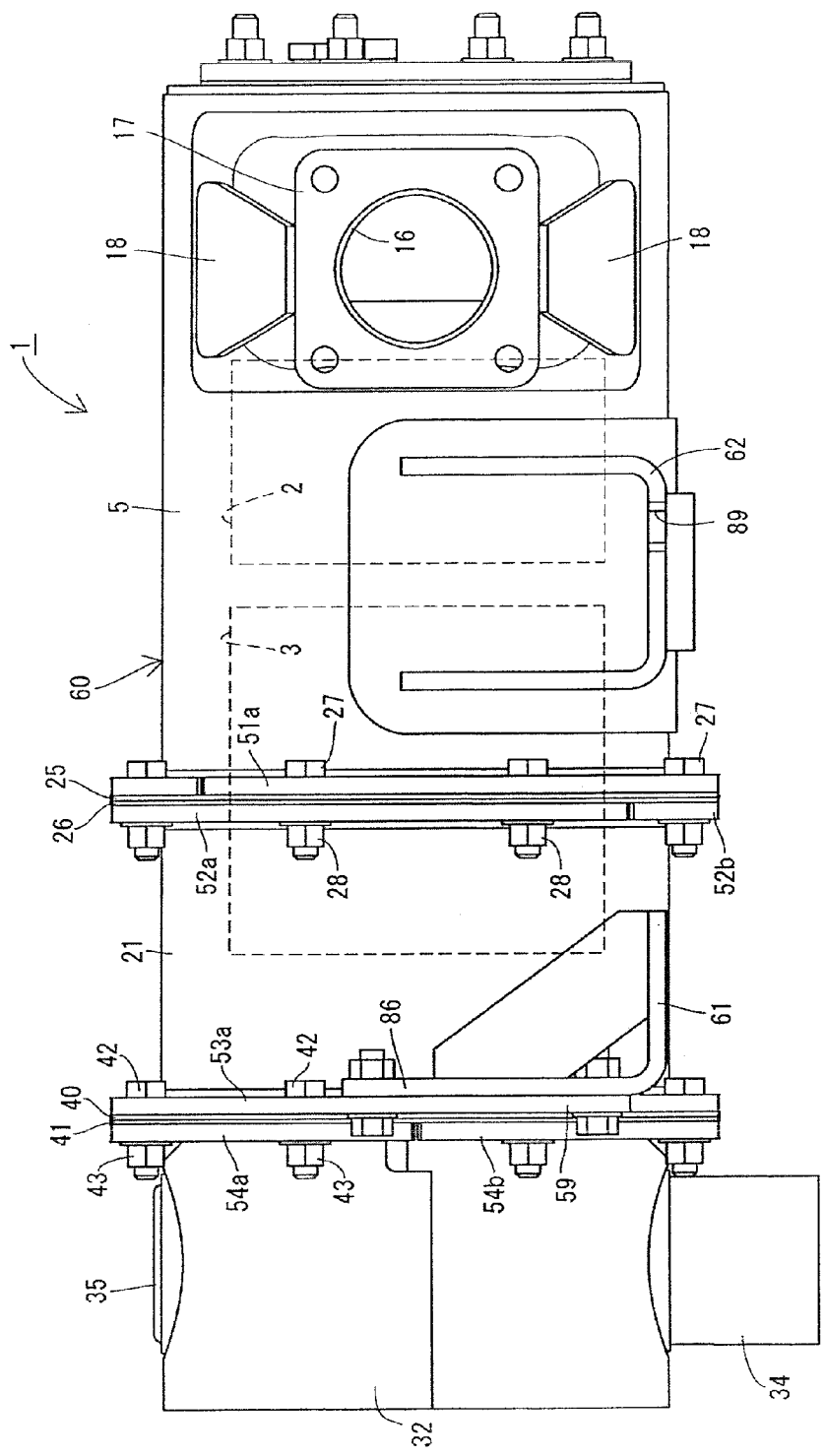
FIG. 5 is an external front view of the DPF.
Figure 6:
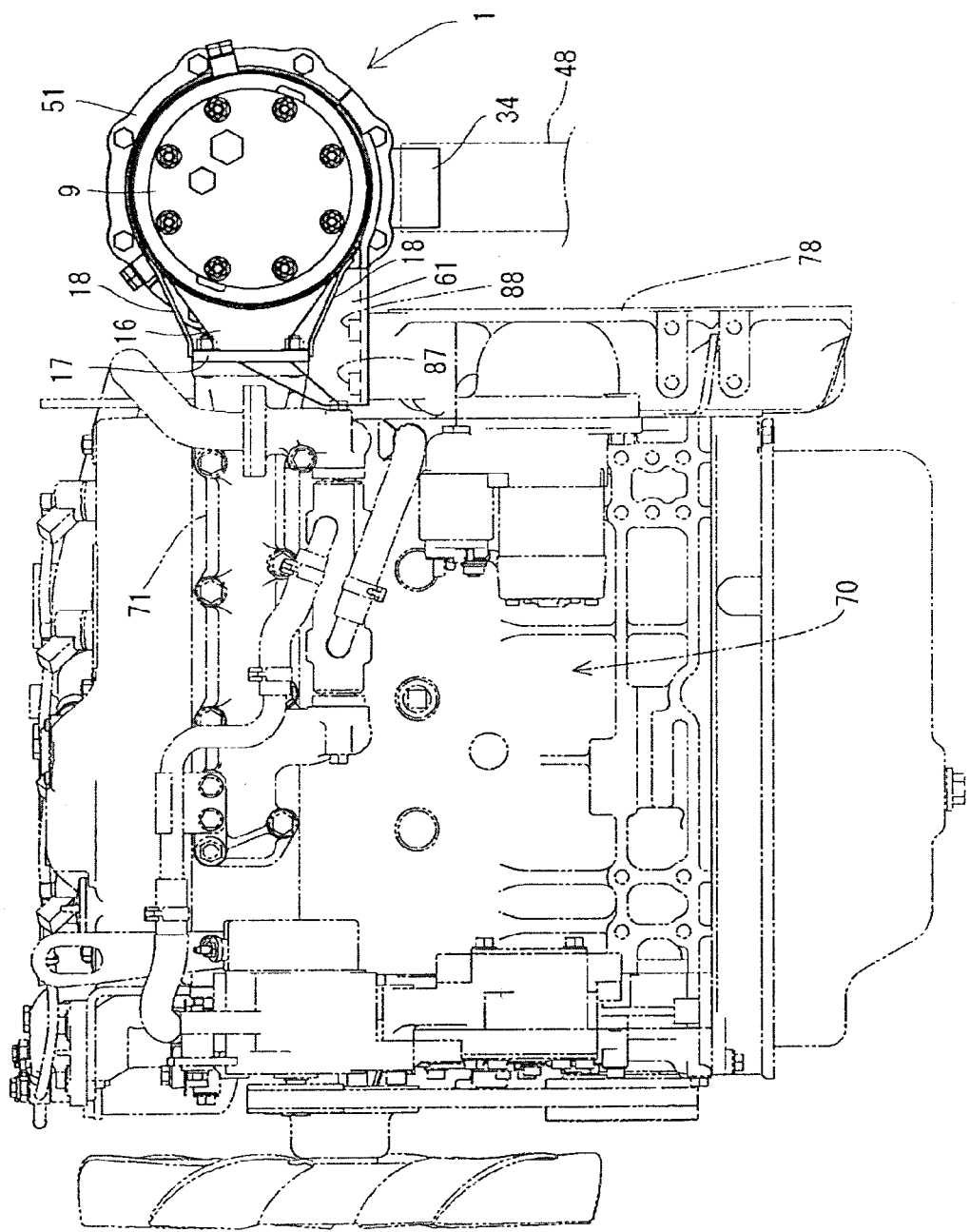
FIG. 6 is an external side view of the DPF.
Figure 7:
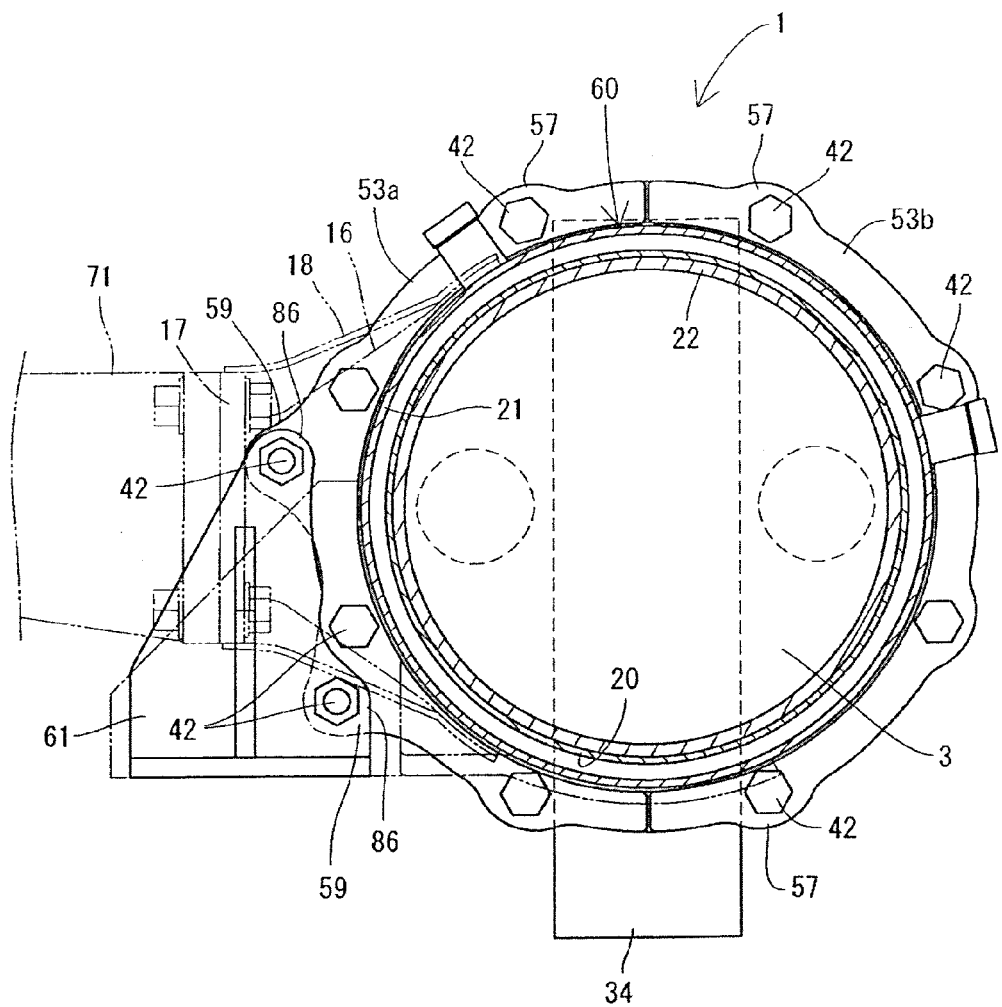
FIG. 7 is a side sectional view of an upstream side of the DPF.
Figure 13:
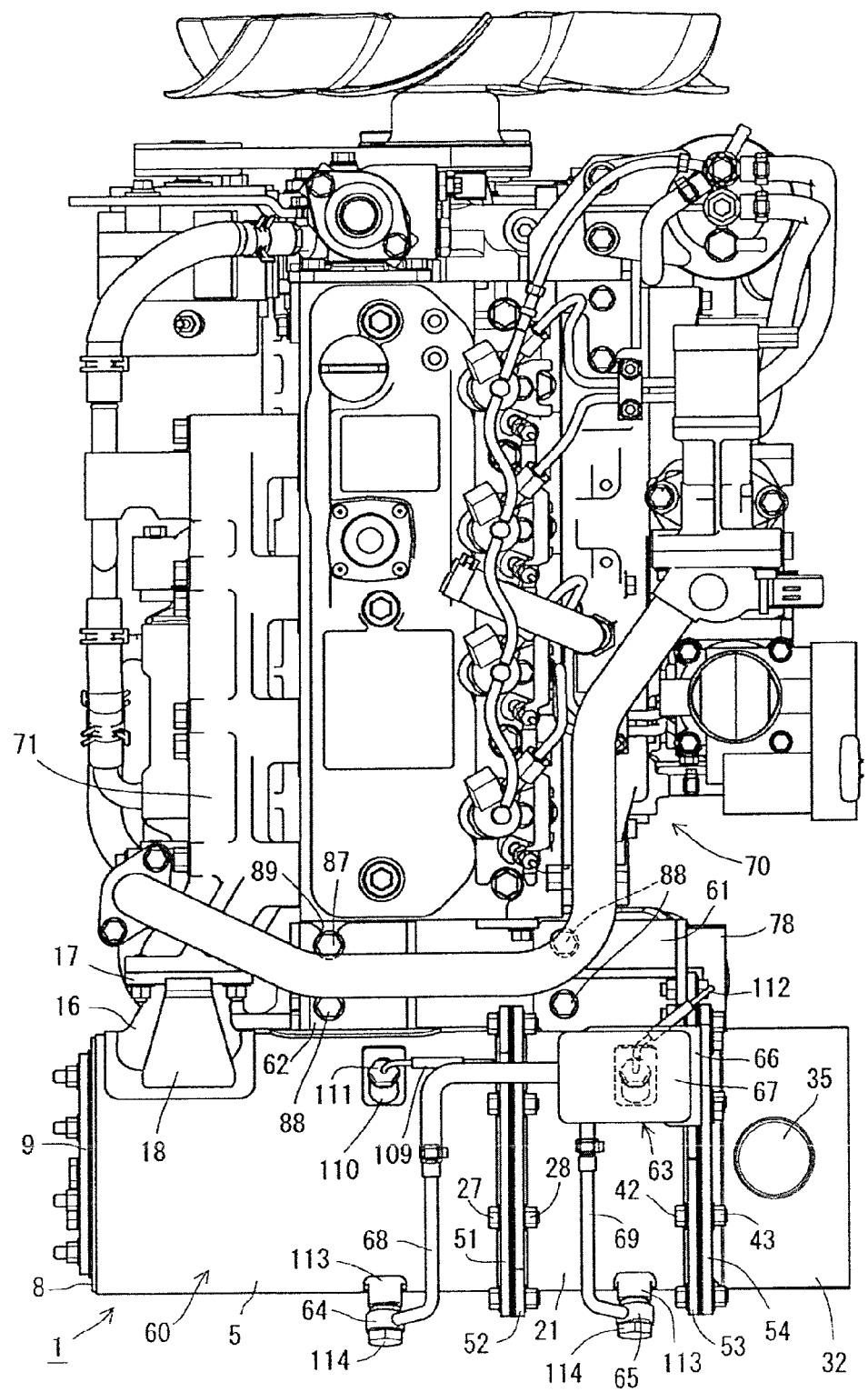
FIG. 13 is a plan view of a diesel engine provided with the DPF.

An outline structure of an exhaust gas purification device of a first embodiment will be described first. As shown in FIGS. 1, 6 and 13, a continuous regeneration type diesel particulate filter 1 (DPF 1, hereinafter) as an exhaust gas purification device is provided. The DPF 1 eliminates particulate materials (PM) in exhaust gas discharged from a diesel engine 70, and reduces carbon monoxide (CO) and hydrocarbon (HC) in exhaust gas of the diesel engine 70. The DPF 1 is for collecting particulate materials (PM) in exhaust gas. The DPF 1 is formed into a substantially cylindrical shape extending in a lateral direction which intersects with an output shaft (crankshaft) of the diesel engine 70 as viewed from above. The DPF 1 is disposed on a flywheel housing 78 of the diesel engine 70. An exhaust gas inlet pipe 16 (exhaust gas intake side) and an exhaust gas outlet pipe 34 (exhaust gas discharge side) are provided on left and right sides of the DPF 1 (one end side and the other end side of a moving direction of exhaust gas), i.e., on left and right sides of the diesel engine 70. The exhaust gas inlet pipe 16 which is the exhaust gas intake side of the DPF 1 is detachably fastened to the exhaust manifold 71 of the diesel engine 70 through a bolt. An exhaust pipe 48 is connected to the exhaust gas outlet pipe 34 which is the exhaust gas discharge side of the DPF 1.

As shown in FIGS. 1 to 6, a diesel oxidation catalyst 2 such as platinum and a soot filter 3 of a honeycomb structure are arranged serially and accommodated in a DPF casing 60 made of heatproof metal material through cylindrical inner cases 4 and 20. The DPF 1 is mounted on the flywheel housing 78 through a flange-side bracket leg 61 and a casing-side bracket leg 62 as support bodies. In this case, one end of the flange-side bracket leg 61 is detachably bolt-fastened to an outer periphery of the DPF casing 60 through a bonding flange 26 (details thereof will be described later). One end of the casing-side bracket leg 62 is integrally welded and fixed to an outer peripheral surface of the DPF casing 60.

As shown in FIGS. 1 to 6 and 13, the other end of the flange-side bracket leg 61 is detachably fastened to an upper surface (DPF mounting portion) of the flywheel housing 78 through two finally-fastening bolts 88. The other end of the casing-side bracket leg 62 is detachably fastened to the upper surface (DPF mounting portion) of the flywheel housing 78 through a temporarily-fastening bolt 87 and the finally-fastening bolts 88. A notch hole 89 is formed in the other end of the casing-side bracket leg 62. The temporarily-fastening bolt 87 is engaged into the notch hole 89.

That is, when the DPF 1 is assembled into the diesel engine 70, the temporarily-fastening bolt 87 is first incompletely threadedly fastened to the upper surface of the flywheel housing 78. Then, an operator brings the DPF 1 upward using both hands, the casing-side bracket leg 62 is engaged with the temporarily-fastening bolt 87 through the notch hole 89, and the DPF 1 is temporarily engaged with the diesel engine 70. In this state, the operator can release both hands from the DPF 1. Thereafter, an inlet flange body 17 is fastened to the exhaust manifold 71, and the exhaust gas inlet pipe 16 is fixed to the exhaust manifold 71.

The flange-side bracket leg 61 and the casing-side bracket leg 62 are fastened to the upper surface of the flywheel housing 78 through the three finally-fastening bolts 88. The temporarily-fastening bolt 87 is also completely fastened to detachably fix the DPF 1 to the upper surface of the flywheel housing 78. The DPF 1 can be detached by reversing the above procedure. As a result, the DPF 1 is stably connected to and supported on a rear portion of the diesel engine 70 at the upper surface of the flywheel housing 78 which is a high rigid member by the bracket legs 61 and 62 and the exhaust manifold 71. The DPF 1 can be attached to and detached from the diesel engine 70 by only one operator.

In the above configuration, exhaust gas in the diesel engine 70 flows from the exhaust manifold 71 of the diesel engine 70 into the diesel oxidation catalyst 2 in the DPF casing 60, the exhaust gas moves from the diesel oxidation catalyst 2 to the soot filter 3 and is purified. Particulate materials in the exhaust gas cannot pass through a porous partition wall between cells in the soot filter 3. That is, the particulate materials in the exhaust gas are collected by the soot filter 3. Thereafter, exhaust gas which passes through the diesel oxidation catalyst 2 and the soot filter 3 is discharged into the exhaust pipe 48.

When the exhaust gas passes through the diesel oxidation catalyst 2 and the soot filter 3, if a temperature of the exhaust gas exceeds a regeneratable temperature (e.g., about 300° C.), NO (nitric oxide) in the exhaust gas is oxidized to instable $NO_2$ (nitrogen dioxide) by the action of the diesel oxidation catalyst 2. Particulate materials collected by the soot filter 3 are oxidized and eliminated by O (oxygen) discharged when $NO_2$ returns to NO. When particulate materials are deposited on the soot filter 3, since particulate materials are oxidized and eliminated by holding the temperature of the exhaust gas higher than the regeneratable temperature, the collecting ability of particulate materials of the soot filter 3 restores (soot filter 3 is regenerated).

1-2. Assembling Structure of Diesel Oxidation Catalyst

A structure for assembling the diesel oxidation catalyst 2 as one example of an exhaust gas purification body (filter) which purifies exhaust gas discharged from the diesel engine 70 will be described with reference to FIGS. 1 and 9. The diesel oxidation catalyst 2 is provided in a substantially cylindrical catalyst inner case 4 made of heatproof metal material. The catalyst inner case 4 is provided in a substantially cylindrical catalyst outer case 5 made of heatproof metal material. That is, the catalyst inner case 4 is fitted over the diesel oxidation catalyst 2 through a mat-shaped catalyst heat insulator 6 made of ceramic fiber. The diesel oxidation catalyst 2 is protected by press-fitting the catalyst heat insulator 6 between the diesel oxidation catalyst 2 and the catalyst inner case 4.

The catalyst outer case 5 is fitted over the catalyst inner case 4 through a thin plate support body 7 having an L-shaped cross section. The catalyst outer case 5 is one of elements constituting the DPF casing 60. The diesel oxidation catalyst 2 is protected by the catalyst heat insulator 6. Stresses (mechanical vibration and deforming force) of the catalyst outer case 5 transmitted to the catalyst inner case 4 are reduced by the thin plate support body 7.

Figure 9:
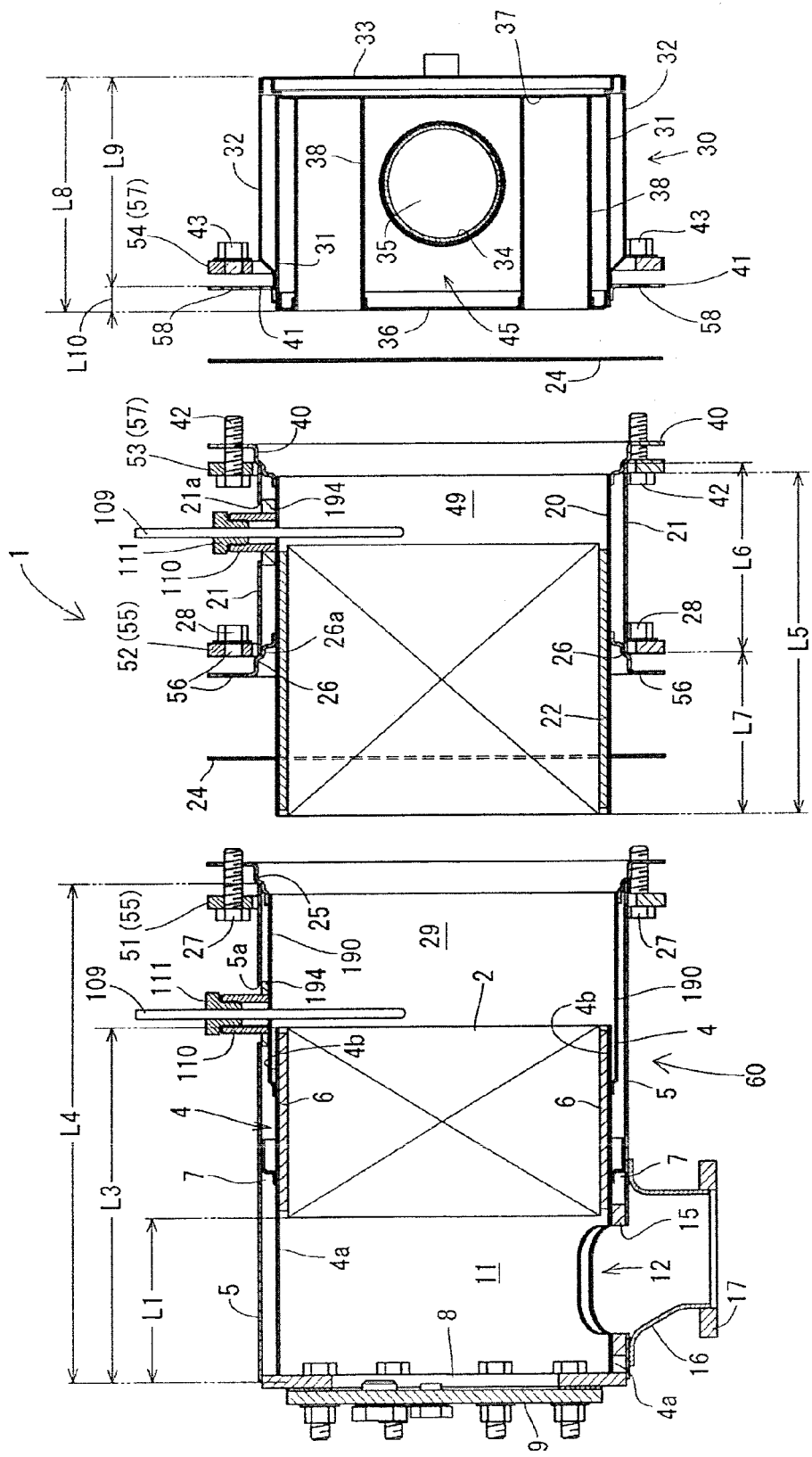
FIG. 9 is an explanatory exploded sectional view of the DPF.
Figure 10:
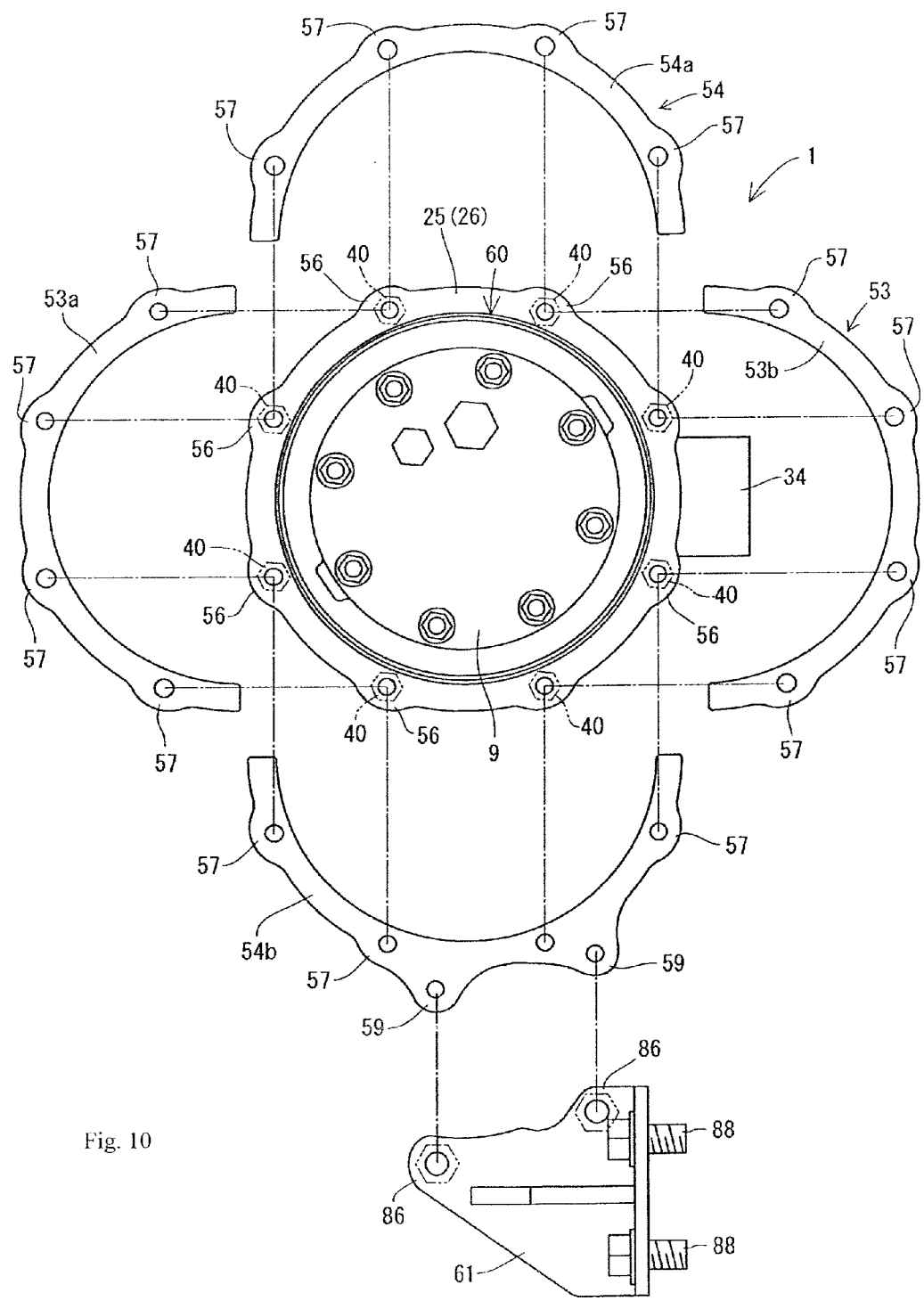
FIG. 10 is a separation side view of grasping flanges (semi-arc bodies)

As shown in FIGS. 1 and 9, a disk-like side lid body 8 is fixed to one ends of the catalyst inner case 4 and the catalyst outer case 5 by welding. An outer lid body 9 is fastened to an outer surface of the side lid body 8 through a bolt and a nut. The side lid body 8 and a gas inflow-side end surface 2a of the diesel oxidation catalyst 2 are separated from each other by a given distance L1 (gas inflow space 11). The exhaust gas inflow space 11 is formed between the side lid body 8 and the gas inflow-side end surface 2a of the diesel oxidation catalyst 2. The exhaust gas inflow opening 12 facing the exhaust gas inflow space 11 opens on the catalyst inner case 4 and the catalyst outer case 5. A closing ring body 15 is sandwiched and fixed between an opening edge of the catalyst inner case 4 and an opening edge of the catalyst outer case 5. Since a gap between the opening edge of the catalyst inner case 4 and the opening edge of the catalyst outer case 5 is closed by the closing ring body 15, it is possible to prevent exhaust gas from flowing in between the catalyst inner case 4 and the catalyst outer case 5.

As shown in FIGS. 1 to 6, and 9, the exhaust gas inlet pipe 16 is disposed on an outer peripheral surface of the catalyst outer case 5 in which the exhaust gas inflow opening 12 is formed. The inlet flange body 17 is welded and fixed to one of opening ends of an exhaust gas inlet pipe 16. The inlet flange body 17 is detachably fastened to the exhaust manifold 71 of the diesel engine 70 through a bolt. One of opening ends of the exhaust gas inlet pipe 16 is brought into communication with the exhaust manifold 71. The other opening end of the exhaust gas inlet pipe 16 is welded to an outer peripheral surface of the catalyst outer case 5 to cover the exhaust gas inflow opening 12 from outside. A pair of reinforcing bracket bodies 18 is welded and fixed between the outer peripheral surface of the catalyst outer case 5 and a side edge of the inlet flange body 17. Connection strength of each of the exhaust manifold 71 and the exhaust gas inlet pipe 16 is secured due to the existence of both the reinforcing bracket bodies 18.

According to this configuration, exhaust gas in the diesel engine 70 flows from the exhaust manifold 71 into the exhaust gas inlet pipe 16, and flows from the exhaust gas inlet pipe 16 and enters the exhaust gas inflow space 11 through the exhaust gas inflow opening 12. Exhaust gas which reaches the exhaust gas inflow space 11 is supplied from the left gas inflow-side end surface 2a into the diesel oxidation catalyst 2. Nitrogen dioxide ($NO_2$) is generated by the oxidization action of the diesel oxidation catalyst 2.

1-3. Assembling Structure of Soot Filter

A structure for assembling the soot filter 3 as one example of the exhaust gas purification body (filter) which purifies exhaust gas discharged from the diesel engine 70 will be described with reference to FIGS. 1 and 9. The soot filter 3 is provided in a substantially cylindrical filter inner case 20 made of heatproof metal material. The filter inner case 20 is provided in a substantially cylindrical filter outer case 21 made of heatproof metal material. That is, the filter inner case 20 is fitted over the soot filter 3 through a mat-shaped filter heat insulator 22 made of ceramic fiber. The filter outer case 21 is one of elements constituting the DPF casing 60 together with the catalyst outer case 5. The soot filter 3 is protected by press-fitting the filter heat insulator 22 between the soot filter 3 and the filter inner case 20.

As shown in FIGS. 1 and 9, the catalyst inner case 4 is formed into a cylindrical shape having a straight ridge line and includes an upstream side cylindrical portion 4a in which the diesel oxidation catalyst 2 is accommodated and a downstream side cylindrical portion 4b into which the later-described filter inner case 20 is inserted. The upstream side cylindrical portion 4a and the downstream side cylindrical portion 4b are cylinders having substantially the same diameters and are integrally formed. The catalyst inner case 4 and the filter inner case 20 are formed into cylindrical shapes having substantially the same diameters. That is, the catalyst inner case 4 and the filter inner case 20 are cylindrical in shape having straight ridge lines, and diameters of both ends thereof are equal to each other.

An outer peripheral surface of the downstream side cylindrical portion 4b in the catalyst inner case 4 is provided with a heat shield case 190 extending toward an exhaust gas downstream side. The heat shield case 190 is one of elements constituting the catalyst inner case 4. The heat shield case 190 is formed into a cylindrical shape, and a diameter of an upstream side of the heat shield case 190 is smaller than that of the downstream side of the heat shield case 190. An upstream side end 190a of the heat shield case 190 is fitted over, welded and fixed to the outer peripheral surface of the downstream side cylindrical portion 4b in the catalyst inner case 4. In this case, the upstream side end 190a of the heat shield case 190 is located in exhaust gas upstream side of an exhaust gas downstream side end surface (opening end surface corresponding to gas outflow end surface 2b of diesel oxidation catalyst 2) of the catalyst inner case 4. Hence, an upstream side gap 23a is formed between the outer peripheral surface of the downstream side cylindrical portion 4b in the catalyst inner case 4 and an inner side surface of the heat shield case 190.

An outer diameter of the diesel oxidation catalyst 2 and an outer diameter of the soot filter 3 are equal to each other. A thickness of the catalyst heat insulator 6 and a thickness of the filter heat insulator 22 are also about the same. The catalyst inner case 4 and the filter inner case 20 are formed from material having the same thickness. Exhaust gas upstream side (exhaust gas intake side) of the filter inner case 20 is inserted into the heat shield case 190. That is, the adjoining catalyst inner case 4 and the filter inner case 20 are of a double-layer structure in which the filter inner case 20 is inserted into the catalyst inner case 4. As the double-layer structure, the catalyst inner case 4 may be inserted into the filter inner case 20. In this case, the heat shield case 190 is provided on the side of the filter inner case 20 such that the heat shield case 190 extends toward the exhaust gas upstream side.

In this embodiment, an outer diameter of the filter inner case is smaller than an inner diameter of the exhaust gas downstream side of the heat shield case 190. Hence, in a state where the exhaust gas upstream side of the filter inner case 20 is inserted into the heat shield case 190, a downstream side gap 23 as a loosely-fitting gap is formed between the filter inner case 20 and an inner side surface of the heat shield case 190. A gap distance of the downstream side gap 23 is set to a size (e.g., 2 mm) which is greater than thicknesses of the inner cases 4 and 20 (e.g., 1.5 mm). For example, even if the inner cases 4 and 20 become rusty or deform, the exhaust gas upstream side of the filter inner case 20 can be easily put into or pulled out from the heat shield case 190.

The exhaust gas purification device includes a thin ring-like catalyst-side bonding flange 25 which is welded and fixed to an outer periphery of the catalyst inner case 4 (in this embodiment, heat shield case 190), and a thin ring-like filter-side bonding flange 26 which is welded and fixed to an outer periphery of the filter inner case 20. The catalyst-side bonding flange 25 and the filter-side bonding flange 26 are formed into doughnut shapes having substantially L-shaped cross sections. An inner periphery of the catalyst-side bonding flange 25 is welded and fixed to the exhaust gas downstream side of the outer periphery of the heat shield case 190. An outer periphery of the catalyst-side bonding flange 25 projects (protrudes) toward an outer periphery (radial direction, radially outward direction) of the catalyst-side bonding flange 25. A step-wise step 25a is formed on a bent angle portion of the catalyst-side bonding flange 25. An exhaust gas downstream side end of the catalyst outer case 5 is welded and fixed to the step 25a. An inner periphery of the filter-side bonding flange 26 is welded and fixed to a longitudinally halfway portion (halfway portion in exhaust gas moving direction) of the outer periphery of the filter inner case 20. An outer periphery of the filter-side bonding flange 26 projects (protrudes) toward the outer periphery (radial direction, radially outward direction) of the filter outer case 21. A step-wise step 26a is formed on a bent angle portion of the filter-side bonding flange 26. An exhaust gas upstream side end of the filter outer case 21 is welded and fixed to the step 26a.

As shown in FIGS. 1 to 5, 9 and 12, the catalyst-side bonding flange 25 and the filter-side bonding flange 26 are butted against each other through a gasket 24. The bonding flanges 25 and 26 are sandwiched from both sides in the exhaust gas moving direction by a pair of thick central grasping flanges 51 and 52 which surround outer peripheries of the outer cases 5 and 21. The central grasping flanges 51 and 52 are fastened to each other through bolt 27 and nut 28 to sandwich the bonding flanges 25 and 26. According to this configuration, the catalyst outer case 5 and the filter outer case 21 are detachably connected to each other.

Figure 12:
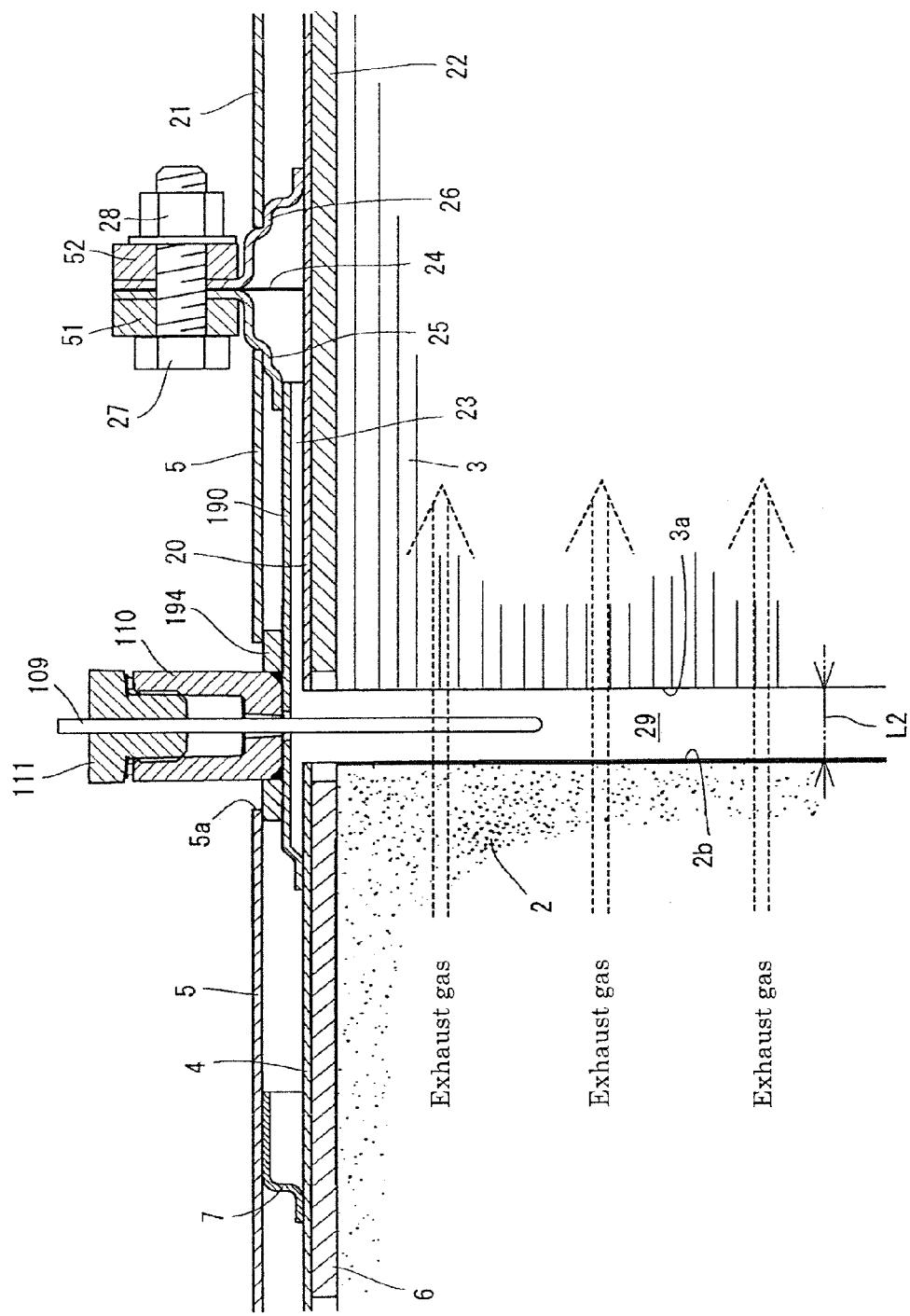
FIG. 12 is a sectional view showing a mounting portion of a sensor boss body with respect to a gas temperature sensor.

As shown in FIGS. 1 and 12, in a state where the exhaust gas upstream side end of the filter outer case 21 is connected to the exhaust gas downstream side end of the catalyst outer case 5 through the central grasping flanges 51 and 52 and the bonding flanges 25 and 26, a catalyst downstream side space 29 is formed between the diesel oxidation catalyst 2 and the soot filter 3. That is, a gas outflow end surface 2b of the diesel oxidation catalyst 2 (catalyst inner case 4) and an intake side end surface 3a of the soot filter 3 (filter inner case 20) are opposed to each other at a sensor mounting distance L2 from each other.

As shown in FIGS. 1 and 9, a cylinder length L4 of the catalyst outer case 5 in the exhaust gas moving direction is longer than a cylinder length L3 of the upstream side cylindrical portion 4a of the catalyst inner case 4 in the exhaust gas moving direction. A cylinder length L6 of the filter outer case 21 in the exhaust gas moving direction is shorter than a cylinder length L5 of the filter inner case 20 in the exhaust gas moving direction. A total length (L2+L3+L5) of the sensor mounting distance L2 of the catalyst downstream side space 29, the cylinder length L3 of the upstream side cylindrical portion 4a in the catalyst inner case 4, and the cylinder length L5 of the filter inner case 20 is substantially equal to a total length (L4+L6) of the cylinder length L4 of the catalyst outer case 5 and the cylinder length L6 of the filter outer case 21.

The exhaust gas upstream side end of the filter inner case 20 projects from the exhaust gas upstream side end of the filter outer case 21 by a length difference (L7≈L5−L6) between the cases 20 and 21. Hence, in a state where the filter outer case 21 is connected to the catalyst outer case 5, the exhaust gas upstream side end of the filter inner case 20 is inserted into the exhaust gas downstream side of the catalyst outer case 5 (downstream side cylindrical portion 4b of the catalyst inner case 4) by the upstream side size L7 of the filter inner case 20 projecting from the filter outer case 21. That is, the exhaust gas upstream side of the filter inner case 20 is inserted into the downstream side cylindrical portion 4b (catalyst downstream side space 29) such that the exhaust gas upstream side of the filter inner case 20 can be pulled out.

In the above-described configuration, nitrogen dioxide ($NO_2$) generated by the oxidization action of the diesel oxidation catalyst 2 is supplied from the intake side end surface 3a into the soot filter 3. Particulate materials (PM) included in exhaust gas of the diesel engine 70 are collected by the soot filter 3, and the particulate materials are continuously oxidized and eliminated by the nitrogen dioxide ($NO_2$). In addition to elimination of particulate materials (PM) in exhaust gas of the diesel engine 70, contents of carbon monoxide (CO) and hydrocarbon (HC) in exhaust gas of the diesel engine 70 are reduced.

1-4. Assembling Structure of Silencer

Figure 8:
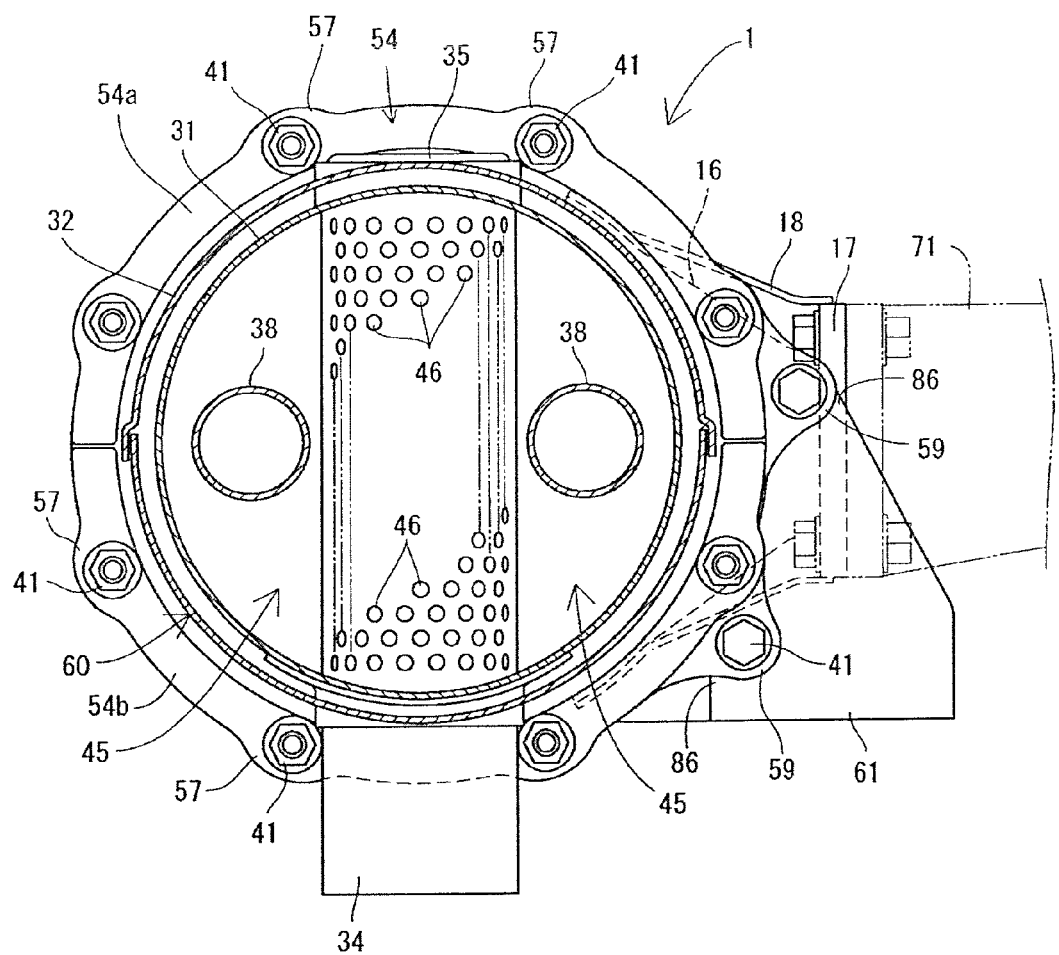
FIG. 8 is a side sectional view of a downstream side of the DPF.

Next, a structure of the silencer 30 which attenuates sound of exhaust gas discharged from the diesel engine 70 will be described with reference to FIGS. 1, 8 and 9. As shown in FIGS. 1, 8 and 9, the silencer 30 includes a substantially cylindrical silencing inner case 31 made of heatproof metal material, a substantially cylindrical silencing outer case 32 made of heatproof metal material, and a disk-like side lid body 33 fixed to a downstream side end of the silencing outer case 32 by welding. The silencing inner case 31 is provided in the silencing outer case 32. The silencing outer case 32 forms the DPF casing 60 together with the catalyst outer case 5 and the filter outer case 21. A diameter of the cylindrical silencing outer case 32 is substantially equal to those of the cylindrical catalyst outer case 5 and the cylindrical filter outer case 21.

Disk-like inner lid bodies 36 and 37 are fixed to both ends of the silencing inner case 31 in the exhaust gas moving direction by welding. A pair of exhaust gas introducing pipes 38 is provided between the inner lid bodies 36 and 37. The exhaust gas upstream side end of each of the exhaust gas introducing pipes 38 penetrates the upstream inner lid body 36. The exhaust gas downstream side end of each of the exhaust gas introducing pipes 38 is closed by the downstream inner lid body 37. A plurality of communication holes 39 are formed in a halfway portion of each of the exhaust gas introducing pipes 38. The expansion chamber 45 is in communication with each of the exhaust gas introducing pipes 38 through the communication holes 39. The expansion chamber 45 is formed in the silencing inner case 31 (between inner lid bodies 36 and 37).

The exhaust gas outlet pipe 34 disposed between the exhaust gas introducing pipes 38 penetrates the silencing inner case 31 and the silencing outer case 32. One end of the exhaust gas outlet pipe 34 is closed by an outlet lid body 35. A large number of exhaust gas holes 46 are formed in the entire exhaust gas outlet pipe 34 in the silencing inner case 31. Each of the exhaust gas introducing pipes 38 is in communication with the exhaust gas outlet pipe 34 through the plurality of communication holes 39, the expansion chamber 45, and the large number of exhaust gas holes 46. The exhaust pipe 48 is connected to the other end of the exhaust gas outlet pipe 34. In the above-described configuration, exhaust gas which enters each of the exhaust gas introducing pipes 38 of the silencing inner case 31 passes through the exhaust gas outlet pipe 34 through the plurality of communication holes 39, the expansion chamber 45, and the large number of exhaust gas holes 46, and the exhaust gas is discharged from the silencer 30 through the exhaust pipe 48.

As shown in FIGS. 1 and 9, an inner diameter side of a thin ring-like filter outlet-side bonding flange 40 is welded and fixed to the exhaust gas downstream side end of the filter inner case 20. An outer diameter side of the filter outlet-side bonding flange 40 protrudes toward an outer periphery (radial direction, radially outward direction) of the filter outer case 21. A step-wise step 40a is formed on a bent angle portion of the filter outlet-side bonding flange 40. An exhaust gas downstream side end of the filter outer case 21 is welded and fixed to the step 40a of the filter outlet-side bonding flange 40. A thin silencing-side bonding flange 41 protruding toward an outer periphery (radially outward) of the silencing outer case 32 is welded and fixed to the exhaust gas upstream side end of the silencing inner case 31. The exhaust gas upstream side of the silencing inner case 31 projects, by a predetermined cylinder size L10, toward a location closer to the exhaust gas upstream side than the silencing-side bonding flange 41. The exhaust gas upstream side end of the silencing outer case 32 is welded and fixed to a portion of an outer peripheral surface of the silencing inner case 31 which is closer to the exhaust gas downstream side than the silencing-side bonding flange 41.

As shown in FIGS. 1 and 7 to 10, the filter outlet-side bonding flange 40 and the silencing-side bonding flange 41 are abutted against each other through the gasket 24, and the bonding flanges 40 and 41 are sandwiched from both sides in the exhaust gas moving direction by a pair of thick outlet grasping flanges 53 and 54 which surround outer peripheries of the outer cases 21 and 32. The outlet grasping flanges 53 and 54 are fastened to each other through bolts 42 and nuts 43 to sandwich the bonding flanges 40 and 41. According to this operation, the filter outer case 21 and the silencing outer case 32 are detachably connected to each other.

As shown in FIGS. 1 and 9, a cylinder length L9 of the silencing outer case 32 in the exhaust gas moving direction is shorter than a cylinder length L8 of the silencing inner case 31 in the exhaust gas moving direction. The exhaust gas upstream side end of the silencing inner case 31 projects from the exhaust gas upstream side end (bonding flange 41) of the silencing outer case 32 by a length difference (L10≈L8−L9) between the cases 31 and 32. That is, in a state where the silencing outer case 32 is connected to the filter outer case 21, the exhaust gas upstream side end of the silencing inner case 31 is inserted into the filter downstream side space 49 formed in the exhaust gas downstream side end (filter outlet-side bonding flange 40) of the filter outer case 21 by the size L10 by which the upstream side end of the silencing inner case 31 projects.

1-5. Connecting Structure of Adjoining Outer Cases

Next, a structure for connecting adjoining outer cases 5, 21 and 32 to one another will be described with reference to FIGS. 1 and 7 to 10. As shown in FIGS. 1 and 7 to 10, a thick central grasping flange 51 (52) includes semi-arc bodies 51a and 51b (52a, 52b) divided into a plurality of bodies (two, in the embodiment) in a circumferential direction of the catalyst outer case 5 (filter outer case 21). Each of the semi-arc bodies 51a and 51b (52a, 52b) is formed into an arc (substantially semi-circular horseshoe shape). In a state where the filter outer case 21 is connected to the catalyst outer case 5, ends of the semi-arc bodies 51a and 51b (52a, 52b) are butted against (connected to) each other along the circumferential direction. That is, the outer periphery of the catalyst outer case 5 (filter outer case 21) is annularly surrounded by the semi-arc bodies 51a and 51b (52a, 52b).

The central grasping flange 51 (52) is provided with a plurality of bolt fastening portions 55 having through holes. The bolt fastening portions 55 are provided at equal distances from one another in the circumferential direction. In this embodiment, eight bolt fastening portions 55 are provided per one set of central grasping flanges 51. Each of the semi-arc bodies 51a and 51b (52a, 52b) is provided with four bolt fastening portions 55 at equal distances from one another in the circumferential direction. Bolt holes 56 corresponding to the bolt fastening portions 55 of the central grasping flange 51 (52) are formed in the catalyst-side bonding flange 25 and the filter-side bonding flange 26 to penetrate these flanges 25 and 26.

When the catalyst outer case 5 and the filter outer case 21 are connected to each other, the outer periphery of the catalyst outer case 5 is surrounded by both the catalyst-side semi-arc bodies 51a and 51b, the outer periphery of the filter outer case 21 is surrounded by the filter-side semi-arc bodies 52a and 52b, and the catalyst-side bonding flange 25 and the filter-side bonding flange 26 which sandwich the gasket 24 are sandwiched from both sides in the exhaust gas moving direction by the semi-arc bodies 51a, 51b, 52a, and 52b (central grasping flanges 51 and 52). Next, bolts 27 are inserted into the bolt fastening portions 55 of the both side central grasping flanges 51 and 52 and the bolt holes 56 of both the bonding flanges 25 and 26, and tightened into nuts 28. As a result, both the bonding flanges 25 and 26 are sandwiched between and fixed by both the central grasping flanges 51 and 52, and the connecting operation of the catalyst outer case 5 and the filter outer case 21 is completed. Here, the butted portions of the ends of the catalyst-side semi-arc bodies 51a and 51b and the filter-side semi-arc bodies 52a and 52b are located such that their phases are deviated from each other by 72°.

As shown in FIGS. 1 and 7 to 10, the thick outlet grasping flange 53 (54) includes semi-arc bodies 53a and 53b (54a, 54b) divided into a plurality of bodies (two, in this embodiment) in the circumferential direction of the filter outer case 21 (silencing outer case 32). Each of the semi-arc bodies 53a and 53b (54a, 54b) in this embodiment are basically the same as the semi-arc bodies 51a and 51b (52a, 52b) of the central grasping flange 51 (52). The outlet grasping flange 53 (54) are also provided with a plurality of bolt fastening portions 57 having through holes at equal distances from one another in the circumferential direction. Bolt holes 58 corresponding to the bolt fastening portions 57 of the outlet grasping flange 53 (54) are formed in the filter outlet-side bonding flange 40 and the silencing-side bonding flange 41 to penetrate these flanges 40 and 41.

When the filter outer case 21 and the silencing outer case 32 are connected to each other, the outer periphery of the filter outer case 21 is surrounded by both the filter outlet-side semi-arc bodies 53a and 53b, the outer periphery of the silencing outer case 32 is surrounded by both the silencing-side semi-arc bodies 54a and 54b, and the filter outlet-side bonding flange 40 and the silencing-side bonding flange 41 which sandwich the gasket 24 are sandwiched from both sides in the exhaust gas moving direction by the semi-arc bodies 53a, 53b, 54a, and 54b (outlet grasping flange 53, 54). Next, bolts 42 are inserted into the bolt fastening portions 57 of both side outlet grasping flanges 53 and 54 and the bolt holes 58 of both the bonding flanges 40 and 41, and tightened into nuts 43. As a result, both the bonding flanges 40 and 41 are sandwiched between and fixed by both the outlet grasping flanges 53 and 54, and the connecting operation of the filter outer case 21 and the silencing outer case 32 is completed. Here, the butted portions of the ends of the filter outlet-side semi-arc bodies 53a and 53b and the silencing-side semi-arc bodies 54a and 54b are located such that their phases are deviated from each other by 72°.

As shown in FIGS. 1 and 7 to 10, the flange-side bracket leg 61 as the support body which makes the DPF casing 60 (outer cases 5, 21, 32) be supported by the diesel engine 70 is mounted on at least one of the grasping flanges 51 to 54. In this embodiment, support body fastening portions 59 having through holes are integrally formed on the one semi-arc body 53a of the filter outlet-side outlet grasping flange 53 at two locations between adjoining bolt fastening portions 57. Mounting bosses 86 corresponding to the support body fastening portions 59 are integrally formed on the flange-side bracket leg 61.

In the above-described configuration, by fastening the mounting bosses 86 of the flange-side bracket leg 61 to the support body fastening portions 59 of the one filter outlet-side semi-arc body 53a, the flange-side bracket leg 61 is detachably fixed to the filter outlet-side outlet grasping flange 53. One end of the casing-side bracket leg 62 is welded and fixed to the outer periphery of the DPF casing 60 (catalyst outer case 5), the other ends of the bracket legs 61 and 62 are fastened to the upper surface of the flywheel housing 78 (DPF mounting portion) through bolts as described above.

As shown in FIGS. 1 and 7 to 10, the exhaust gas purification device includes two gas purification bodies 2 and 3 (diesel oxidation catalyst 2 and soot filter 3) which purify exhaust gas discharged from the engine 70, the inner cases 4, 20, and 31 in which the gas purification bodies 2 and 3 are incorporated, and the outer cases 5, 21, and 32 in which the inner cases 4, 20, and 31 are incorporated. The inner cases 4, 20, and 31 are connected to the outer cases 5, 21, and 32 through the bonding flanges 25, 26, 40, and 41 which protrude toward outer peripheries of the outer cases 5, 21, and 32. The exhaust gas purification device includes a plurality of sets of combination of the gas purification bodies 2 and 3, the inner cases 4, 20, and 31 and the outer cases 5, 21, and 32. The bonding flanges 25 and 26 (40, 41) are sandwiched between and fixed by the pair of grasping flanges 51 and 52 (53, 54), thereby connecting the plurality of outer cases 5, 21, and 32 to each other.

According to this configuration, the adjoining bonding flanges 25 and 26 (40, 41) can be sandwiched from both sides by the grasping flanges 51 and 52 (53, 54) and can be (tightly) connected to each other under pressure. Further, the grasping flanges 51 to 54 are not welded to the outer cases 5, 21, and 32 and are formed separately from them. In a relation between the grasping flanges 51 to 54 and the outer cases 5, 21 and 32, there is no fear that stress concentration and distortion caused by welding are generated. Hence, substantially uniform pressure-connecting force can be applied to the entire bonding flanges 25 and 26 (40, 41), and a surface pressure of sealing surfaces (sandwiching surfaces) of the grasping flanges 51 to 54 can be maintained in a high state. As a result, it is possible to reliably prevent exhaust gas from leaking between the bonding flanges 25 and 26 (40, 41).

As shown in FIGS. 1 and 7 to 10, each of the grasping flanges 51 to 54 includes horseshoe-shaped semi-arc bodies 51a and 51b (52a, 52b, 53a, 53b, 54a, 54b) divided into a plurality of bodies in the circumferential direction of the outer cases 5, 21, and 32, and the plurality of semi-arc bodies 51a and 51b (52a, 52b, 53a, 53b, 54a, 54b) surround the outer peripheries of the outer cases 5, 21, and 32. Therefore, although the grasping flange 51 to 54 include the plurality of semi-arc bodies 51a and 51b (52a, 52b, 53a, 53b, 54a, 54b), they can be assembled as in one body. Hence, it is easy to assemble the grasping flanges 51 to 54 as compared with ring-like flanges, and the assembling operability can be enhanced. The DPF 1 having excellent sealing performance can be formed while suppressing a machining cost and an assembling cost.

1-6. Detailed of Structure of Bonding Flange

Figure 11:
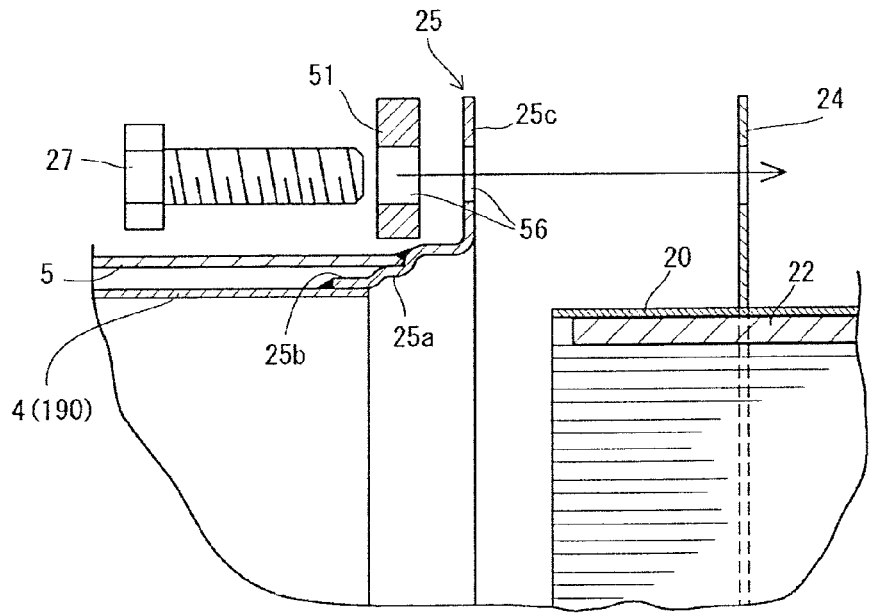
FIG. 11(a) is an enlarged side sectional view of a catalyst-side bonding flange and FIG. 11(b) is an enlarged side sectional view showing a welding mode.
Figure 11:
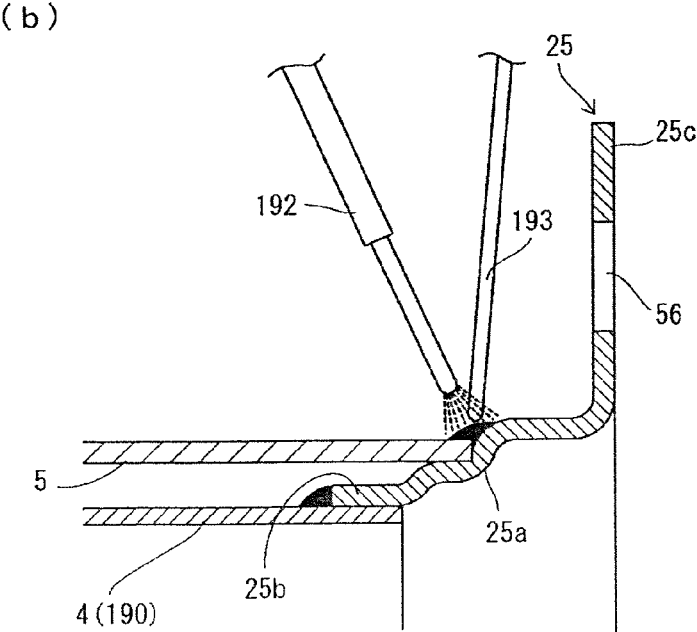

Next, detailed structures of the bonding flanges 25, 26, and 40 will be described with reference to FIGS. 11(a) and (b). Since the bonding flanges 25, 26, and 40 basically have the same structures, the catalyst-side bonding flange 25 which is welded and fixed to the catalyst inner case 4 and the catalyst outer case 5 will be described as a representative example. As shown in FIGS. 11(a) and (b), the step-wise step 25a is formed on the bent angle portion of the catalyst-side bonding flange 25. The exhaust gas downstream side end of the catalyst outer case 5 is fitted over the step 25a, and the step 25a is welded and fixed to the exhaust gas downstream side end of the catalyst outer case 5.

In this case, since the exhaust gas downstream side end of the catalyst outer case 5 is butted against the step 25a of the catalyst-side bonding flange 25, it is possible to easily position the catalyst outer case 5 with respect to the catalyst-side bonding flange 25 due to the existence of the step 25a. The welding between the catalyst outer case 5 and the step 25a is not superposing fillet welding but is a butt welding. A welding torch 192 and a welding rod 193 (see FIG. 11(b)) are tilted so that they are separated from the outer periphery of the catalyst-side bonding flange 25 or they are made to stand up vertically, and they can be brought close to the butted portion between the catalyst outer case 5 and the step 25a, and welded to each other. Therefore, when the catalyst outer case 5 and the catalyst-side bonding flange 25 are welded to each other, it is possible to prevent the outer periphery of the catalyst-side bonding flange 25 from interfering with the welding torch 192 and the welding rod 193, and the welding operability (machining operability) between the catalyst outer case 5 and the catalyst-side bonding flange 25 can be enhanced. Even if the length of the catalyst-side bonding flange 25 in the exhaust gas moving direction is short, it is possible to weld the catalyst outer case 5 and the catalyst-side bonding flange 25 to each other due to the existence of the step 25a. Therefore, a region of the catalyst-side bonding flange 25 which comes into direct contact with outside air can be reduced. Hence, it is possible to prevent reduction in temperature of exhaust gas in the catalyst inner case 4 and the filter inner case 20.

An L-shaped inner diameter-side end 25b in the catalyst-side bonding flange 25 extends along the exhaust gas moving direction of the catalyst inner case 4 (catalyst outer case 5). In this case, the inner diameter-side end 25b extends toward the exhaust gas upstream side. The inner diameter-side end 25b is fitted over the exhaust gas downstream side end of the catalyst inner case 4, and the inner diameter-side end 25b is welded and fixed to the outer peripheral surface of the catalyst inner case 4 (fillet welding). An L-shaped outer diameter-side end 25c (outer peripheral side) in the catalyst-side bonding flange 25 extends in the radial direction (radially outward direction) from the outer periphery of the catalyst outer case 5. High rigidity of the catalyst-side bonding flange 25 is secured by a step-wise cross sectional shape of the catalyst-side bonding flange 25.

As can be found from the above description and FIGS. 1 and 9, since the catalyst-side bonding flange 25 is interposed between the catalyst inner case 4 and the catalyst outer case 5, the catalyst inner case 4 is supported in a state where it is not in direct contact with the catalyst outer case 5. Hence, mechanical vibration and a deforming force externally applied to the catalyst outer case 5 are less prone to be transmitted to the catalyst inner case 4, and it is possible to prevent the catalyst inner case 4 itself and the diesel oxidation catalyst 2 therein from being damaged, and to prevent the diesel oxidation catalyst 2 from deviating in position. Since the catalyst outer case 5 is fitted over the entire region of the catalyst inner case 4, it is possible to secure a heat barrier (heat insulation region) over the entire outer periphery of the catalyst inner case 4. Hence, it is possible to reliably prevent the reduction in exhaust gas temperature in the catalyst inner case 4. It is also possible to prevent the increase in the surface temperature of the catalyst outer case 5.

The nuts 28 are threadedly engaged with the bolts 27 which pass through the bolt holes 56 in the grasping flanges 51 and 52 and the bonding flanges 25 and 26, thereby fastening the grasping flanges 51 and 52 and the bonding flanges 25 and 26 to each other, and the outer diameter-side end 25c of the catalyst-side bonding flange 25 is sandwiched between the grasping flanges 51 and 52 as described above.

1-7. Mounting Structure of Gas Temperature Sensor

Next, an upstream side gas temperature sensor 109 (downstream side gas temperature sensor 112) provided in the DPF 1 will be described with reference to FIGS. 1, 12, and 15. A sensor boss body 110 for supporting the gas temperature sensor 109 (112) which is one example of an exhaust gas sensor is provided on an outer peripheral surface of one of the adjoining inner cases 4 and 20 which is located radially outward. In this embodiment, one end of the cylindrical sensor boss body 110 is welded and fixed to a portion of the outer peripheral surface of the catalyst inner case 4 (more specifically, heat shield case 190) corresponding to the catalyst downstream side space 29. The other end of the sensor boss body 110 extends in the radial direction (radially outward direction) toward an outer side of the catalyst outer case 5 from the boss body through hole 5a formed in the catalyst outer case 5. A sensor mounting bolt 111 is threadedly engaged with the other end of the sensor boss body 110. The thermistor-shaped upstream side gas temperature sensor 109 penetrates the sensor mounting bolt 111, and the upstream side gas temperature sensor 109 is supported by the sensor boss body 110 through the sensor mounting bolt 111. A detecting portion of the upstream side gas temperature sensor 109 projects into the catalyst downstream side space 29.

Figure 15:
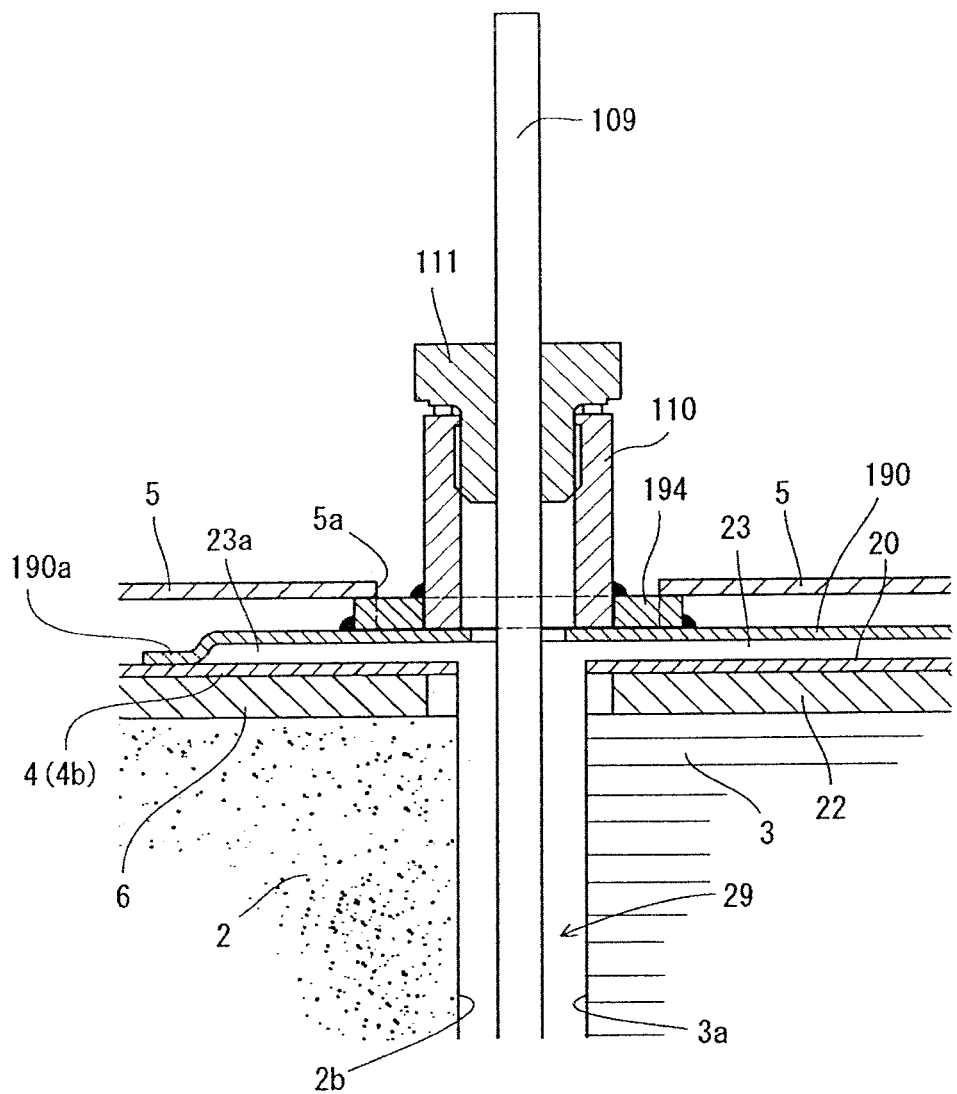
FIG. 15 is an enlarged sectional view showing the mounting portion of the sensor boss body with respect to the gas temperature sensor.

As shown in FIGS. 12 and 15, a collar 194 which surrounds the sensor boss body 110 is fixed to the outer peripheral surface of the catalyst inner case 4 (more specifically, heat shield case 190). A tip end surface of the collar 194 is in intimate contact with an inner peripheral surface of the catalyst outer case 5, and the tip end surface closes, from inside, the boss body through hole 5a. The sensor boss body 110 penetrates the boss body through hole 5a. Hence, a connection strength (rigidity) between the catalyst outer case 5 and the catalyst inner case 4 (more specifically, heat shield case 190) can be enhanced due to existence of the collar 194. It is possible to easily and reliably prevent exhaust gas in the catalyst inner case 4 and the filter inner case 20 from leaking from the boss body through hole 5a.

According to this configuration, when exhaust gas is discharged from the gas outflow end surface 2b of the diesel oxidation catalyst 2, a temperature of the exhaust gas is detected by the upstream side gas temperature sensor 109. In this case, a position of the sensor boss body 110 can be located upstream of the gas outflow end surface 2b of the diesel oxidation catalyst 2. Therefore, the sensor boss body 110 can be disposed on the outer peripheral surface of the catalyst inner case 4 (heat shield case 190) such that the upstream side gas temperature sensor 109 approaches the gas outflow end surface 2b until the upstream side gas temperature sensor 109 comes into contact with the gas outflow end surface 2b of the diesel oxidation catalyst 2. The inner cases 4 and 20 can be thinned by thickening the outer cases 5 and 21, temperatures of the diesel oxidation catalyst 2 and the soot filter 3 can be maintained higher than the regeneratable temperature and the DPF 1 can be reduced in weight. As shown in FIG. 1, the thermistor-shaped downstream side gas temperature sensor 112 is mounted on the sensor boss body 110 through the sensor mounting bolt 111, and the downstream side gas temperature sensor 112 detects a temperature of exhaust gas of a discharge side end surface 3b of the soot filter 3. The sensor boss body 110 in this case penetrates a boss body through hole 21a of the filter outer case 21.

1-8. Mounting Structure of Differential Pressure Sensor

Next, a differential pressure sensor 63 provided in the DPF 1 will be described with reference to FIGS. 13 and 14. The differential pressure sensor 63 which is one example of an exhaust gas sensor sandwiches the soot filter 3 in the DPF 1 and detects a pressure difference of exhaust gas between upstream side and downstream side. A deposited amount of particulate materials of the soot filter 3 is converted based on the pressure difference so that a clogged state of the DPF 1 can be grasped. That is, acceleration control means or intake throttle control means (both not shown) is operated based on the pressure difference of exhaust gas detected by the differential pressure sensor 63 so that the regeneration of the soot filter 3 can be automatically controlled.

A sensor bracket 66 is fastened to a silencing-side outlet grasping flange 54 through a bolt, and the sensor bracket 66 is disposed on an upper surface of the DPF casing 60. A detecting body 67 of the differential pressure sensor 63 is mounted on the sensor bracket 66. An upstream side pipe joint body 64 and a downstream side pipe joint body 65 are connected to a detecting body 67 of the differential pressure sensor 63 through an upstream side sensor pipe 68 and a downstream side sensor pipe 69 respectively. Like the sensor boss body 110, a sensor boss body 113 is disposed on the DPF casing 60. The upstream side pipe joint body 64 (downstream side pipe joint body 65) is fastened to the sensor boss body 113 through pipe joint bolts 114.

As described above, an upstream side gap 23a is formed between an outer peripheral surface of the downstream side cylindrical portion 4b in the catalyst inner case 4 and an inner peripheral surface of the heat shield case 190. One end of the cylindrical sensor boss body 113 is welded and fixed to an exhaust gas upstream side outer peripheral surface of the heat shield case 190. The other end of the sensor boss body 113 extends in the radial direction (radially outward direction) toward an outer side of the catalyst outer case 5 from the boss body through hole 5a formed in the catalyst outer case 5, and the upstream side pipe joint body 64 is fastened to the sensor boss body 113 through the pipe joint bolts 114. The detecting body 67 of the differential pressure sensor 63 is connected to the upstream side pipe joint body 64 through the upstream side sensor pipe 68. The collar 194 surrounding the sensor boss body 113 is also fixed to the sensor boss body 113, and the collar 194 closes a boss body through hole 5a from inside.

Figure 14:
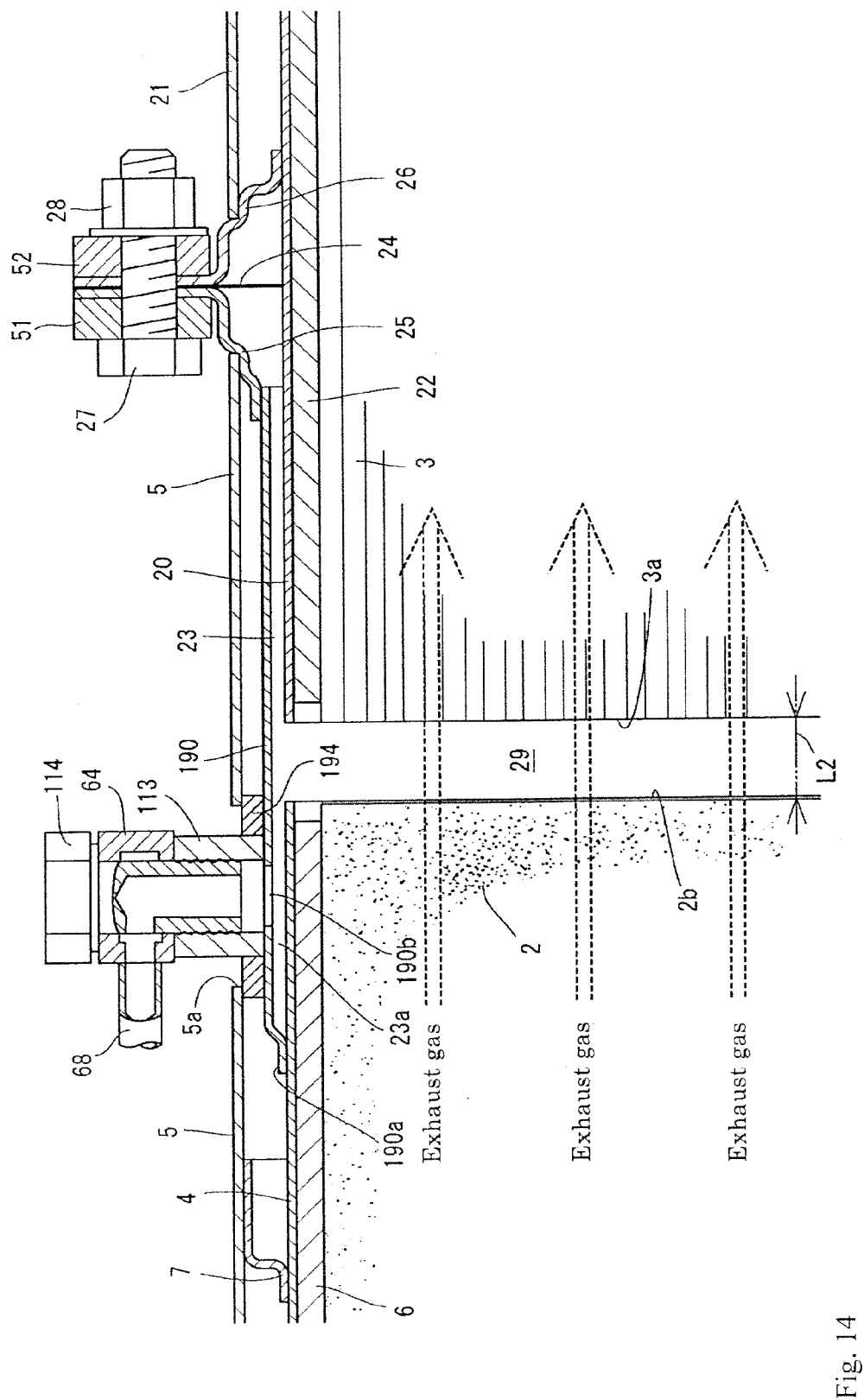
FIG. 14 is a sectional view showing a mounting portion of the sensor boss body with respect to a differential pressure sensor.

In this case, as can be seen in FIGS. 13 and 14, one end of the upstream side sensor pipe 68 is connected to the upstream side pipe joint body 64 fastened to the sensor boss body 113 from a direction intersecting with a projecting direction of the sensor boss body 113. The upstream side sensor pipe 68 itself extends along the outer peripheral surface of the catalyst outer case 5, and the other end of the upstream side sensor pipe 68 is connected to the detecting body 67 mounted on the sensor bracket 66. According to this configuration, since the upstream side sensor pipe 68 is close to the DPF casing 60, when the DPF 1 is assembled into the diesel engine 70 for example, the upstream side sensor pipe 68 does not hinder so much, and the mounting operability and the assembling operability of the DPF 1 are excellent. Therefore, it is easy to mount and assemble the DPF 1.

As shown in FIG. 14, a sensor opening 190b is formed in the upstream side gap 23a. A hollow portion in the sensor boss body 113 is in communication with the upstream side gap 23a through the sensor opening 190b. Exhaust gas is discharged from the gas outflow end surface 2b of the diesel oxidation catalyst 2 into the catalyst downstream side space 29. According to this, a portion of the exhaust gas in the catalyst downstream side space 29 moves toward the detecting body 67 through the upstream side gap 23a, the sensor opening 190b, the hollow portion of the sensor boss body 113, the hollow portion of the upstream side pipe joint body 64 and the upstream side sensor pipe 68.

According to this configuration, when exhaust gas in the catalyst downstream side space 29 moves toward the sensor opening 190b, particulate materials included in the exhaust gas are deposited between the heat shield case 190 and the exhaust gas downstream side end (corner portion) of the catalyst inner case 4. Therefore, as compared with a structure in which the sensor opening 190b directly opens toward the catalyst downstream side space 29, it is possible to largely reduce an amount of particulate materials deposited on the sensor opening 190b itself (edge portion). An inflow pressure of exhaust gas of the sensor opening 190b can be maintained at a predetermined pressure or lower.

Especially as compared with a region of the sensor opening 190), a region of the upstream side gap 23a formed over the entire periphery between the catalyst inner case 4 and the heat shield case 190 can be made large. Therefore, even if particulate materials are deposited on a portion of the upstream side gap 23a between the catalyst inner case 4 and the heat shield case 190, exhaust gas is supplied to the sensor opening 190b from other portions (portions of the upstream side gap where particulate materials are not deposited). That is, the diesel engine 70 can be continuously operated for a long time until particulate materials are deposited on the entire region of the upstream side gap 23a which is formed over the entire periphery between the catalyst inner case 4 and the heat shield case 190. An interval between maintenance operations for removing particulate materials deposited on the sensor opening 190b can be set long. Although the diesel engine 70 can be continuously operated for a long time, a precise state of the differential pressure sensor 63 can be maintained for a long time.

1-9. Summary of First Embodiment

As apparent from the above description and FIGS. 1, 9, and 12, the exhaust gas purification device 1 includes two gas purification bodies 2 and 3 which purify exhaust gas discharged from the engine 70, the inner cases 4, and 20 in which the purification bodies 2 and 3 are incorporated, and the outer cases 5 and 21 in which the inner cases 4 and 20 are incorporated, and the outer cases 5 and 21 are arranged side by side in the exhaust gas moving direction and connected to each other, one of the adjoining inner cases 4 and 20 is inserted into the other inner case to form a double-layer structure, and the loosely-fitting gap 23 is formed between the inner side surface of the one inner case 4 (20) and the outer side surface of the other inner case 20 (4). Therefore, the gas purification body 3 (2) in the other inner case 20 (4) can be largely exposed to outside by separating the other inner case 20 (4) from the one inner case 4 (20). Hence, there is an effect that it is possible to enhance the operability of the maintenance operation (cleaning and the like of the gas purification bodies 2 and 3) which is carried out while separating the outer cases 5 and 21 from each other. Both the inner cases 4 and 20 can be easily attached to and detached from each other due to the existence of the loosely-fitting gap 23 located between both the inner cases 4 and 20. That is, according to the conventional configuration in which both the inner cases are tightly fitted to each other to prevent exhaust gas from leaking, both the inner cases are integrated due to rust and they cannot be easily separated from each other. In contrast, according to this embodiment, it is extremely easy to separate both the inner cases 4 and 20 from each other, and there is a merit that this point also enhances the maintenance performance and the exchanging operability of the gas purification bodies 2 and 3.

As apparent from the above description and FIGS. 1 and 9, the outer side surfaces of the inner cases 4 and 20 are provided with the bonding flanges 25 and 26 protruding radially outward, one ends of the outer cases 5 and 21 in the exhaust gas moving direction are fixed to the steps 25a and 26a formed on the bonding flanges 25 and 26, and the adjoining bonding flanges 25 and 26 are superposed on each other and they are detachably connected to each other. Therefore, the outer cases 5 and 21 can be easily positioned with respect to the bonding flanges 25 and 26 due to existence of the steps 25a and 26a. When the outer cases 5 and 21 and the bonding flanges 25 and 26 are fixed to each other, it is possible to prevent the outer peripheries of the bonding flanges 25 and 26 from interfering with the fixing jigs such as the welding torch and the welding rod, and the machining operability of the outer cases 5 and 21 and the bonding flanges 25 and 26 can be enhanced.

Figure 16:
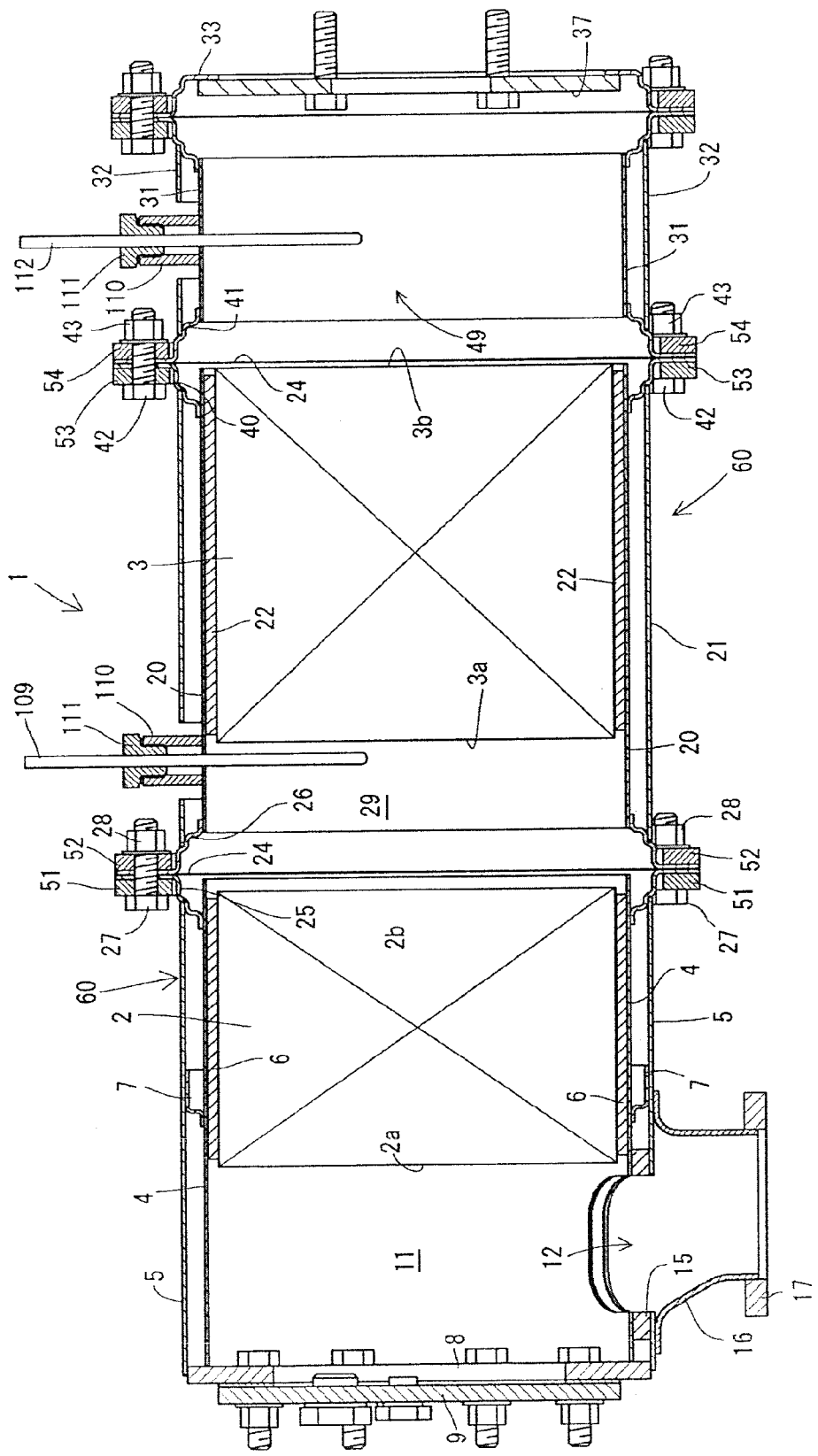
FIG. 16 is an explanatory sectional view of a modification of the DPF of a structure in which adjoining inner cases are not inserted to each other.
Figure 17:
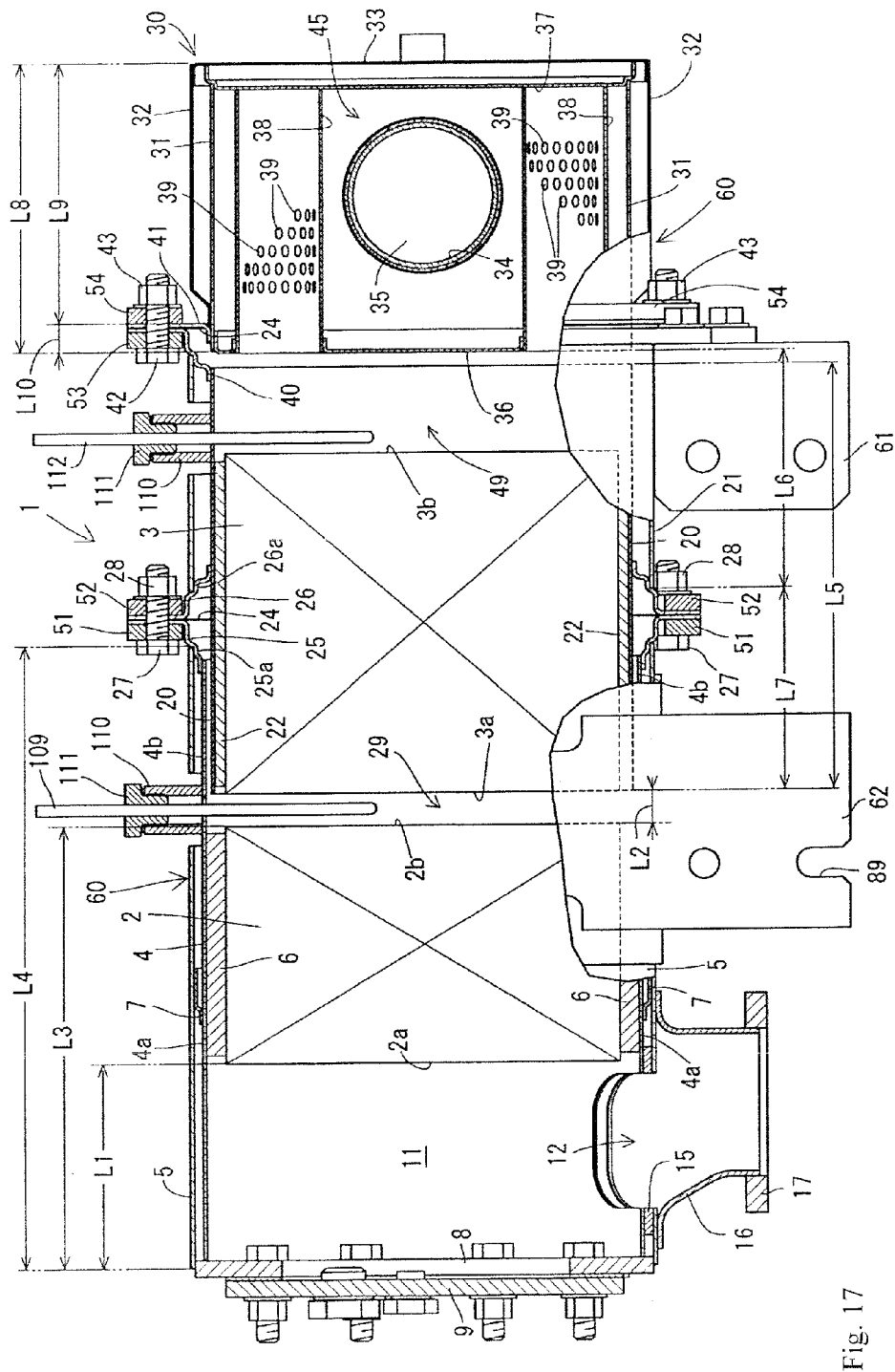
FIG. 17 is an explanatory sectional view of a modification of the DPF of a structure in which a heat shield case is omitted.

As apparent from the above description and FIGS. 1 and 9, the inner cases 4 and 20 are supported by the outer cases 5 and 21 in the state where the inner cases 4 and 20 are not in direct contact with the outer cases 5 and 21 due to the existence of the bonding flanges 25 and 26. Therefore, mechanical vibration and a deforming force externally applied to the catalyst outer cases 5 and 21 are less prone to be transmitted to the inner cases 4 and 20, and it is possible to prevent the inner cases 4 and 20 themselves and the gas purification bodies 2 and 3 therein from being damaged, and to prevent the gas purification bodies 2 and 3 from deviating in position. Since the outer cases 5 and 21 are fitted over the entire outer peripheral regions of the inner cases 4 and 20, the heat insulation layer (heat insulation region) can be secured over the entire outer peripheral regions of the inner cases 4 and 20. Hence, it is possible to reliably prevent the reduction in temperature of exhaust gas in the inner cases 4 and 20. It is also possible to prevent the increase in surface temperatures of the outer cases 5 and 21. The same function effects can be similarly obtained in modifications of the DPF 1 shown in FIGS. 16 and 17. According to the modification shown in FIG. 16, the adjoining inner cases 4 and 20 are not inserted, the bonding flanges 25 and 26 (40, 41) are superposed on each other and detachably connected to each other. In a DPF 1 according to the modification shown in FIG. 17, the heat shield case 190 is omitted, the inner diameter of the catalyst inner case 4 is set greater than the outer diameter of the filter inner case 20, and the exhaust gas upstream side of the filter inner case is inserted into the exhaust gas downstream side of the catalyst inner case 4.

As shown in the above description and FIGS. 1, 9, 12, and 14, the sensor boss bodies 110 and 113 for supporting the exhaust gas sensors 109, 112, and 63 are provided on the outer side surface of one of the adjoining inner cases 4 and 20. The sensor boss bodies 110 and 113 project radially outward from the boss body through holes 5a and 21a formed in the outer cases 5 and 21, and the collar 194 which surrounds the sensor boss bodies 110 and 113 and closes the boss body through holes 5a and 21a is fixed to the outer side surface of the one inner cases 4, 20. Therefore, it is possible to enhance the connection strength between the outer cases 5 and 21 and the inner cases 4 and 20 due to the existence of the collar 194. Further, it is possible to easily and reliably prevent the exhaust gas in the inner cases 4 and 20 from leaking from the boss body through holes 5a and 21a.

Further, as compared with the conventional structure in which one of the inner cases is provided with the diameter-enlarged portion to tightly fit both the inner cases to each other, distances between the end surfaces of the gas purification bodies 2 and 3 and the mounting positions of the exhaust gas sensors 109, 112, and 63 can be set to the shortest distances (zero or arbitrary sizes) without being influenced by pipe-spreading margins of the inner cases 4 and 20 and radii and welding margins of the sensor boss bodies 110 and 113. As a result, the entire length of the DPF 1 can be shortened, and the DPF 1 can be easily provided in various kinds of devices. Since the exhaust gas sensors 109, 112, and 63 can be close to the end surfaces of the gas purification bodies 2 and 3 until the sensors come into contact with the end surfaces of the gas purification bodies 2 and 3. Therefore, control performance such as automatic regeneration of the DPF 1 can be enhanced.

As apparent from the above description and FIGS. 13 and 14, the pipe 68 of the differential pressure sensor 63 as the exhaust gas sensor is connected to the sensor boss body 113, and the pipe 68 extends along the outer side surfaces of the outer cases 5 and 21. Therefore, the pipe 68 is close to the outer side surfaces of the outer cases 5 and 21. Hence, when the DPF 1 is assembled into the engine 70, the pipe 68 does not hinder so much, and the handling performance and mounting performance of the DPF 1 are excellent. Therefore, it is easy to carry out the mounting and assembling operations of the DPF 1.

2. Second Embodiment

FIGS. 18 to 34 show a second embodiment of the invention of the application. The second embodiment is different from the first embodiment in the structures of the exhaust gas inlet pipe 16 and the silencer 30 but is basically the same as the first embodiment. Differences from the first embodiment will be mainly described below.

2-1. Outline Structure of DPF

As shown in FIGS. 18 and 31 to 34, a DPF 1 of the second embodiment is formed into a substantially cylindrical shape extending in the lateral direction which is in parallel to an output shaft (crankshaft) of a diesel engine 70. The DPF 1 is disposed on an exhaust manifold 71 of the engine 70. An exhaust gas inlet pipe 16 (exhaust gas intake side) and an exhaust gas outlet pipe 34 (exhaust gas downstream side) are provided on right and left sides of the DPF 1 (one end side and the other end side of moving direction of exhaust gas), i.e., on right and left sides of the diesel engine 70. The exhaust gas inlet pipe 16 which is the exhaust gas intake side of the DPF 1 is detachably fastened to the exhaust manifold 71 of the diesel engine 70 through a bolt. A tail pipe (not shown) is connected to the exhaust gas outlet pipe 34 which is the exhaust gas downstream side of the DPF 1.

As shown in FIGS. 18 to 21, a diesel oxidation catalyst 2 such as platinum and a soot filter 3 of a honeycomb structure are arranged in series and accommodated in a DPF casing 60 made of heatproof metal material through cylindrical inner cases 4 and 20. As shown in FIGS. 14 to 17, the DPF 1 is mounted on a cylinder head 72 and an exhaust manifold 71 of the diesel engine 70 through flange-side bracket legs 61a and 61b and casing-side bracket legs 62a and 62b as support bodies.

In this case, base ends of the flange-side bracket legs 61a and 61b are detachably fastened, through bolts, to a filter-side bonding flange 26 (details thereof will be described later) located on the outer periphery side of the DPF casing 60. A base end of the casing-side bracket leg 62a is integrally welded and fixed to the exhaust gas inlet pipe 16 located on the outer periphery side of the DPF casing 60. A base end of the other casing-side bracket leg 62b is detachably fastened to an outer lid body 9 (details thereof will be described later) through bolts. Tip ends of the flange-side bracket legs 61a and 61b are detachably fastened, through bolts, to a side surface of the cylinder head 72 on the side of a cooling fan 76 and a surface of the cylinder head 72 on the side of the exhaust manifold 71. A tip end of the one casing-side bracket leg 62a is detachably fastened to a side surface of the exhaust manifold 71 through a bolt. A tip end of the other casing-side bracket leg 62b is detachably fastened to a side surface of the cylinder head 72 on the side of the flywheel housing 78 through a bolt.

An inlet flange body 17 (details thereof will be described later) of the exhaust gas inlet pipe 16 is fastened to the exhaust gas discharging side of the exhaust manifold 71. According to this configuration, the DPF 1 is communicated with and connected to the exhaust manifold 71 through the exhaust gas inlet pipe 16. As a result, the DPF 1 is stably connected to and supported by the exhaust manifold 71 and the cylinder head 72 which are high rigid parts of the diesel engine 70 by the bracket legs 61a, 61b, 62a, and 62b. Therefore, it is possible to prevent the DPF 1 from being damaged by vibration.

2-2. Structure of Diesel Oxidation Catalyst

Figure 18:
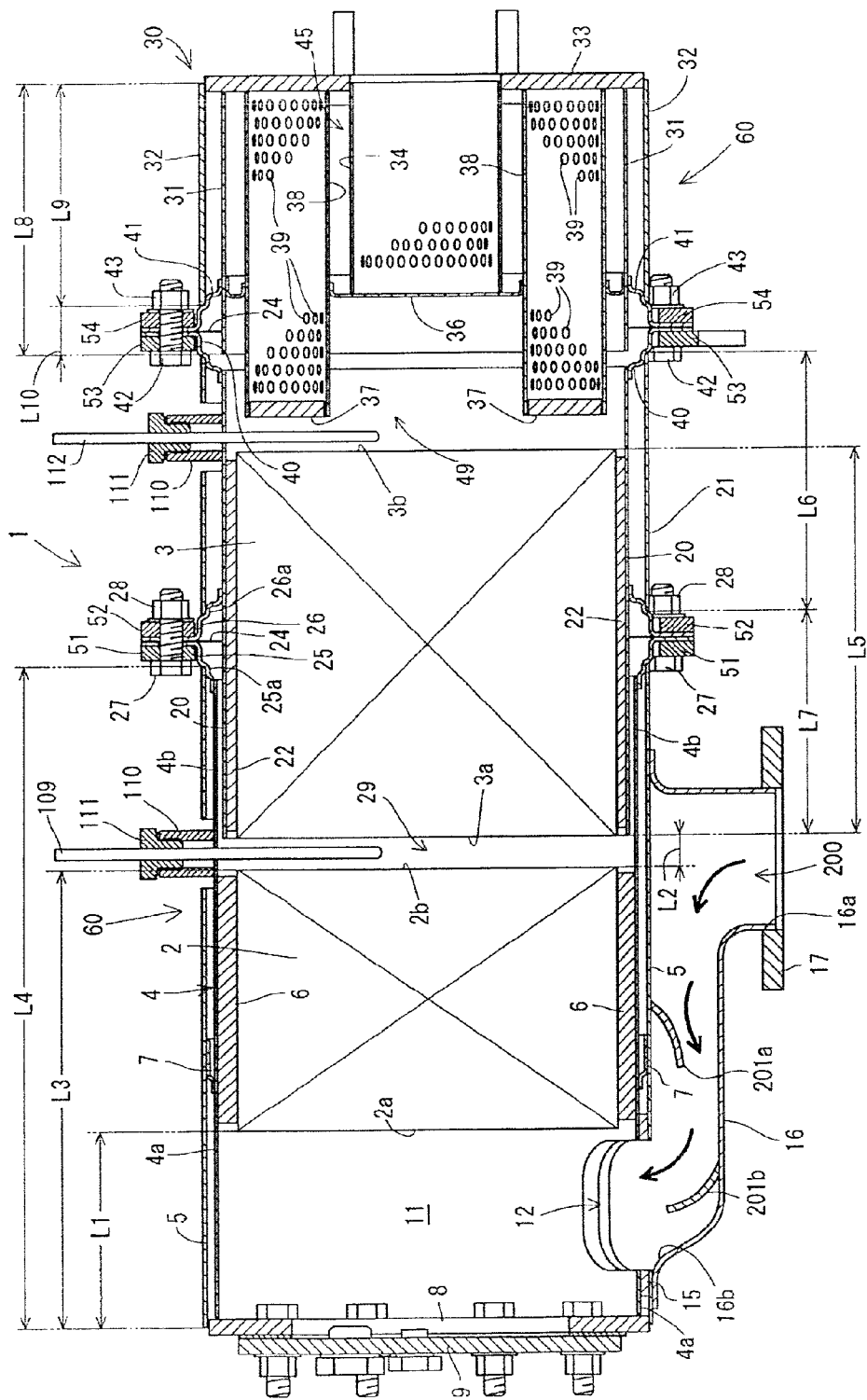
FIG. 18 is an explanatory sectional view of a DPF in a second embodiment.
Figure 19:
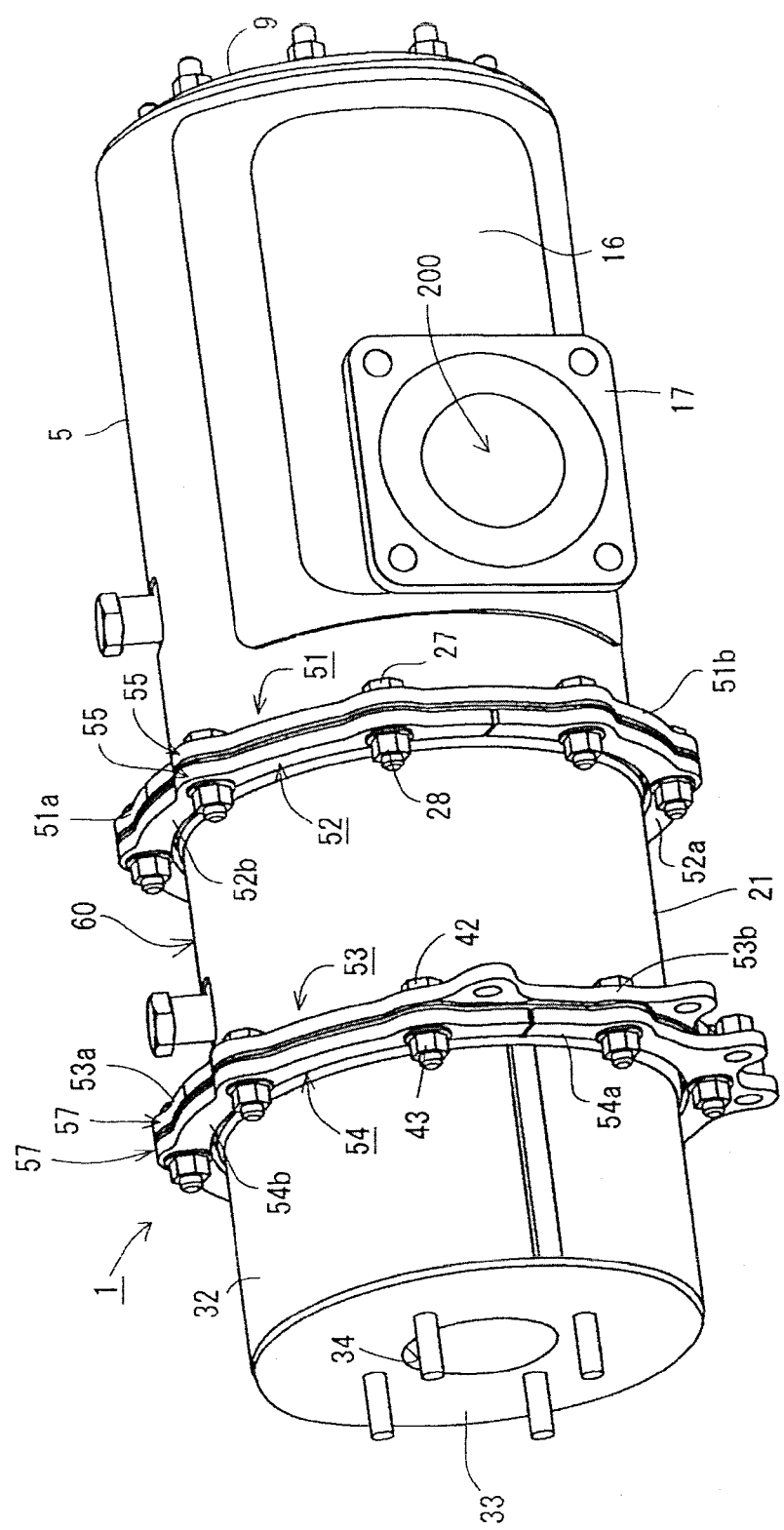
FIG. 19 is an external perspective view of the DPF.
Figure 20:
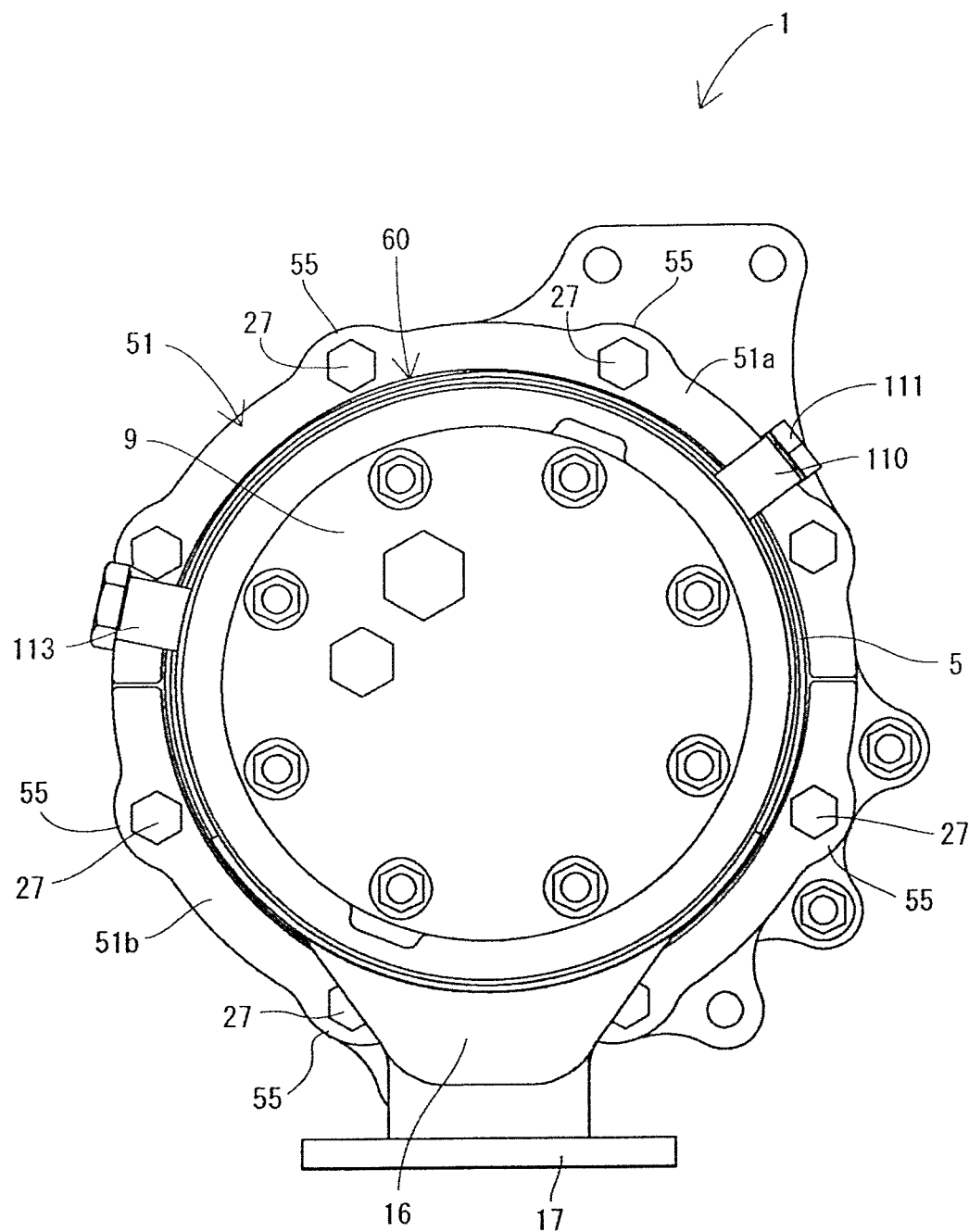
FIG. 20 is an external side view of an exhaust gas upstream side in the DPF.
Figure 21:
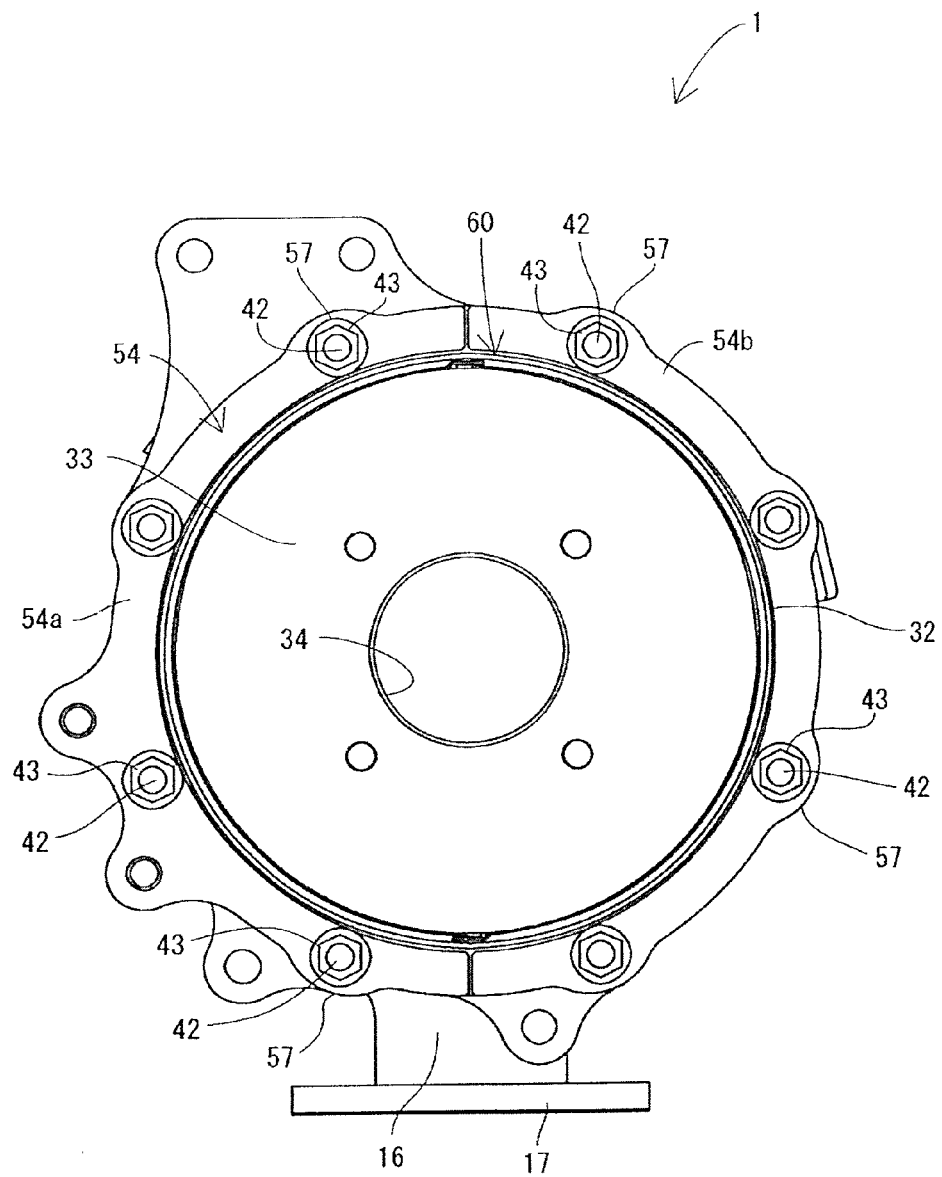
FIG. 21 is an external side view of an exhaust gas downstream side in the DPF.
Figure 22:
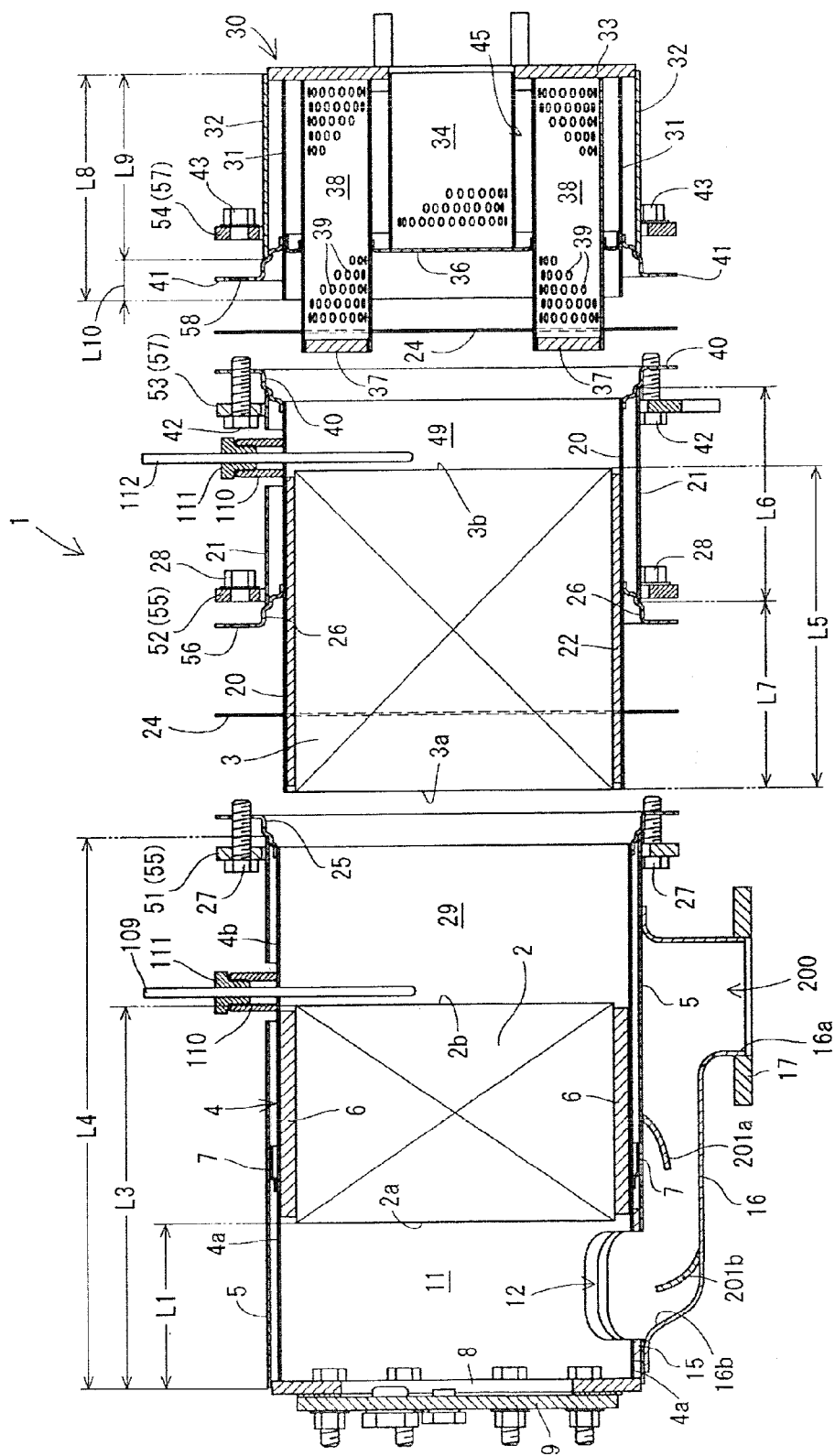
FIG. 22 is an explanatory separation sectional view of the DPF.
Figure 23:
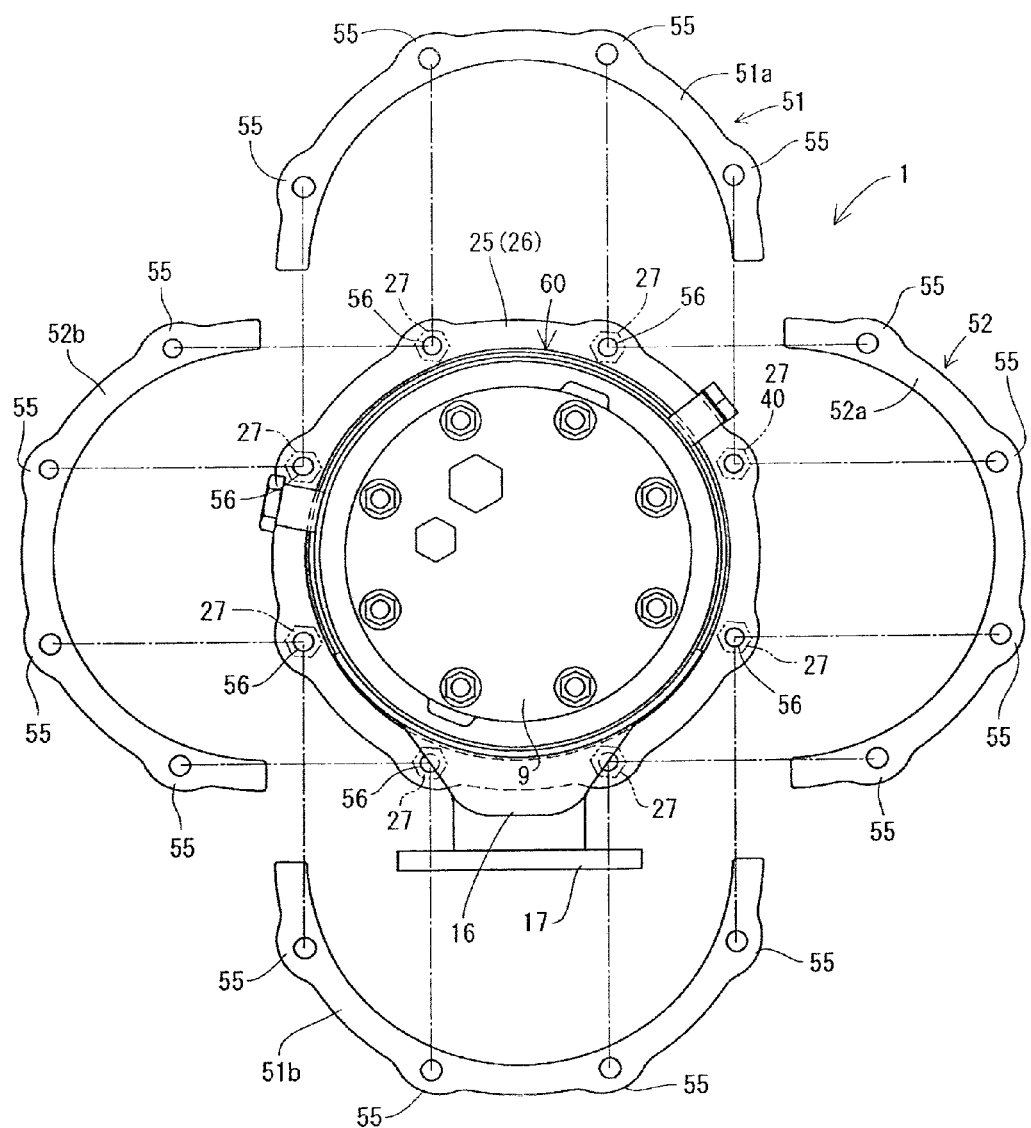
FIG. 23 is a separation side view of grasping flanges.
Figure 26:
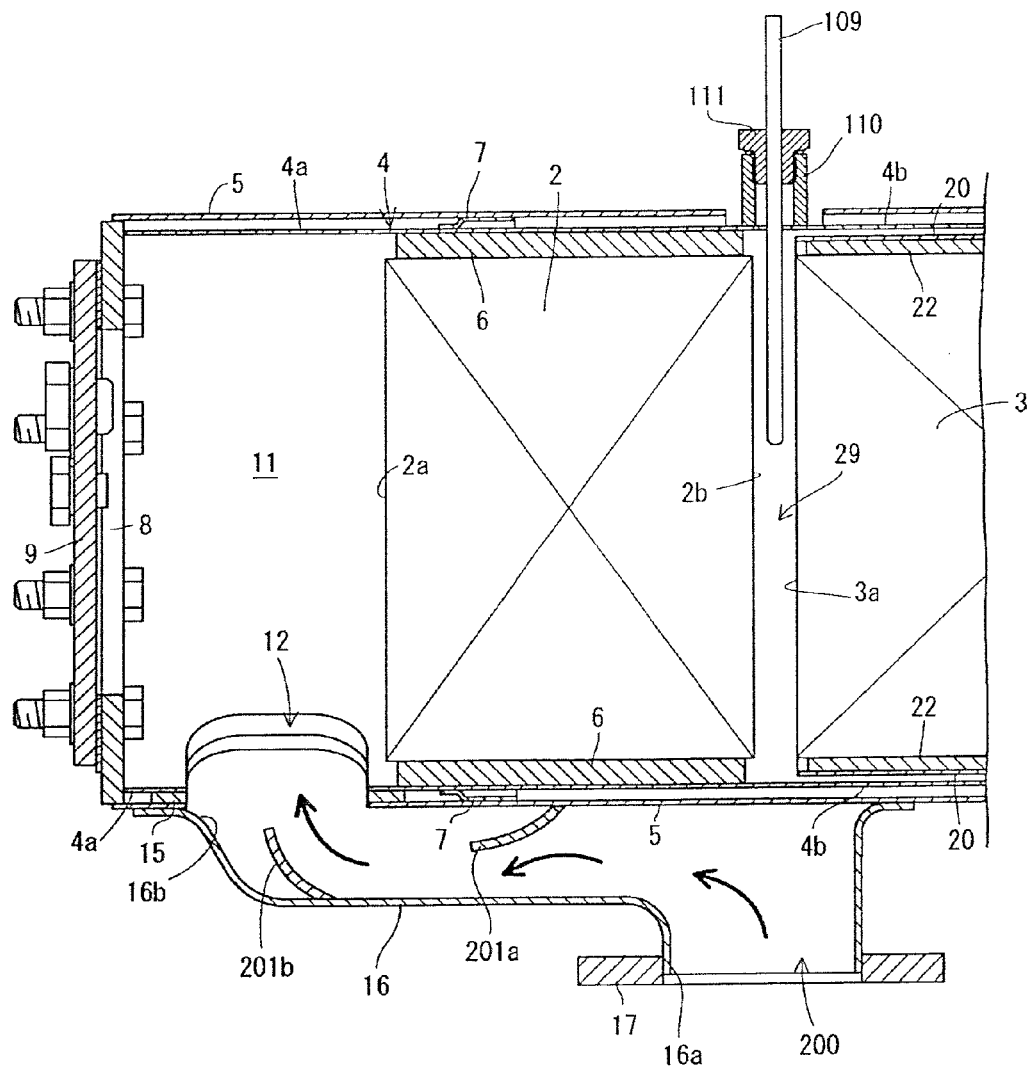
FIG. 26 is an enlarged side sectional view of the DPF on the exhaust gas upstream side.
Figure 27:
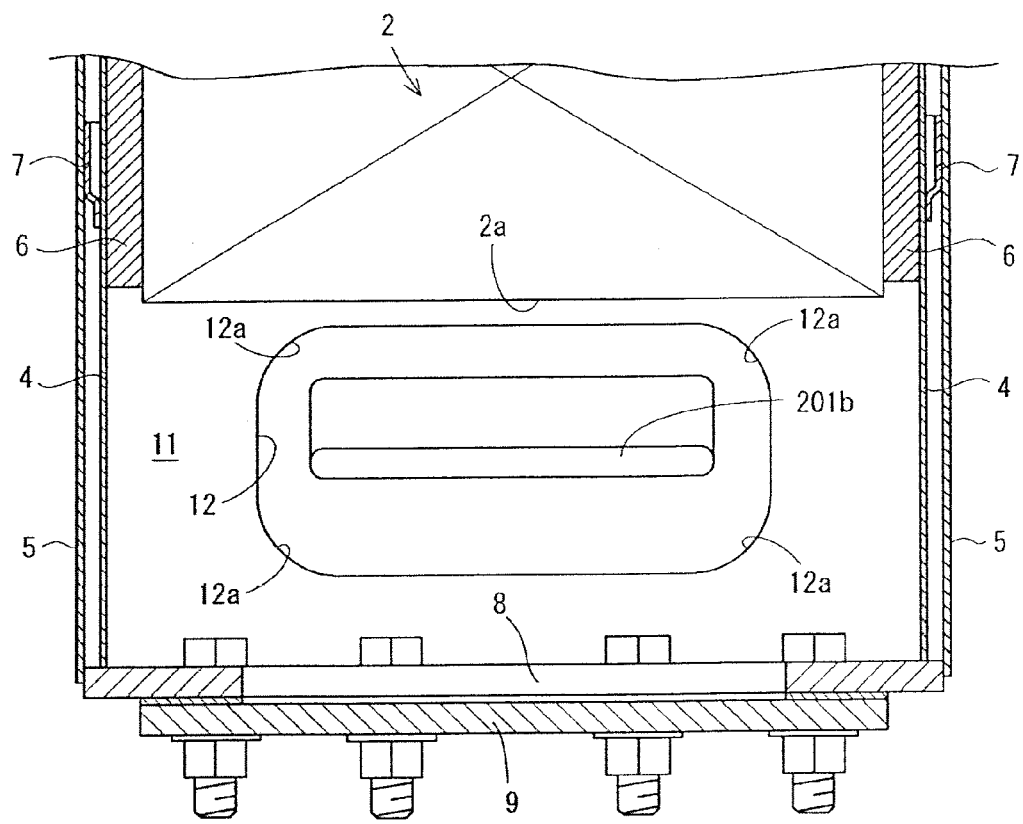
FIG. 27 is an enlarged plan sectional view of the DPF on the exhaust gas upstream side.

Next, a structure of the diesel oxidation catalyst 2 will be described with reference to FIGS. 18, 22, and 26 and the like. As shown in FIGS. 18, 22, 26 and 27, the exhaust gas inflow opening 12 formed in the catalyst inner case 4 and the catalyst outer case 5 opens in a rectangular form. Four corners of the exhaust gas inflow opening 12 are formed into are shapes. That is, the four corners 12a of the exhaust gas inflow opening 12 are rounded. According to this configuration, the exhaust gas inflow opening 12 opens in the rectangular form, and the opening area is made as wide as possible. Therefore, although the inflow resistance of exhaust gas is prevented from increasing, since the four corners 12a are formed into the arc shapes, it is possible to prevent the disturbed flow of exhaust gas passing through the exhaust gas inflow opening 12. Therefore, variation of inflow pressure of exhaust gas passing through the exhaust gas inflow opening 12 is reduced, and it is possible to flow the exhaust gas into the exhaust gas inflow opening 12 as uniform as possible.

As shown in FIGS. 18, 22 and 26, the exhaust gas inlet pipe 16 is disposed in the outer side surface of the catalyst outer case 5 in which the exhaust gas inflow opening 12 is formed. The exhaust gas inlet pipe 16 is formed into a semi-cylindrical shape which opens upward, and is welded and fixed to the outer side surface of the catalyst outer case 5 such that a rectangular upwardly opening end 16b which is on a large diameter side covers the exhaust gas inflow opening 12, and extends in a longitudinal (lateral) direction of the catalyst outer case 5. Therefore, the upwardly opening end 16h which is the exhaust gas downstream side of the exhaust gas inlet pipe 16 is communicated with and connected to the exhaust gas inflow opening 12 of the catalyst outer case 5. A perfect circular downwardly opening end 16a having a small diameter opens, as an exhaust gas intake side, in a right end of the exhaust gas inlet pipe 16 which is closer to a halfway portion of the catalyst outer case 5 in the longitudinal direction, and the inlet flange body 17 is welded and fixed to an outer periphery of the downwardly opening end 16a. The inlet flange body 17 is detachably fastened to the exhaust gas downstream side of the exhaust manifold 71 through a bolt.

As shown in FIGS. 18, 22, and 26, a left end of the exhaust gas inlet pipe 16 covers the exhaust gas inflow opening 12 of the catalyst outer case 5 from outside. The downwardly opening end 16a as an exhaust gas inlet side is formed on a right end of the exhaust gas inlet pipe 16. That is, the downwardly opening end 16a of the exhaust gas inlet pipe 16 is provided on the substantially rectangular exhaust gas inflow opening 12 such that the downwardly opening end 16a is deviated toward the exhaust gas downstream side (downwardly opening end 16a is deviated rightward from catalyst outer case 5 in position). The upwardly opening end 16b of the exhaust gas inlet pipe 16 is welded and fixed to the outer side surface of the catalyst outer case 5 such that the upwardly opening end 16b covers the exhaust gas inflow opening 12 and extends in the longitudinal (lateral) direction of the catalyst outer case 5. Hence, an introducing passage 200 of exhaust gas is formed by an outer side surface of the catalyst outer case 5 and an inner side surface of the exhaust gas inlet pipe 16.

As shown in FIGS. 18, 22, and 26, at least one of the outer side surface of the catalyst outer case 5 and the inner side surface of the exhaust gas inlet pipe 16 is provided with rectifier fins 201a and 201b as rectifiers which rectify flow of exhaust gas. The rectifier fins 201a and 201b are formed into curved pieces. In this embodiment, the upstream side rectifier fin 201a located on the exhaust gas upstream side is welded and fixed to the outer side surface of the catalyst outer case 5. The downstream side rectifier fin 201b located on the exhaust gas downstream side is welded and fixed to the inner side surface of the exhaust gas inlet pipe 16. Both the rectifier fins 201a and 201b are deviated from each other so that they are not superposed on each other in a state where the exhaust gas inlet pipe 16 is welded and fixed to the outer side surface of the catalyst outer case 5. The upstream side rectifier fin 201a guides, in the longitudinal direction of the exhaust gas inlet pipe 16, exhaust gas which flows into the downwardly opening end 16a of the exhaust gas inlet pipe 16. The downstream side rectifier fin 201b guides exhaust gas in the introducing passage 200 toward the exhaust gas inflow space 11 through the exhaust gas inflow opening 12. Exhaust gas which flows from the exhaust manifold 71 into the exhaust gas inlet pipe 16 forms a substantially S-shaped flow as viewed from side by existence of both the rectifier fins 201a and 201b, and the exhaust gas is sent into the exhaust gas inflow opening 12.

According to this configuration, since exhaust gas can be smoothly sent into the DPF 1 by existence of both the rectifier fins 201a and 201b without being largely influenced by the shape of the exhaust gas inlet pipe 16. Therefore, it is possible to flow exhaust gas into the exhaust gas inflow space 11 and thus, into the diesel oxidation catalyst 2 as uniform as possible, and the entire region of the diesel oxidation catalyst 2 can be efficiently utilized. The upstream side rectifier fin 201a is welded and fixed to the outer side surface of the catalyst outer case 5 and the downstream side rectifier fin 201b is welded and fixed to the inner side surface of the exhaust gas inlet pipe 16 based on the assumption that the introducing passage 200 is formed by the outer side surface of the catalyst outer case 5 and the inner side surface of the exhaust gas inlet pipe 16. Therefore, although the rectifier fins 201a and 201b are located in the exhaust gas introducing passage 200, both the rectifier fins 201a and 201b can be mounted by a simple machining operation.

2-3. Structure of Soot Filter

Next, a structure of the soot filter 3 will be described with reference to FIGS. 18, 22 and 26. The soot filter 3 is provided in a substantially cylindrical filter inner case 20 made of heatproof metal material. The filter inner case 20 is provided in a substantially cylindrical filter outer case 21 made of heatproof metal material. That is, the filter inner case 20 is fitted over the soot filter 3 through a mat-shaped filter heat insulator 22 made of ceramic fiber. The filter outer case 21 is one of elements constituting the DPF casing 60 together with the catalyst outer case 5. The soot filter 3 is protected by press-fitting the filter heat insulator 22 between the soot filter 3 and the filter inner case 20.

As shown in FIGS. 18, 22, and 26, the catalyst inner case 4 is a cylindrical in shape having a straight ridge line and includes an upstream side cylindrical portion 4a in which the diesel oxidation catalyst 2 is accommodated and a downstream side cylindrical portion 4b into which the later-described filter inner case 20 is inserted. The upstream side cylindrical portion 4a and the downstream side cylindrical portion 4b are cylinders having substantially the same diameters and are integrally formed. The catalyst inner case 4 further includes a thin ring-like catalyst-side bonding flange 25 which is welded and fixed to an outer periphery of the catalyst inner case 4, and a thin ring-like filter-side bonding flange 26 which is welded and fixed to an outer periphery of the filter inner case 20. The catalyst-side bonding flange 25 and the filter-side bonding flange 26 are formed into doughnut shapes having substantially L-shaped cross sections.

An inner periphery of the catalyst-side bonding flange 25 is welded and fixed to an end of the downstream side cylindrical portion 4b of the catalyst inner case 4. The outer periphery of the catalyst-side bonding flange 25 projects toward the outer periphery (radial direction) of the catalyst outer case 5. A bent angle portion of the catalyst-side bonding flange 25 is a step-wise step 25a. An exhaust gas-downstream side end of the catalyst outer case 5 is welded and fixed to the step 25a of the catalyst-side bonding flange 25. An inner periphery of the filter-side bonding flange 26 is welded and fixed to a longitudinally halfway portion (halfway portion in moving direction of exhaust gas) of the outer periphery of the filter inner case 20. An outer periphery of the filter-side bonding flange 26 projects toward the outer periphery (radial direction) of the filter outer case 21. A bent angle portion of the filter-side bonding flange 26 is also formed into a step-wise step 26a. An exhaust gas upstream side end of the filter outer case 21 is welded and fixed to the step 26a of the filter-side bonding flange 26. The filter inner case 20 is a cylindrical in shape having a straight ridge line. The exhaust gas upstream side end and the exhaust gas downstream side end of the filter inner case 20 are cylinders having substantially the same diameters and integrally formed.

An outer diameter of the diesel oxidation catalyst 2 and an outer diameter of the soot filter 3 are equal to each other. A thickness of the catalyst heat insulator 6 is greater than that of the filter heat insulator 22. The catalyst inner case 4 and the filter inner case 20 are formed from material having the same thickness. An outer diameter of the filter inner case 20 is smaller than an inner diameter of the downstream side cylindrical portion 4b of the catalyst inner case 4. A downstream side gap 23 is formed between the inner peripheral surface of the catalyst inner case 4 and the outer peripheral surface of the filter inner case 20. The downstream side gap 23 has a size (e.g., 2 mm) which is greater than thicknesses (e.g., 1.5 mm) of the cases 4 and 20. According to this configuration, even if the cases 4 and 20 become rusty or thermally deformed, the exhaust gas upstream side end of the filter inner case 20 can be easily put into or pulled out from the downstream side cylindrical portion 4b of the catalyst inner case 4.

As shown in FIGS. 18 to 22 and 25, the catalyst-side bonding flange 25 and the filter-side bonding flange 26 are butted against each other through a gasket 24. The bonding flanges 25 and 26 are sandwiched from both sides in the moving direction of exhaust gas by a pair of thick central grasping flanges 51 and 52 which surround outer peripheries of the outer cases 5 and 21. The central grasping flanges 51 and 52 are fastened to each other through bolt 27 and nut 28 to sandwich the bonding flanges 25 and 26 between the central grasping flanges 51 and 52. According to this configuration, the catalyst outer case 5 and the filter outer case 21 are detachably connected to each other.

Figure 25:
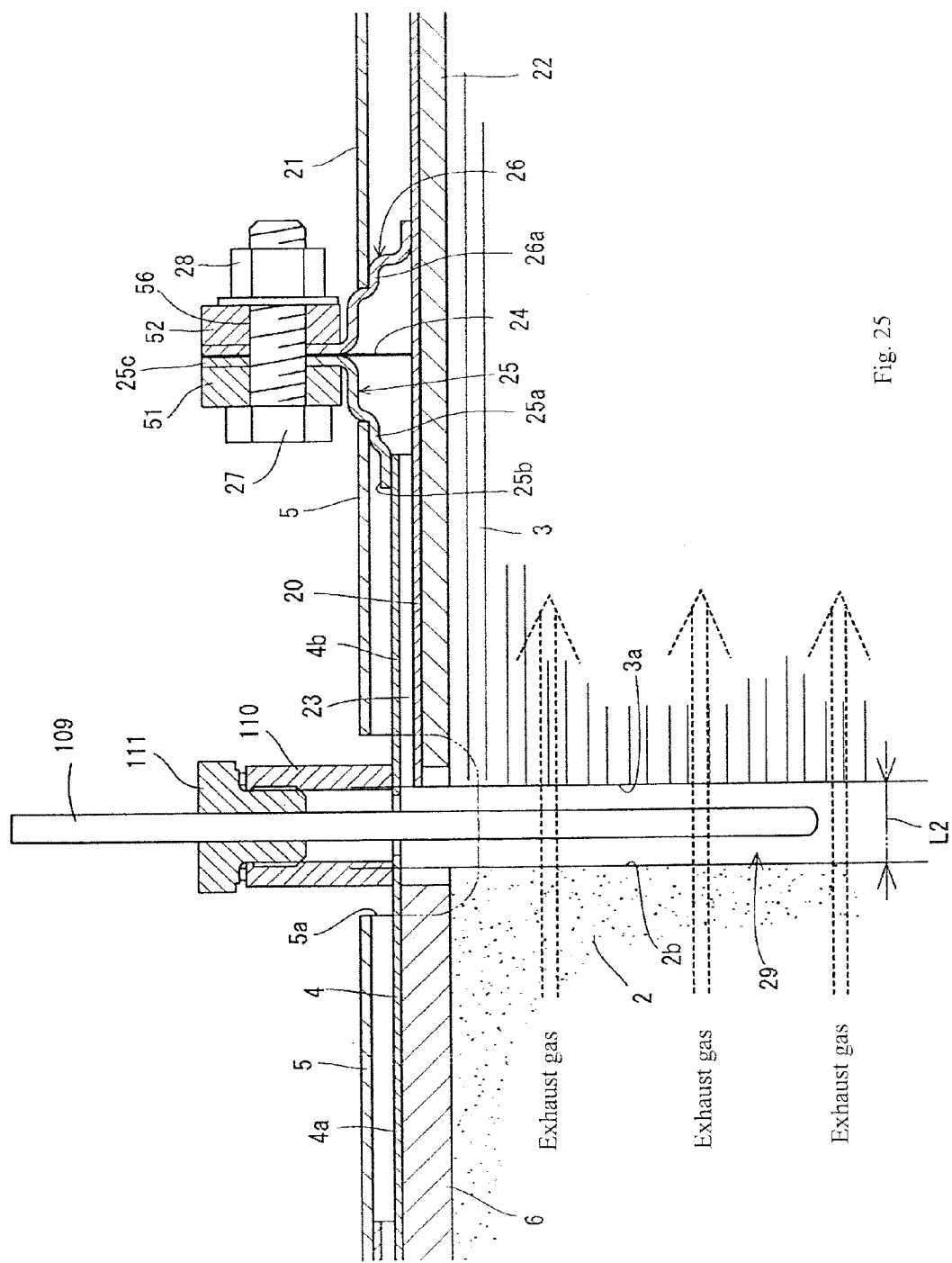
FIG. 25 is an enlarged sectional view showing a mounting portion of a sensor boss body located on the exhaust gas upstream side.

As shown in FIGS. 18 and 25, in a state where the exhaust gas upstream side end of the filter outer case 21 is connected to the exhaust gas-downstream side end of the catalyst outer case 5 through the central grasping flanges 51 and 52 and the bonding flanges 25 and 26, a catalyst downstream side space 29 is formed between the diesel oxidation catalyst 2 and the soot filter 3. That is, a gas outflow end surface 2b of the diesel oxidation catalyst 2 and an intake side end surface 3a of the soot filter 3 (filter inner case 20) are opposed to each other at a sensor mounting distance L2 from each other.

As shown in FIGS. 18 and 22, a cylinder length L4 of the catalyst outer case 5 in the exhaust gas moving direction is longer than a cylinder length L3 of the upstream side cylindrical portion 4a of the catalyst inner case 4 in the exhaust gas moving direction. A cylinder length L6 of the filter outer case 21 in the exhaust gas moving direction is shorter than a cylinder length L5 of the filter inner case 20 in the exhaust gas moving direction. A total length (L2+L3+L5) of the sensor mounting distance L2 of the catalyst downstream side space 29, the cylinder length L3 of the upstream side cylindrical portion 4a of the catalyst inner case 4, and the cylinder length L5 of the filter inner case 20 is substantially equal to a total length (L4+L6) of the cylinder length L4 of the catalyst outer case 5 and the cylinder length L6 of the filter outer case 21.

The exhaust gas upstream side end of the filter inner case 20 projects from the exhaust gas upstream side end of the filter outer case 21 by a length difference (L7≈L5−L6) between the cases 20 and 21. Hence, in a state where the filter outer case 21 is connected to the catalyst outer case 5, the exhaust gas upstream side end of the filter inner case 20 is inserted into the exhaust gas-downstream side of the catalyst outer case 5 (downstream side cylindrical portion 4b of catalyst inner case 4) by the upstream side size L7 of the filter inner case 20 projecting from the filter outer case 21. That is, the exhaust gas upstream side of the filter inner case 20 is inserted into the downstream side cylindrical portion 4b (catalyst downstream side space 29) such that the exhaust gas upstream side of the filter inner case 20 can be pulled out. As can be found from the above description and FIG. 1, a flange body (catalyst-side bonding flange 25 and filter-side bonding flange 26) which connects the catalyst outer case 5 and the filter outer case 21 to each other is deviated from a connection boundary position (catalyst downstream side space 29) between the diesel oxidation catalyst 2 and the soot filter 3. In other words, mounting positions of the catalyst-side bonding flange 25 and the filter-side bonding flange 26 are deviated from the catalyst downstream side space 29.

2-4 Structure of Silencer

Figure 28:
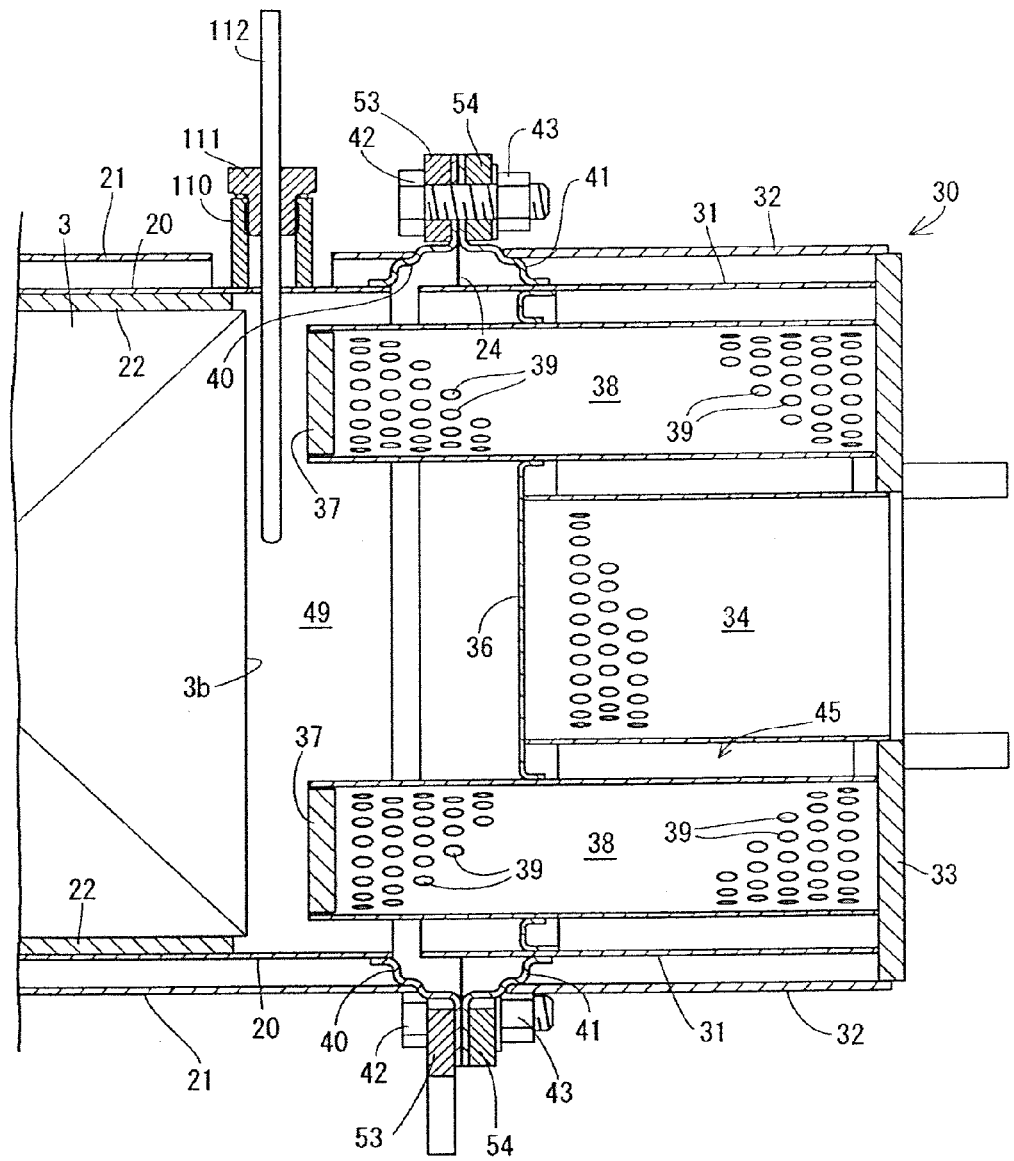
FIG. 28 is an enlarged plan sectional view of the DPF on the exhaust gas downstream side.

Next, a structure of the silencer 30 will be described with reference to FIGS. 18, 22, and 28. As shown in FIGS. 18, 22, and 28, the silencer 30 which reduces sound of exhaust gas discharged from the diesel engine 70 includes a substantially cylindrical silencing inner case 31 made of heatproof metal material, a substantially cylindrical silencing outer case 32 made of heatproof metal material, and a disk-like side lid body 33 fixed to an exhaust gas downstream side end of the silencing outer case 32 by welding. The silencing inner case 31 is provided in the silencing outer case 32. The silencing outer case 32 forms the DPF casing 60 together with the catalyst outer case 5 and the filter outer case 21. A diameter of the cylindrical silencing outer case 32 is substantially equal to those of the cylindrical catalyst outer case 5 and the cylindrical filter outer case 21.

A disk-like inner lid body 36 is fixed to a halfway portion in the silencing inner case 31 by welding. A pair of exhaust gas introducing pipes 38 extending in parallel to the exhaust gas moving direction is provided in the silencing inner case 31. An exhaust gas upstream side of each of the exhaust gas introducing pipes 38 penetrates an upstream inner lid body 36 and projects into the filter inner case 20 (filter downstream side space 49, details thereof will be described later). The exhaust gas upstream side end of each of the exhaust gas introducing pipes 38 is closed by the downstream inner lid body 37. A large number of communication holes 39 are formed in each of the exhaust gas introducing pipes 38. The communication holes 39 are also formed in the exhaust gas introducing pipe 38 at location closer to the exhaust gas upstream side than the upstream inner lid body 36. Each of the exhaust gas introducing pipes 38 is in communication with an expansion chamber 45 through the communication holes 39. The expansion chamber 45 is formed in the silencing inner case 31 (between upstream inner lid body 36 and side lid body 33).

The exhaust gas outlet pipe 34 disposed between the exhaust gas introducing pipes 38 penetrates the side lid body 33 of the silencing outer case 32. The exhaust gas upstream side of the exhaust gas outlet pipe 34 is closed by the inner lid body 36. A large number of exhaust holes 46 are formed in a portion of the exhaust gas outlet pipe 34 located in the silencing inner case 31. The exhaust gas introducing pipes 38 are in communication with the exhaust gas outlet pipe 34 through the large number of communication holes 39, the expansion chamber 45 and the large number of exhaust gas holes 46. A tail pipe (not shown) is connected to the other end of the exhaust gas outlet pipe 34. In the above-described configuration, exhaust gas which enters each of the exhaust gas introducing pipes 38 of the silencing inner case 31 passes through the exhaust gas outlet pipe 34 through the plurality of communication holes 39, the expansion chamber 45, and the large number of exhaust gas holes 46, and is discharged from the silencer 30 through the tail pipe.

As shown in FIGS. 18, 22, 28, and 29, an inner diameter side of the thin ring-like filter outlet-side bonding flange 40 is welded and fixed to the exhaust gas downstream side end of the filter inner case 20. An outer diameter side of the filter outlet-side bonding flange 40 protrudes toward an outer periphery (radial direction, radially outward direction) of the filter outer case 21. The exhaust gas downstream side end of the filter outer case 21 is welded and fixed to the outer periphery of the filter outlet-side bonding flange 40. A thin silencing-side bonding flange 41 protruding toward the outer periphery (radially outward) of the silencing outer case 32 is welded and fixed to the exhaust gas upstream side end of the silencing inner case 31. The exhaust gas upstream side end of the silencing outer case 32 is welded and fixed to the outer periphery of the silencing-side bonding flange 41. The exhaust gas upstream side end of the silencing inner case 31 projects toward the exhaust gas upstream side of the silencing-side bonding flange 41 by a predetermined cylinder size L10. The filter inner case 20 and the silencing inner case 31 are cylinders having substantially the same diameters, and the filter outer case 21 and the silencing outer case 32 are cylinders having substantially the same diameters.

As shown in FIGS. 18 to 21 and 23, the filter outlet-side bonding flange 40 and the silencing-side bonding flange 41 are abutted against each other through the gasket 24, and the bonding flanges 40 and 41 are sandwiched from both sides in the exhaust gas moving direction by a pair of thick outlet grasping flanges 53 and 54 which surround outer peripheries of the outer cases 21 and 32. The outlet grasping flanges 53 and 54 are fastened to the bonding flanges 40 and 41 through bolts 42 and nuts 43. According to this operation, the filter outer case 21 and the silencing outer case 32 are detachably connected to each other.

As shown in FIGS. 18 and 22, a cylinder length L9 of the silencing outer case 32 in the exhaust gas moving direction is shorter than a cylinder length L8 of the silencing inner case 31 in the exhaust gas moving direction. The exhaust gas upstream side end of the silencing inner case 31 projects from the exhaust gas upstream side end (bonding flange 41) of the silencing outer case 32 by a length difference (L10≈L8−L9) between the cases 31 and 32. That is, in a state where the silencing outer case 32 is connected to the filter outer case 21, the exhaust gas upstream side end of the silencing inner case 31 is inserted into the filter downstream side space 49 formed in the exhaust gas downstream side end (filter outlet-side bonding flange 40) of the filter outer case 21 by the size L10 by which the upstream side end of the silencing inner case 31 projects. Especially in this embodiment, the exhaust gas upstream side end of each of the exhaust gas introducing pipes 38 projects forward of the exhaust gas upstream side end of the silencing inner case 31 (toward the exhaust gas upstream side). That is, the exhaust gas upstream side of each of the exhaust gas introducing pipes 38 enters the filter inner case 20 (see FIGS. 18, 22, 28 and 29). As can be found from the above description and FIG. 18, the flange bodies (filter outlet-side bonding flange 40 and the silencing-side bonding flange 41) which connect the filter outer case 21 and the silencing outer case 32 are deviated from the connection boundary position (filter downstream side space 49) of the soot filter 3. In other words, the mounting positions of the filter outlet-side bonding flange 40 and the silencing-side bonding flange 41 are deviated from the filter downstream side space 49.

According to this configuration, the length of each of the exhaust gas introducing pipes 38 in the exhaust gas moving direction can be secured, and the length of the silencer 30 (silencing outer case 32) in the exhaust gas moving direction can be shortened. Therefore, the entire DPF 1 having the silencer 30 can be made compact and the silencing function of the silencer 30 can be maintained and enhanced. Especially in this embodiment, the halfway portion in the silencing inner case 31 is closed by the disk-like inner lid body 36, the inner lid body 36 penetrates the exhaust gas upstream side of the exhaust gas introducing pipe 38, and the communication holes 39 are also formed in the exhaust gas introducing pipe 38 at location closer to exhaust gas upstream than the inner lid body 36. The communication holes 39 closer to the exhaust gas upstream side than the inner lid body 36 contributes to a taking-in operation into the silencer 30. Hence, the length of the silencer 30 (silencing outer case 32) in the exhaust gas moving direction can be shortened, the moving distance of the exhaust gas itself can be sufficiently secured, and the silencing function of the silencer 30 can be further enhanced.

2-5. Connecting Structure of Adjoining Outer Cases

The connecting structure of the adjoining outer cases 5, 21, and 32 will be described with reference to FIGS. 18 to 21 and 23. In the second embodiment, like the first embodiment, the exhaust gas purification device includes the gas purification bodies 2 and 3 which purify exhaust gas discharged from the engine 70, the inner cases 4, 20, and 31 in which the gas purification bodies 2 and 3 are incorporated, and the outer cases 5, 21, and 32 in which the inner cases 4, 20, and 31 are incorporated. The inner cases 4, 20, and 31 are connected to the outer cases 5, 21, and 32 through the bonding flanges 25, 26, 40, and 41 which protrudes toward outer peripheries of the outer cases 5, 21, and 32. The connecting structure includes a plurality of sets of a combination of the gas purification bodies 2 and 3, the inner cases 4, 20, and 31 and the outer cases 5, 21, and 32. The bonding flanges 25 and 26 (40, 41) are sandwiched between and fixed by the pair of grasping flanges 51 and 52 (53, 54), thereby connecting the plurality of outer cases 5, 21, and 32 to each other.

Therefore, the adjoining bonding flanges 25 and 26 (40, 41) can be sandwiched from both sides by the grasping flanges 51 and 52 (53, 54) and can be (tightly) connected to each other under pressure. Further, substantially uniform pressure contacting force can be applied to the entire bonding flanges 25 and 26 (40, 41), and high surface pressure of the sealing surfaces (sandwiching surfaces) of the grasping flanges 51 to 54 can be maintained. As a result, it is possible to reliably prevent exhaust gas from leaking between the bonding flanges 25 and 26 (40, 41). Although the grasping flanges 51 to 54 are formed from the plurality of semi-arc bodies 51a and 51b (52a, 52b, 53a, 53b, 54a, 54b), they can be assembled in the same manner as one integral member as in the first embodiment.

2-6. Details of Structure of Bonding Flange

Figure 24:
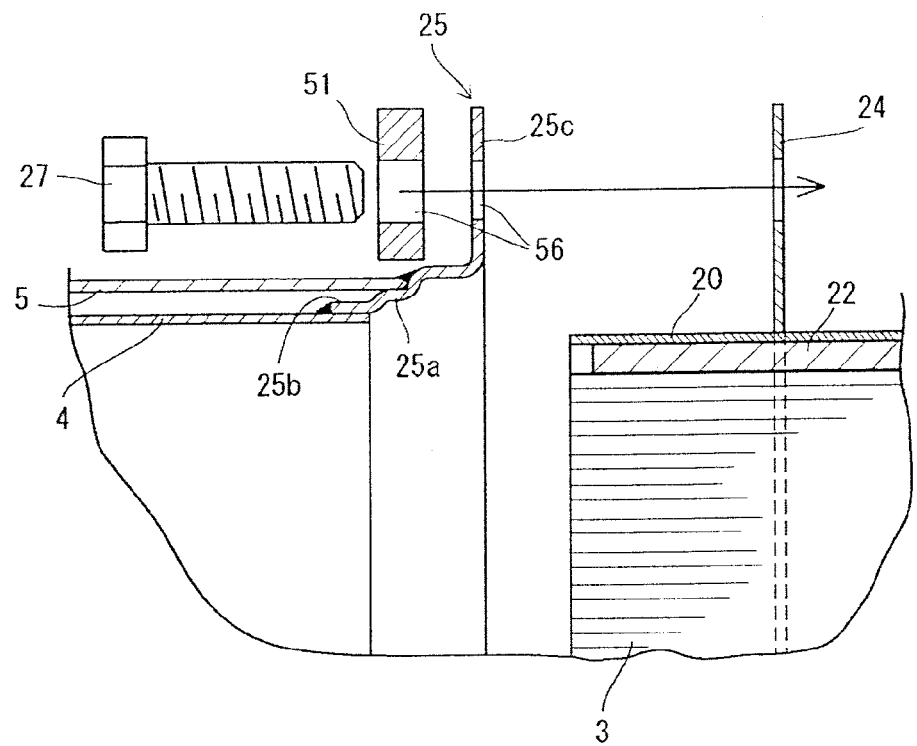
FIG. 24 is an enlarged side sectional view of a catalyst-side bonding flange.

Next, a detailed structure of the bonding flanges 25, 26 and 40 will be described. Since the bonding flanges 25, 26, and 40 basically have the same structures, the catalyst-side bonding flange 25 which is welded and fixed to the catalyst inner case 4 and the catalyst outer case 5 will be described as a representative example with reference to FIG. 24. As shown in FIG. 24, the step-wise step 25a is formed on the bent angle portion of the catalyst-side bonding flange 25. The exhaust gas downstream side end of the catalyst outer case 5 is fitted over the step 25a, and the step 25a is welded and fixed to the exhaust gas downstream side end of the catalyst outer case 5.

An L-shaped inner diameter-side end 25b in the catalyst-side bonding flange 25 extends in the exhaust gas moving direction of the catalyst inner case 4 (catalyst outer case 5). The inner diameter-side end 25b is fitted over the exhaust gas downstream side end of the catalyst inner case 4, and is welded and fixed to the catalyst inner case 4. An L-shaped outer diameter-side end 25c in the catalyst-side bonding flange 25 extends in the radial direction (vertical direction) from the outer periphery of the catalyst outer case 5. High rigidity of the catalyst-side bonding flange 25 is secured due to the existence of the L-shaped cross section of the catalyst-side bonding flange 25 and the step 25a.

The nuts 28 are threadedly engaged with the bolts 27 which pass through the bolt holes 56 in the grasping flanges 51 and 52 and the bonding flanges 25 and 26, thereby fastening the grasping flanges 51 and 52 and the bonding flanges 25 and 26 to each other, and the outer diameter-side end 25c of the catalyst-side bonding flange 25 is sandwiched between the grasping flanges 51 and 52 as described above.

2-7. Mounting Structure of Gas Temperature Sensor

Next, the gas temperature sensors 109 and 112 provided in the DPF 1 will be described with reference to FIGS. 18, 25, 26, 28 and 29. As shown in FIGS. 18, 25, and 26, one end of a cylindrical sensor boss body 110 is welded and fixed to a portion of the outer peripheral surface of the catalyst inner case 4 located between the upstream side cylindrical portion 4a and the downstream side cylindrical portion 4b. The other end of the sensor boss body 110 extends in the radial direction toward an outer side of the catalyst outer case 5 from a sensor mounting opening 5a of the catalyst outer case 5. That is, the sensor boss body 110 for supporting the exhaust gas sensor is provided at a portion of the outer peripheral surface of the catalyst inner case 4 which is in the vicinity of the connection boundary position (catalyst downstream side space 29) between the diesel oxidation catalyst 2 and the soot filter 3 such that the sensor boss body 110 penetrates the catalyst outer case 5. The sensor mounting bolt 111 is threadedly engaged with the other end of the sensor boss body 110. The sensor mounting bolt 111 penetrates, for example, the thermistor-shaped upstream side gas temperature sensor 109 and the upstream side gas temperature sensor 109 is supported by the sensor boss body 110 through the sensor mounting bolt 111. A detecting portion of the upstream side gas temperature sensor 109 projects into the catalyst downstream side space 29. In the above-described configuration, if exhaust gas is discharged from the gas outflow end surface 2b of the diesel oxidation catalyst 2, a temperature of the exhaust gas is detected by the upstream side gas temperature sensor 109.

As shown in FIGS. 25 and 26, the sensor boss body 110 on the exhaust gas upstream side is located on an extension of the gas outflow end surface 2b which intersects with the exhaust gas moving direction at right angles in the diesel oxidation catalyst 2 and on an extension of the intake side end surface 3a which intersects with the exhaust gas moving direction at right angles in the soot filter 3. In this case, a disposition distance between the gas outflow end surface 2b of the diesel oxidation catalyst 2, the intake side end surface 3a of the soot filter 3, and the upstream side gas temperature sensor 109 can be set extremely short (they can be disposed closely). Therefore, the entire DPF 1 can be made compact, the detection precision of the upstream side gas temperature sensor 109 can be enhanced, and performance such as the regeneration control of the DPF 1 can be enhanced.

Figure 29:
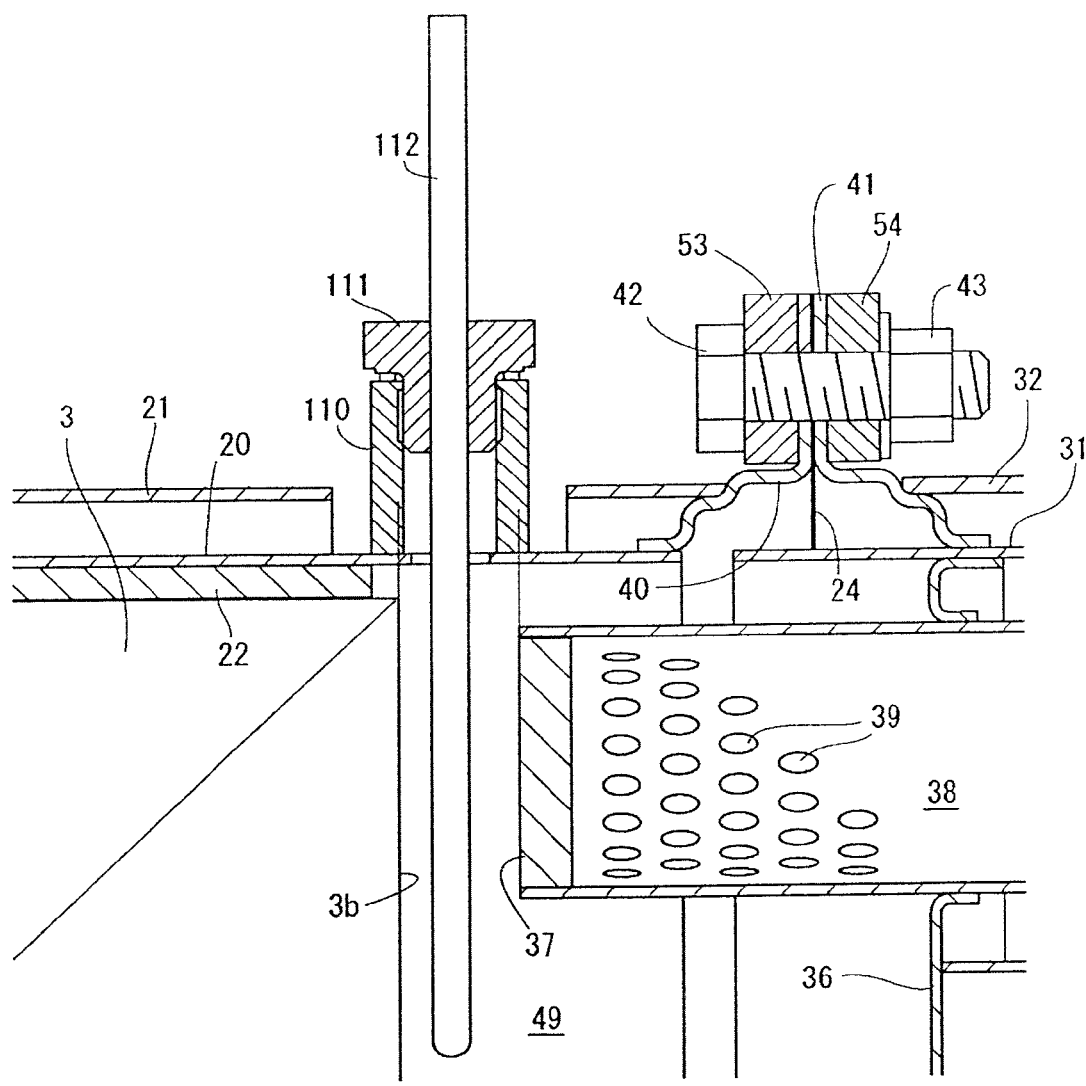
FIG. 29 is an enlarged sectional view showing a mounting portion of a sensor boss body located on the exhaust gas downstream side.

As shown in FIGS. 18, 28, and 29, one end of the cylindrical sensor boss body 110 is also welded and fixed to a portion of the outer peripheral surface of the filter inner case 20 which is in the vicinity of the filter downstream side space 49. The other end of the sensor boss body 110 extends from the sensor mounting opening 21a of the filter outer case 21 in the radial direction toward the outer side of the filter outer case 21. That is, the sensor boss body 110 for supporting the exhaust gas sensor is provided at a portion of the outer peripheral surface of the filter inner case 20 which is in the vicinity of the connection boundary position of the soot filter 3 such that the sensor boss body 110 penetrates the filter outer case 21. The sensor mounting bolt 111 is threadedly engaged with the other end of the sensor boss body 110. The sensor mounting bolt 111 penetrates, for example, the thermistor-shaped downstream side gas temperature sensor 112, and the downstream side gas temperature sensor 112 is supported by the sensor boss body 110 through the sensor mounting bolt 111. A detecting portion of the downstream side gas temperature sensor 112 projects into the filter downstream side space 49. In the above configuration, if exhaust gas is discharged from the discharge side end surface 3b of the soot filter 3, a temperature of the exhaust gas is detected by the downstream side gas temperature sensor 112.

As shown in FIGS. 28 and 29, the sensor boss body 110 on the exhaust gas downstream side is located on an extension of the discharge side end surface 3b which intersects with the exhaust gas moving direction at right angles in the soot filter 3 and on an extension of the an end surface (downstream inner lid body 37) on the exhaust gas upstream side in each of the exhaust gas introducing pipes 38. In this case, a disposition distance between the discharge side end surface 3b of the soot filter 3 and the downstream side gas temperature sensor 112 can be set extremely short (they can be disposed closely). In this point also, the entire DPF 1 can be made compact, the detection precision of the downstream side gas temperature sensor 112 can be enhanced, and performance such as the regeneration control of the DPF 1 can be enhanced.

The sensor boss body 113 (see FIGS. 31 to 34) of the later-described differential pressure sensor 63 can of course be formed like the sensor boss body 110 with respect to both the gas temperature sensors 109 and 112.

2-8. Mounting Structure of Differential Pressure Sensor

Next, the differential pressure sensor 63 provided in the DPF 1 will be described with reference to FIGS. 31 to 34. The differential pressure sensor 63 is for detecting a pressure difference of exhaust gas between the upstream side and downstream side with the soot filter 3 therebetween in the DPF 1. The differential pressure sensor 63 is formed such that a deposited amount of particulate materials of the soot filter 3 is converted based on the pressure difference and the clogged state in the DPF 1 can be grasped. That is, acceleration control means or intake throttle control means (both not shown) is operated based on the pressure difference of exhaust gas detected by the differential pressure sensor 63 so that the regeneration of the soot filter 3 can be automatically controlled.

A sensor bracket 66 is fastened to the outlet grasping flange 54 on the silencing side through a bolt, and the sensor bracket 66 is disposed on an upper surface of the DPF casing 60. A detecting body 67 of the differential pressure sensor 63 is mounted on the sensor bracket 66. An upstream side pipe joint body 64 and a downstream side pipe joint body 65 are connected to a detecting body 67 of the differential pressure sensor 63 through an upstream side sensor pipe 68 and a downstream side sensor pipe 69. Like the sensor boss body 110, the sensor boss body 113 is disposed on the DPF casing 60. The upstream side pipe joint body 64 (downstream side pipe joint body 65) is fastened to the sensor boss body 113 through pipe joint bolts 114.

2-9. Another Example of Silencer Structure

Figure 30:
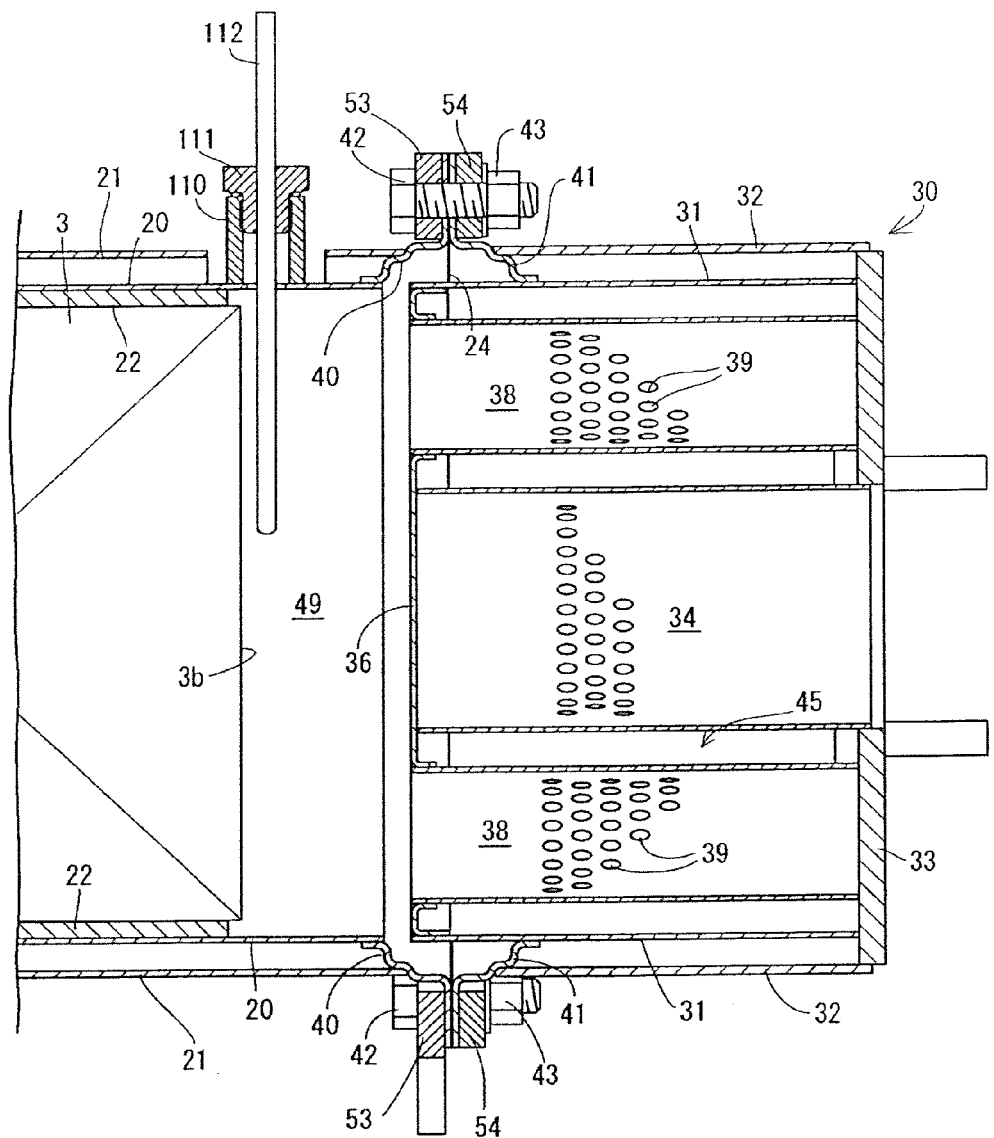
FIG. 30 is an enlarged side sectional view showing another example of a silencer structure.
Figure 31:
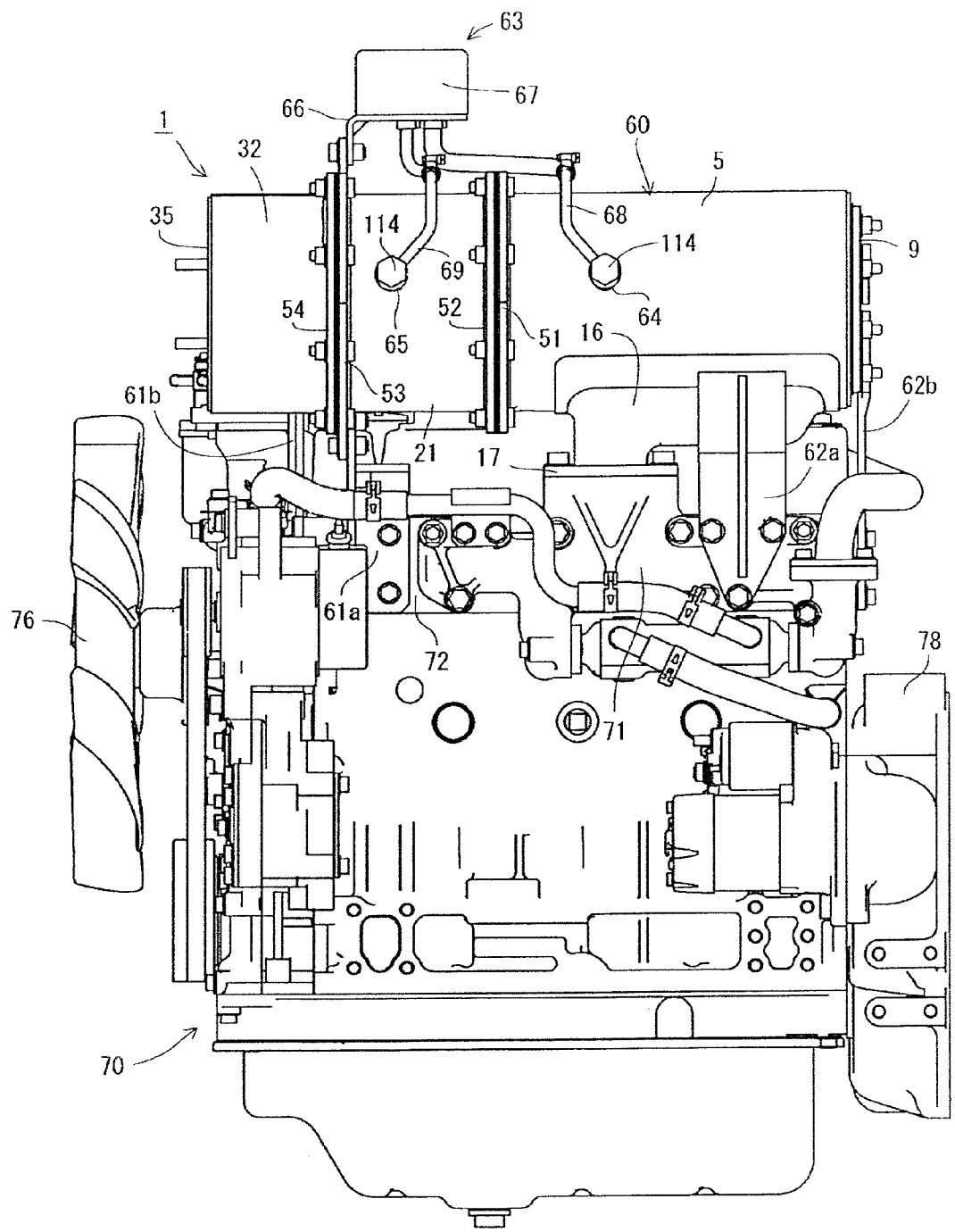
FIG. 31 is a side view of a diesel engine provided with a DPF as viewed from an exhaust manifold.
Figure 32:
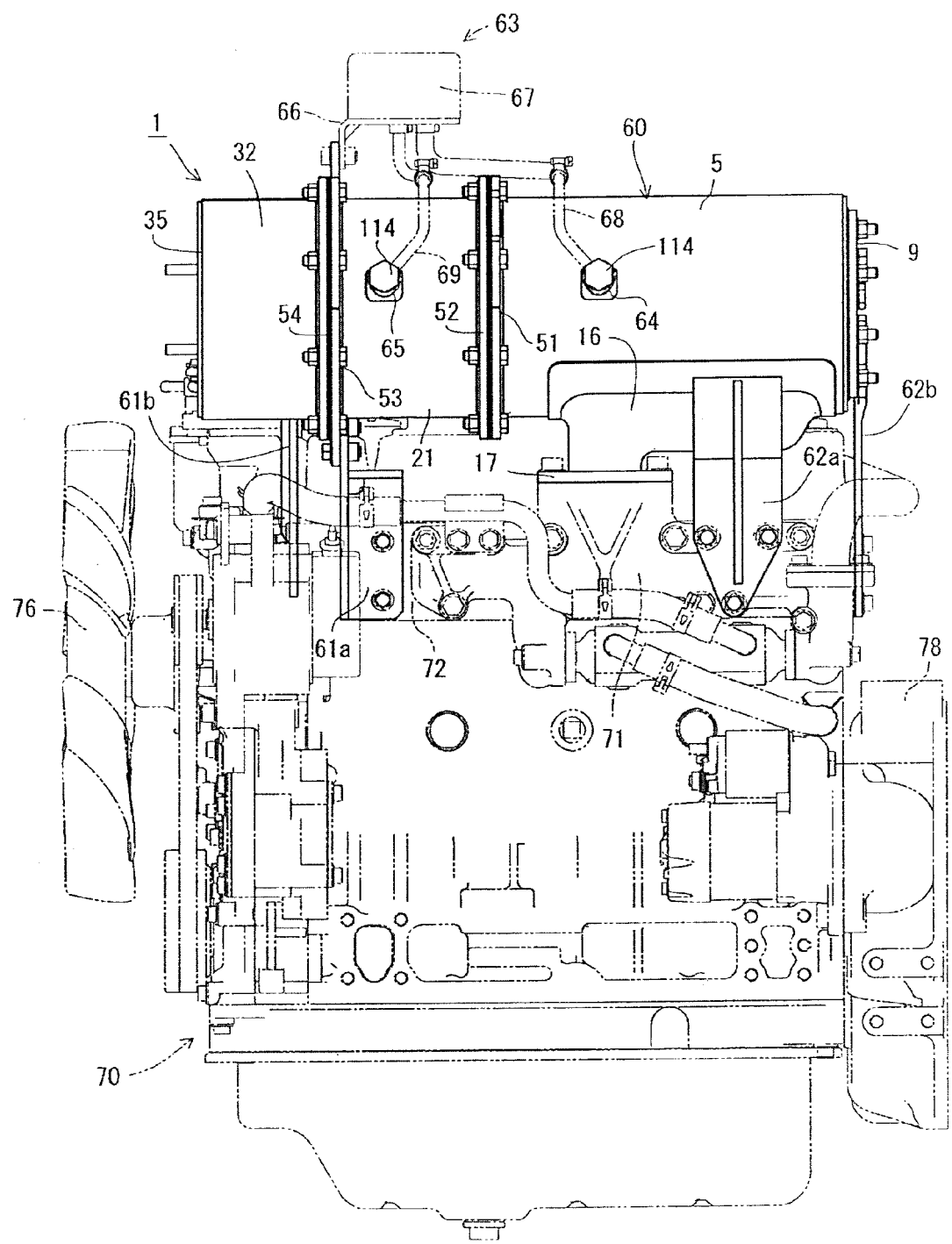
FIG. 32 is an external side view showing a mounting structure of the DPF.
Figure 33:
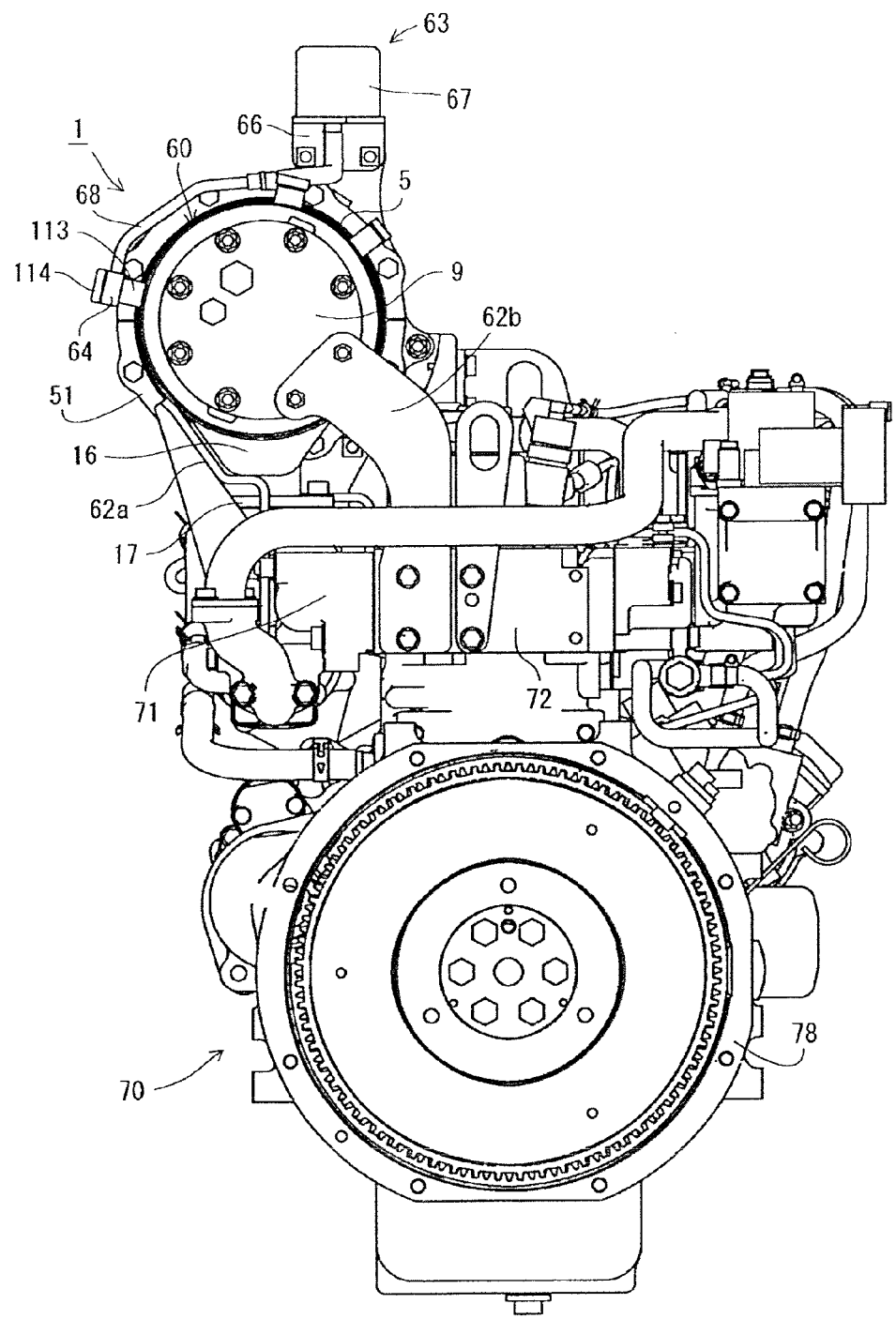
FIG. 33 is a side view of the diesel engine provided with a DPF as viewed from a flywheel.
Figure 34:
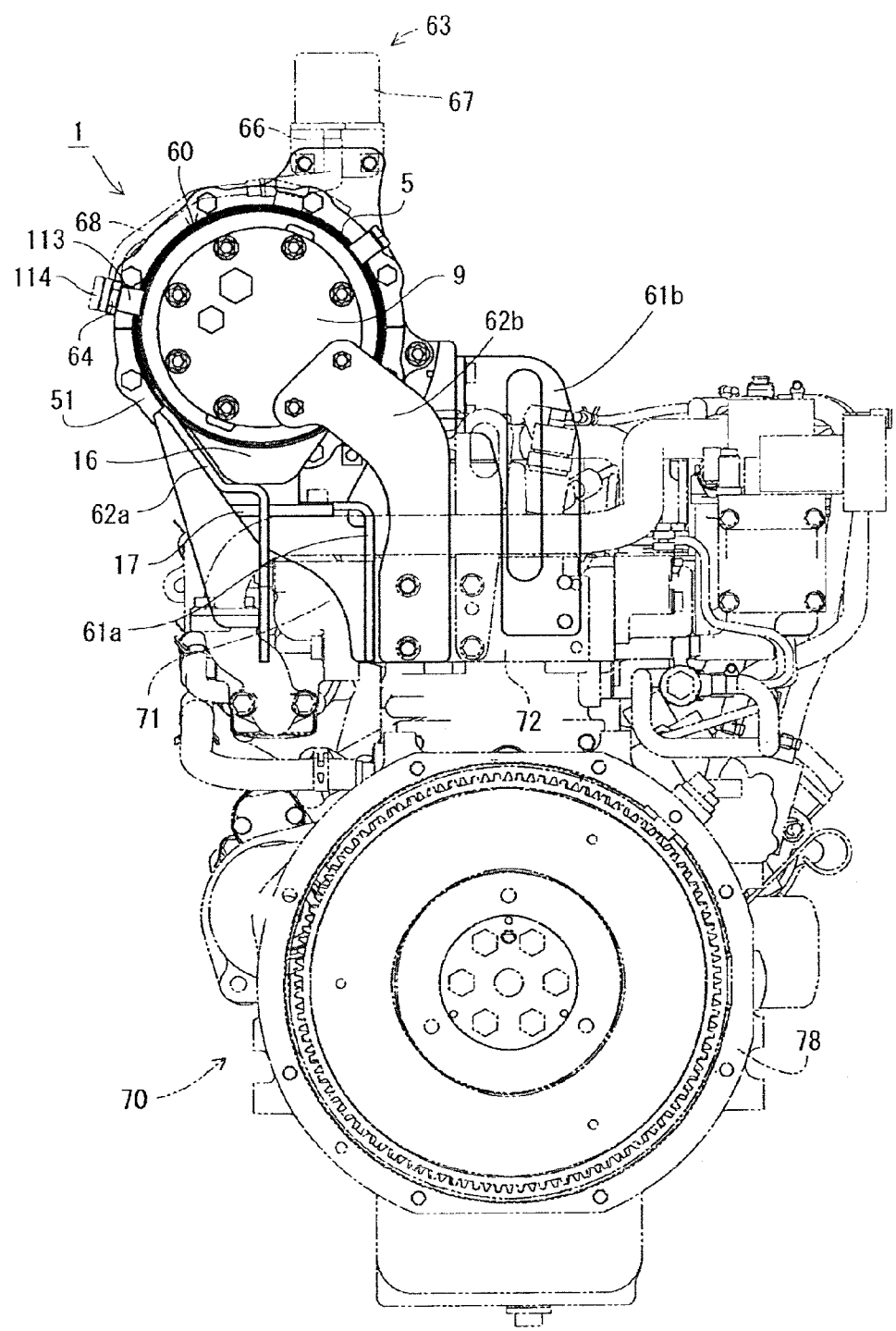
FIG. 34 is an external side view showing a mounting structure of the DPF on an exhaust gas upstream side.

FIG. 30 shows another example of a structure of the silencer 30. In this case, a disk-like inner lid body 36 is fixed to an exhaust gas upstream side end of the silencing inner case 31 by welding. The exhaust gas upstream side of each of the exhaust gas introducing pipes 38 penetrates the inner lid body 36, but a position of the exhaust gas upstream side end of the exhaust gas introducing pipe 38 and a position of the exhaust gas upstream side end of the silencing inner case 31 substantially match with each other as viewed from side in cross section. The exhaust gas upstream side end of each of the exhaust gas introducing pipes 38 opens as it is. Other configurations are the same as those of the previous embodiments. According to this configuration also, the length of the exhaust gas introducing pipe 38 in the exhaust gas moving direction can be secured, the length of the silencer 30 (silencing outer case 32) in the exhaust gas moving direction can be shortened, the entire DPF 1 having the silencer 30 can be made compact, and the silencing function in the silencer 30 can be maintained and enhanced.

2-10. Summary of Second Embodiment

As apparent from the above description and FIGS. 18, 22, and 26, the exhaust gas purification device 1 includes two gas purification bodies 2 and 3 which purify exhaust gas discharged from the engine 70, the inner cases 4 and 20 in which the purification bodies 2 and 3 are incorporated, the outer cases 5 and 21 in which the inner cases 4 and 20 are incorporated, the exhaust gas inlet pipe 16 into which exhaust gas from the engine 70 flows, and the exhaust gas outlet pipe 34 from which exhaust gas passing through both the gas purification bodies 2 and 3 flows out. The outer cases 5 and 21 are arranged side by side in the exhaust gas moving direction and connected to each other. The exhaust gas inlet pipe 16 is mounted on the exhaust gas upstream side outer case 5 such that the introducing passage 200 for exhaust gas is formed from the outer side surface of the exhaust gas upstream side outer case 5 and the inner side surface of the exhaust gas inlet pipe 16. The rectifier fins 201a and 201b for rectifying the flow of exhaust gas are provided on at least one of the outer side surface of the exhaust gas upstream side outer case 5 and the inner side surface of the exhaust gas inlet pipe 16. Therefore, exhaust gas can be smoothly sent into the exhaust gas purification device 1 without being largely influenced by the shape of the exhaust gas inlet pipe 16 due to existence of both the rectifier fins 201a and 201b. Therefore, there is an effect that it is possible to flow exhaust gas into the gas purification body 2 on the exhaust gas upstream side as uniformly as possible, and the entire region of the gas purification body 2 can be efficiently utilized.

As apparent from the above description and FIGS. 18 and 22, the flange bodies 25 and 26 which connect the outer cases 5 and 21 to each other are deviated from the connection boundary position 29 of the gas purification bodies 2 and 3. Therefore, it is possible to secure the lengths of the gas purification bodies 2 and 3 in the exhaust gas moving direction, and to shorten the lengths of both the outer cases 5 and 21 in the exhaust gas moving direction. Therefore, there is an effect that rigidity of each of the outer cases 5 and 21 can be enhanced, weight thereof can be reduced, and the entire length of the exhaust gas purification device 1 can be made compact (can be shortened). There is also a merit that it is possible to easily prevent exhaust gas from leaking due to existence of the bonding flanges 25 and 26.

The flange bodies 40 and 41 which connect the exhaust gas downstream side outer case 21 and the silencer 30 to each other are deviated from the connection boundary position of the gas purification body 3 on the exhaust gas downstream side. Therefore, lengths of the outer case 21 on the exhaust gas downstream side and the silencer 30 in the exhaust gas moving direction can be shortened, and the entire length of the exhaust gas purification device 1 having the silencer 30 can be made compact (can be shortened).

As apparent from the above description and FIGS. 18 and 22, the inner case 20 (4) in which the other gas purification body 3 (2) is incorporated is inserted into the inner case 4 (20) of the one gas purification body 2 (3), and the gap 23 is formed between the inner cases 4 and 20. Therefore, by separating the other inner case 20 (4) from the one inner case 4 (20), it is possible to largely expose, to outside, the gas purification body 3 (2) located in the other inner case 20 (4). Hence, there is an effect that the maintenance operation (cleaning and the like of the gas purification bodies 2 and 3) which is carried out while separating the outer cases 5 and 21 from each other by releasing the connection between the flange bodies 25 and 26 can be enhanced. Both the inner cases 4 and 20 can be easily attached to and detached from each other due to the existence of the gap 23 located between both the inner cases 4 and 20. That is, according to the conventional configuration in which both the inner cases 4 and 20 are tightly fitted to each other to prevent exhaust gas leakage, both the inner cases 4 and 20 are integrated due to rust and they cannot be easily separated from each other. In contrast, it is extremely easy to separate both the inner cases 4 and 20 from each other, and this point also enhances the maintenance performance and the exchanging operability of the gas purification bodies 2 and 3.

As apparent from the above description and FIGS. 18, 22, and 26, the rectifier fins 201a and 201b are provided on both the outer side surface of the outer case 5 on the exhaust gas upstream side and the inner side surface of the exhaust gas inlet pipe 16, the rectifier fin 201a on the side of the outer case 5 is located on the exhaust gas upstream side, and the rectifier fin 201b on the side of the exhaust gas inlet pipe 16 is located on the exhaust gas downstream side. Therefore, although the rectifier fins 201a and 201b are located in the introducing passage 200, there is an effect that they can be mounted on the outer side surface of the outer case 5 or the exhaust gas inlet pipe 16 without interfering with each other by a simple machining operation.

As apparent from the above description and FIGS. 18, 22, 26, and 27, the exhaust gas inflow opening 12 which is in communication with the exhaust gas inlet pipe 16 is formed in the outer case 5 on the exhaust gas upstream side and the inner case 4 incorporated in the outer case 5, the exhaust gas inflow opening 12 opens in a rectangular form, and the four corners 12a thereof are formed into arc shapes. Therefore, the exhaust gas inflow opening 12 opens in the rectangular form, and an opening area is made as wide as possible. Hence, although the inflow resistance of exhaust gas is prevented from increasing, since the four corners 12a are formed into the are shapes, it is possible to prevent the disturbed flow of exhaust gas passing through the exhaust gas inflow opening 12. Therefore, there is an effect that variation of inflow pressure of exhaust gas passing through the exhaust gas inflow opening 12 is reduced, and it is possible to flow the exhaust gas into the exhaust gas inflow opening 12 as uniformly as possible.

As apparent from the above description and FIGS. 18, 22, and 28, the exhaust gas purification device includes two gas purification bodies 2 and 3 which purify exhaust gas discharged from the engine 70, the inner cases 4 and 20 in which the gas purification bodies 2 and 3 are incorporated, and the outer cases 5 and 21 in which the inner cases 4 and 20 are incorporated, the exhaust gas inlet pipe 16 into which exhaust gas from the engine 70 flows, and the exhaust gas outlet pipe 34 from which exhaust gas passing through both the purification bodies 2 and 3 flows out. The outer cases 5 and 21 are arranged side by side in the exhaust gas moving direction and connected to each other. The silencer 30 having the exhaust gas outlet pipe 34 is mounted on the exhaust gas downstream side outer case 21, the exhaust gas introducing pipe 38 extending in parallel to the exhaust gas moving direction is incorporated in the silencer 30, and the exhaust gas upstream side of the exhaust gas introducing pipe 38 enters the exhaust gas downstream side inner case 20. Therefore, it is possible to secure the length of the exhaust gas introducing pipe 38 in the exhaust gas moving direction, and to shorten the length of the silencer 30 (silencing outer case 32) in the exhaust gas moving direction. Therefore, in the exhaust gas purification device 1 having the silencer 30, there is an effect that the entire exhaust gas purification device 1 can be made compact, and the silencing function of the silencer 30 can be maintained and enhanced.

As apparent from the above description and FIGS. 18, 22, 28 and 29, the exhaust gas upstream side end of the silencer 30 is closed by the inner lid body 36, the exhaust gas introducing pipe 38 penetrates the inner lid body 38 and enters the exhaust gas downstream side inner case 20, and the communication holes 39 for taking in exhaust gas are formed in the exhaust gas introducing pipe 38 at a location in exhaust gas upstream of the inner lid body 36. The communication holes 39 in exhaust gas upstream of the inner lid body 36 contribute to intake of exhaust gas into the silencer 30. Hence, there is an effect that although the length of the silencer 30 in the exhaust gas moving direction is shortened, a sufficient moving distance of exhaust gas can be secured, and the silencing function of the silencer 30 can further be enhanced.

As apparent from the above description and FIGS. 18, 25, 26, 28, and 29, the sensor boss body 110 for supporting the exhaust gas sensor 112 is provided on the outer peripheral surface of the exhaust gas downstream side inner case 20 which is in the vicinity of the connection boundary position 49 of the gas purification body 3 such that the sensor boss body 110 penetrates the exhaust gas downstream side outer case 21. The sensor boss body 110 is located on an extension of the end surface 3b which intersects with the exhaust gas moving direction at right angles in the gas purification body 3, or on an extension of the exhaust gas upstream side end surface in the exhaust gas introducing pipe 38. Therefore, the disposition distance between the end surface 3b of the gas purification body 3 and the exhaust gas sensor 112 can be set extremely short (they can be disposed closely). Therefore, there is effect that the entire exhaust gas purification device 1 can be made compact, detection precision of the exhaust gas sensor 112 can be enhanced, and performance such as the regeneration control of the exhaust gas purification device 1 can be enhanced.

Configurations of various portions in the invention of the application are not limited to the embodiments, and the configurations can be variously changed within a scope not departing from the subject matter of the invention of the application.

REFERENCE SIGNS LIST

1 DPF (diesel particulate filter)
2 Diesel oxidation catalyst (gas purification body)
3 Soot filter (gas purification body)
4 Catalyst inner case
5 Catalyst outer case
5a, 21a Boss body through hole
20 Filter inner case
21 Filter outer case
25 Catalyst-side bonding flange
63 Differential pressure sensor (exhaust gas sensor)
70 Diesel engine
109, 112 Gas temperature sensor (exhaust gas sensor)
110, 113 Sensor boss body

The invention claimed is:

1. An exhaust gas purification device comprising:
two gas purification bodies for purifying exhaust gas discharged from an engine;
inner cases for incorporating the gas purification bodies;
outer cases for incorporating the inner cases, the outer cases being arranged side by side in an exhaust gas moving direction and connected to each other, wherein one of the adjoining inner cases is inserted into the other inner case to form a double-layer structure, and a loosely-fitting gap is formed between an inner side surface of the one inner case and an outer side surface of the other inner case; and an exhaust gas inlet pipe that receives exhaust gas flowing in from the engine, and an exhaust gas outlet pipe through which the exhaust gas flows out after passing through the gas purification bodies, wherein an upward-facing opening of the exhaust gas inlet pipe is fixed to an outer side surface of the outer case that is for the catalyst such that a rectangular upwardly opening end which is on a large diameter side covers an exhaust gas inflow opening, and extends in a longitudinal direction of said outer case for the catalyst, and a downward-facing opening, which serves as an exhaust gas receiving side, opens onto an edge close to a longitudinal middle portion of said outer case in the exhaust gas inlet pipe, so that an exhaust gas introducing passage is formed by the outer side surface of an exhaust gas upstream side outer case and the inner side surface of the exhaust gas inlet pipe.

2. The exhaust gas purification device according to claim 1, wherein a flange body which connects both the outer cases to each other is deviated from a connection boundary position of both the gas purification bodies.

3. The exhaust gas purification device according to claim 1, wherein the exhaust gas inflow opening which is in communication with the exhaust gas inlet pipe is formed in the exhaust gas upstream side outer case and the inner case which is incorporated in this outer case, the exhaust gas inflow opening opens in a rectangular shape, and four corners of the exhaust gas inflow opening are formed into arc shapes.

4. The exhaust gas purification device according to claim 1,
wherein a silencer having the exhaust gas outlet pipe is mounted on an exhaust gas downstream side outer case, an exhaust gas introducing pipe extending in parallel to the exhaust gas moving direction is incorporated in the silencer, and an exhaust gas upstream side of the exhaust gas introducing pipe enters an exhaust gas downstream side inner case.

5. The exhaust gas purification device according to claim 4, wherein a flange body which connects both the outer cases to each other is deviated from a connection boundary position of both the gas purification bodies, and a flange body which connects the exhaust gas downstream side outer case and the silencer to each other is deviated from a connection boundary position of the exhaust gas downstream side gas purification body.

6. The exhaust gas purification device according to claim 4, wherein an exhaust gas upstream side end of the silencer is closed by an inner lid body, the exhaust gas introducing pipe penetrates the inner lid body and enters the exhaust gas downstream side inner case, and a communication hole for taking exhaust gas in is formed in a portion of the exhaust gas introducing pipe on exhaust gas upstream side of the inner lid body.

7. The exhaust gas purification device according to claim 4, wherein a sensor boss body for supporting an exhaust gas sensor is provided on a portion of an outer peripheral surface of the exhaust gas downstream side inner case which is near a connection boundary position of the gas purification body such that the sensor boss body penetrates the exhaust gas downstream side outer case, and the sensor boss body is located on an extension of an end surface of the gas purification body which intersects with the exhaust gas moving direction, and on an extension of an exhaust gas upstream side end surface of the exhaust gas introducing pipe.

8. The exhaust gas purification device according to claim 1, wherein an end of the exhaust gas inlet pipe at the downward-facing opening deviates from the exhaust gas inflow opening toward the exhaust gas downstream side inside the inner cases.

9. The exhaust gas purification device according to claim 1, wherein the exhaust gas inlet pipe is formed into a semi-cylindrical shape which opens upward, and is welded and fixed to the outer side surface of the outer case such that an end of the exhaust gas inlet pipe at the upward-facing opening, which is on a large diameter side, covers the exhaust gas inflow opening, and extends in a longitudinal direction of the outer case.

10. An exhaust gas purification device comprising:
two gas purification bodies for purifying exhaust gas discharged from an engine;
inner cases for incorporating the gas purification bodies;
outer cases for incorporating the inner cases, the outer cases being arranged side by side in an exhaust gas moving direction and connected to each other, wherein one of the adjoining inner cases is inserted into the other inner case to form a double-layer structure, and a loosely-fitting gap is formed between an inner side surface of the one inner case and an outer side surface of the other inner case; and
an exhaust gas introducing passage is formed by the outer side surface of the exhaust gas upstream side outer case and the inner side surface of the exhaust gas inlet pipe,
wherein the exhaust gas inlet pipe is mounted on an exhaust as upstream side outer case, a first rectifier is provided on an outer side surface of the exhaust gas upstream side outer case, and a second rectifier is provided on the inner side surface of the exhaust gas inlet pipe, the first rectifier being located on an exhaust gas upstream side, and the second rectifier being located on an exhaust gas downstream side.

11. An exhaust gas purification device comprising:
two gas purification bodies for purifying exhaust gas discharged from an engine;
inner cases for incorporating the gas purification bodies;
outer cases for incorporating the inner cases, the outer cases being arranged side by side in an exhaust gas moving direction and connected to each other, wherein one of the adjoining inner cases is inserted into the other inner case to form a double-layer structure, and a loosely-fitting gap is formed between an inner side surface of the one inner case and an outer side surface of the other inner case; and
an exhaust gas inlet pipe for exhaust gas from the engine flowing into, and an exhaust gas outlet pipe for exhaust gas passing through the gas purification body flowing out,
wherein the exhaust gas inlet pipe is mounted on an exhaust gas upstream side outer case such that an exhaust gas introducing passage is formed by the outer side surface of the exhaust gas upstream side outer case and the inner side surface of the exhaust gas inlet pipe, and at least one of the outer side surface of the exhaust gas upstream side outer case and the inner side surface of the exhaust gas inlet pipe is provided with a rectifier which rectifies a flow of exhaust gas, and wherein the rectifier is provided on each of the outer side surface of the exhaust gas upstream side outer case and the inner side surface of the exhaust gas inlet pipe, the rectifier of the outer case is located on an exhaust gas upstream side, and the rectifier of the exhaust gas inlet pipe is located on an exhaust gas downstream side.

* * * * *